US007227697B2

(12) United States Patent
Minakata

(10) Patent No.: US 7,227,697 B2
(45) Date of Patent: Jun. 5, 2007

(54) ZOOM OPTICAL SYSTEM, AND ELECTRONICS INCORPORATING THE SAME

(75) Inventor: Hiroyuki Minakata, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/008,945

(22) Filed: Dec. 13, 2004

(65) Prior Publication Data

US 2005/0128601 A1    Jun. 16, 2005

(30) Foreign Application Priority Data

Dec. 12, 2003  (JP) ............................. 2003-414500
Dec. 12, 2003  (JP) ............................. 2003-414501
Dec. 12, 2003  (JP) ............................. 2003-414502

(51) Int. Cl.
    *G02B 15/14*    (2006.01)
(52) U.S. Cl. ....................................... 359/686; 359/683
(58) Field of Classification Search ................ 359/683, 359/686
    See application file for complete search history.

(56) References Cited

U.S. PATENT DOCUMENTS 2,782,684 A * 2/1957 Hopkins .................... 359/677
5,786,942 A * 7/1998 Komori et al. ............. 359/686
5,889,620 A * 3/1999 Furuta ........................ 359/689
6,870,689 B2 * 3/2005 Yoshida ..................... 359/683

FOREIGN PATENT DOCUMENTS

| JP | 09-179026 | 7/1997 |
| JP | 10-048524 | 2/1998 |
| JP | 10-333034 | 12/1998 |

* cited by examiner

*Primary Examiner*—Ricky Mack
*Assistant Examiner*—William Choi
(74) *Attorney, Agent, or Firm*—Kenyon & Kenyon LLP

(57) ABSTRACT

The invention relates to a zoom optical system that can offer an effective tradeoff between low cost and size reductions, and electronic equipment that incorporates the same. The zoom optical system comprises, in order from an object side thereof, a first lens group G1 of negative refracting power, an aperture stop S, a second lens group G2 of positive refracting power, a third lens group G3 of negative refracting power and a fourth lens group G4 of positive refracting power, and satisfies the following condition.

$$2 < |d_{w12} - d_{t12}|/|d_{w23} - d_{t23}| < 200$$

Here $d_{w12}$ is a spacing between G1 and G2 at a wide-angle end, $d_{t12}$ is a spacing between G1 and G2 at a telephoto end, $d_{w23}$ is a spacing between G2 and G3 at the wide-angle end, and $d_{t23}$ is a spacing between G2 and G3 at the telephoto end.

13 Claims, 20 Drawing Sheets

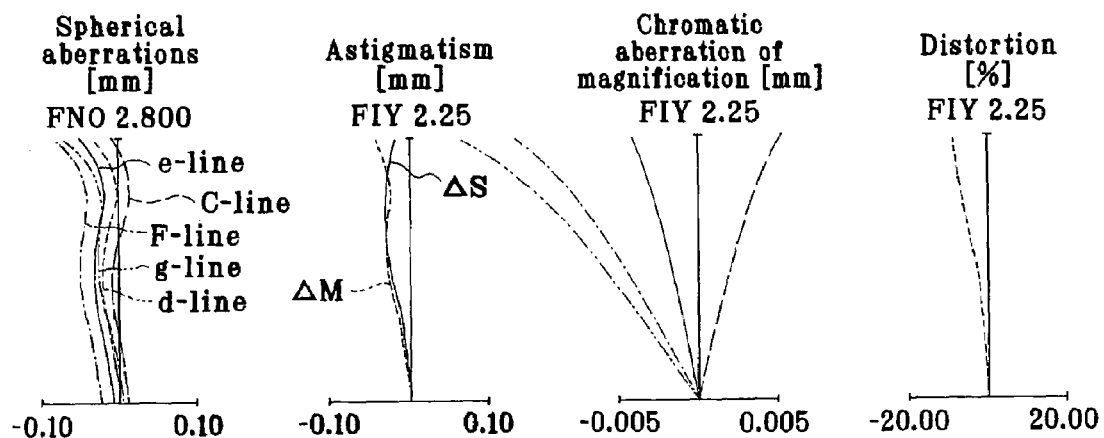
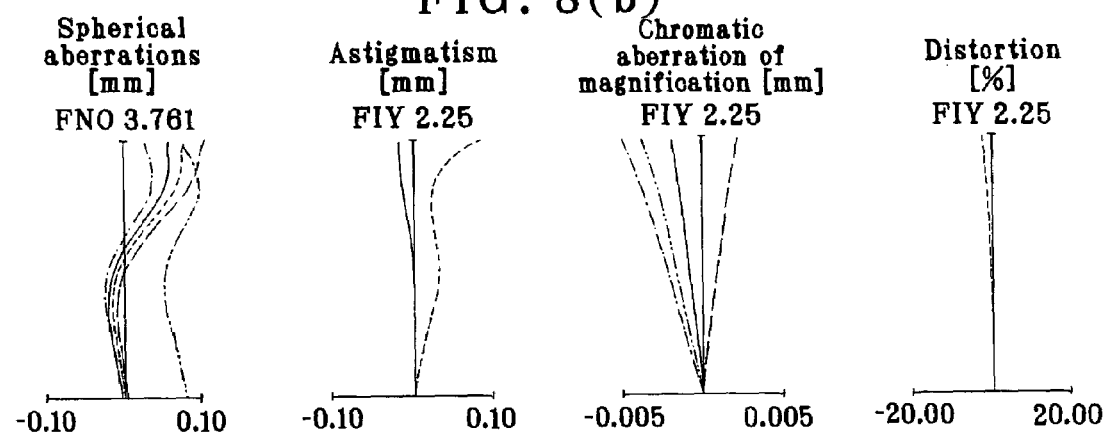
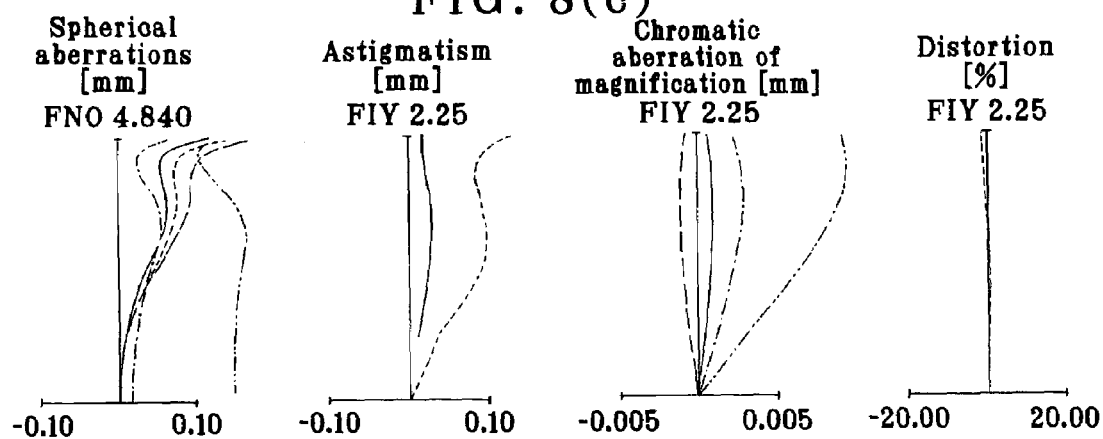

ZOOM OPTICAL SYSTEM, AND ELECTRONICS INCORPORATING THE SAME

This application claims benefit of Japanese Applications Nos. 2003-414500, 2003-414501 and 2003-414502 filed in Japan on Dec. 12, 2003, the contents of which are incorporated by this reference.

BACKGROUND OF THE INVENTION

The present invention relates generally to a zoom optical system and electronic equipment incorporating the same, and more specifically to a compact zoom optical system and electronic equipment that incorporates the same. Such electronic equipments, for instance, include digital cameras, video cameras, digital video units, personal computers, mobile computers, cellular phones, and personal digital assistants.

Recently, personal digital assistants abbreviated as PDAs and cellular phones have boasted explosive growth in demand. Added to some such equipments are a digital camera function and a digital video function. To implement those functions, CCD (charge coupled device) and CMOS (complementary metal oxide semiconductor) sensors are now in use. To reduce the sizes of such equipments, it is preferable to rely on an image pickup device having a relatively small effective area on a receiving plane. This requires a sensible tradeoff between compactness and low cost while keeping the performance of an optical system high. Patent Publications 1, 2 and 3 referred to below disclose prior art zoom optical systems whose size and cost are reduced to some extents.

Patent Publication 1
JP(A)9-179026
Patent Publication 2
JP(A)10-333034
Patent Publication 3
JP(A)10-48524

However, the zoom optical system set forth in Patent Publication 1 leaves much to be desired in terms of size reductions thanks to the third lens group comprising two lenses. A problem with the zoom optical system described in Patent Publication 2 is that large lens thickness renders the length of the lens system long because of using a gradient index lens in the second lens group.

In the zoom optical system shown in Patent Publication 3, too, there is left a great deal to be desired in terms of compactness because an aperture stop is interposed between the second lens group and the third lens group and so more lenses is needed for correction of chromatic aberration of magnification.

SUMMARY OF THE INVENTION

In view of such prior art problems as described above, the primary object of the invention is to provide a zoom optical system that offers a sensible tradeoff between cost reductions and size reductions, and electronics that incorporates the same.

According to one aspect of the invention, this object is achievable by the provision of a zoom optical system comprising, in order from an object side thereof, a first lens group having negative refracting power, an aperture stop, a second lens group having positive refracting power, a third lens group having negative refracting power and a fourth lens group that has positive refracting power and remains fixed during zooming, characterized in that said zoom optical system satisfies condition (1):

$$2 < |d_{w12} - d_{t12}| / |d_{w23} - d_{t23}| < 200 \tag{1}$$

where $d_{w12}$ is a spacing between the first lens group and the second lens group at a wide-angle end thereof, $d_{t12}$ is a spacing between the first lens group and the second lens group at a telephoto end thereof, $d_{w23}$ is a spacing between the second lens group and the third lens group at the wide-angle end, and $d_{t23}$ is a spacing between the second lens group and the third lens group at the telephoto end.

According to another aspect of the invention, there is provided a zoom optical system comprising, in order from an object side thereof, a first lens group having negative refracting power, a second lens group having positive refracting power, a third lens group having negative refracting power and a fourth lens group having positive refracting power, characterized in that:

said second lens group comprises one homogeneous positive lens.

According to yet another aspect of the invention, there is provided a zoom optical system comprising, in order from an object side thereof, a first lens group having negative refracting power, a second lens group having positive refracting power, a third lens group having negative refracting power and a fourth lens group having positive refracting power, characterized in that:

said first lens group and said third lens group each comprise one negative lens.

The present invention encompasses electronics comprising any one of the above zoom optical systems and an electronic image pickup device located on an image side thereof.

Still objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIGS. 8(a), 8(b) and 8(c) are aberration diagrams for Example 1 at the wide-angle end (a), in an intermediate state (b) and at the telephoto end (c), respectively, upon focusing on an object point at infinity.

FIGS. 11(a), 11(b) and 1(c) are aberration diagrams for Example 4, similar to FIGS. 8(a), 8(b) and 8(c).

FIG. 17 is a front perspective view that shows an appearance of a digital camera with the inventive zoom optical system built in.

DESCRIPTION OF THE PREFERRED EMBODIMENTS

Figure 1A:
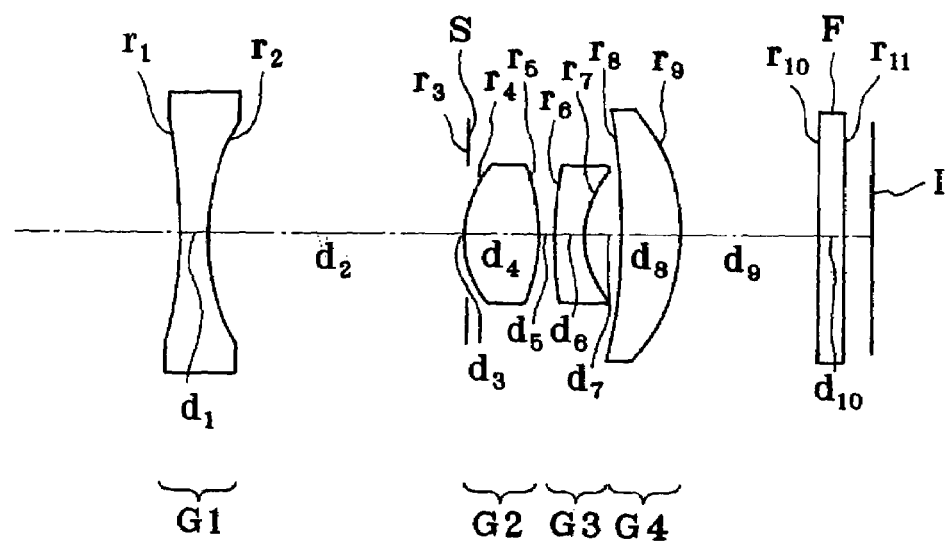
FIGS. 1(a), 1(b) and 1(c) are illustrative in lens section of Example 1 of the zoom optical system of the invention at a wide-angle end (a), in an intermediate state (b) and at a telephoto end (c), respectively, upon focusing on an object point at infinity.

First of all, the zoom optical system of the invention and forms of electronics that incorporate the same will be explained. Then, embodiments or specific examples of the invention will be described.

The cemented lens referred to herein may be counted as either one lens or plural lenses that compose the cemented lens.

According to the first aspect of the invention, there is provided a zoom optical system comprising, in order from an object side thereof, a first lens group having negative refracting power, an aperture stop, a second lens group having positive refracting power, a third lens group having negative refracting power and a fourth lens group that has positive refracting power and remains fixed during zooming, characterized in that said zoom optical system satisfies condition (1):

$$2<|d_{w12}-d_{t12}|/|d_{w23}-d_{t23}|<200 \qquad (1)$$

where $d_{w12}$ is a spacing between the first lens group and the second lens group at a wide-angle end thereof, $d_{t12}$ is a spacing between the first lens group and the second lens group at a telephoto end thereof, $d_{w23}$ is a spacing between the second lens group and the third lens group at the wide-angle end, and $d_{t23}$ is a spacing between the second lens group and the third lens group at the telephoto end.

The advantage of, and the requirement for, the first zoom optical system of the invention is now explained.

With an optical arrangement that has negative refracting power, positive refracting power, negative refracting power and positive refracting power in this order as contemplated herein, it is possible to achieve an optical system having a fixed total length with a reduced number of lenses yet with a short total length. Thus, this optical system is preferable for a compact, low-cost one.

If the cost of such a zoom optical system is curtailed by reducing the number of lenses in the second lens group, there would be a large fluctuation with zooming of longitudinal chromatic aberration at the second lens group. To avoid this, condition (1) should be satisfied. Insofar as condition (1) is satisfied, the second lens group and the third lens group move during zooming while they stay close to each other, so that the longitudinal chromatic aberration can be canceled out at the second lens group and the third lens group, thereby reducing its fluctuations with zooming. It is then preferable to interpose a stop between the first lens group and the second lens group, because light rays at the third lens group can be kept so high that chromatic aberration of magnification occurring at the first lens group and the fourth lens group can be well corrected.

Exceeding the upper limit of 200 to condition (1) incurs such inconveniences as mentioned just below. As the upper limit of 200 is exceeded, the spacing between the second lens group and the third lens group is almost invariable during zooming. In this case, any satisfactory image can never be obtained, because movement of an image plane can never be corrected only by movement of the second lens group and the third lens group in association with zooming. To obtain satisfactory images, movement of the first lens group and the fourth lens group is thus inevitable. This means that more lens groups must be movable, resulting in the need of more complex mechanisms and much difficulty in achieving compactness. On the other hand, falling short of the lower limit 2 is also not preferable, because fluctuations of,longitudinal chromatic aberration with zooming cannot be cut back, ending up with deterioration in the image quality of the central area of an image.

It is preferable to satisfy condition (1-2) because fluctuations of longitudinal chromatic aberration with zooming can be more reduced.

$$5<|d_{w12}-d_{t12}|/|d_{w23}-d_{t23}|<30 \qquad (1-2)$$

It is more preferable to satisfy condition (1-3) because fluctuations of longitudinal chromatic aberration with zooming can be much more reduced.

$$7<|d_{w12}-d_{t12}|/|d_{w23}-d_{t23}|<15 \qquad (1-3)$$

Referring more to such a zoom optical system as contemplated herein, for instance, the second lens group and the third lens group are moved for the purpose of zooming from the wide-angle end to the telephoto end. Specifically, both the lens groups are moved while varying slightly the spacing between them. Of course, it is acceptable to move the first lens group as well.

According to the second aspect of the invention, the first zoom optical system is further characterized in that said first lens group comprises one negative lens.

The advantage of, and the requirement for, the second zoom lens system is now explained.

If the first lens group is composed of one negative lens, the optical system can then be constructed of a fewer lenses, contributing to further cost reductions.

According to the third aspect of the invention, the first or second zoom optical system is further characterized in that at least one negative lens included in said first lens group has an aspheric surface on an object side thereof.

The advantage of, and the requirement for, the third zoom lens system of the invention is now explained.

In the zoom optical system of this type, light rays at the first lens group are at a high position. Here, if that negative lens has an aspheric surface on its object side, off-axis aberrations such as coma can then be well corrected.

At the telephoto end, a light beam at the first lens group has a large diameter. Here, if that negative lens has an aspheric surface on its object side, spherical or other aberrations can then be well corrected.

According to the fourth aspect of the invention, any one of the $1^{st}$ to $3^{rd}$ zoom optical systems is further characterized in that at least one negative lens included in said first lens group has an aspheric surface on an image side thereof.

The advantage of, and the requirement for, the fourth zoom lens system of the invention is now explained.

In the zoom optical system of this type, light rays at the first lens group are at a high position. Here, if that negative lens has an aspheric surface on its image side, off-axis aberrations such as astigmatism can then be well corrected.

According to the fifth aspect of the invention, any one of the $1^{st}$ to $4^{th}$ zoom optical systems is further characterized in that at least one negative lens included in said first lens group is a lens fabricated of a resinous material.

The advantage of, and the requirement for, the fifth zoom optical system of the invention is now explained. A resinous material lens can be fabricated at lower costs than glass lenses. Therefore, if a lens fabricated of a resinous material is used for the negative lens in the first lens group, the optical system becomes more inexpensive.

According to the $6^{th}$ aspect of the invention, any one of the $1^{st}$ to $5^{th}$ zoom optical systems is further characterized in that at least one negative lens included in said first lens group is fabricated of a material that satisfies condition (2):

$$40 < v_{d1} < 100 \tag{2}$$

where $v_{d1}$ is an Abbe number of the negative lens in said first lens group.

The advantage of, and the requirement for, the $6^{th}$ zoom optical system of the invention is now explained.

Since the first lens group has negative power, large chromatic aberration of magnification is produced at the wide-angle end in particular. However, when the first lens group is comprised of one negative lens, it is impossible to cut back the amount of chromatic aberration of magnification produced by locating a positive lens in the first lens group. This is the reason the negative lens in the first lens group should satisfy condition (2). Insofar as condition (2) is satisfied, the amount of chromatic aberration of magnification produced can be minimized.

A material exceeding the upper limit of 100 to condition (2) is hardly available, and as the lower limit of 40 is not reached, the amount of chromatic aberration of magnification occurring at the first lens group becomes too large. To minimize this chromatic aberration of magnification throughout the optical system, more lenses are needed, rendering cost and size reductions difficult.

Preferably for further decreases in the amount of chromatic aberration of magnification, condition (2-2) should be satisfied.

$$50 < v_{d1} < 100 \tag{2-2}$$

More preferably, condition (2-3) should be satisfied, because the amount of chromatic aberration of magnification produced can be much more reduced.

$$55 < v_{d1} < 100 \tag{2-3}$$

According to the $7^{th}$ aspect of the invention, any one of the $1^{st}$ to $6^{th}$ zoom optical systems is further characterized in that at least one negative lens included in said first lens group satisfies condition (3):

$$0.5 < |f_1|/f_w < 5 \tag{3}$$

where $f_1$ is a focal length of the negative lens in said first lens group, and $f_w$ is a focal length of the zoom optical system at the wide-angle end.

The advantage of, and the requirement for, the $7^{th}$ zoom optical system of the invention is now explained.

The first lens group is larger in lens diameter than the second lens group or the third lens group. Here, if the first lens group is permitted to have power, the entrance pupil is then positioned nearer to the object side, so that not just can an effective lens diameter be decreased but also the length of the lens system can be decreased. If condition (3) is satisfied in this state, the effective lens diameter and the length of the lens system can be minimized while keeping satisfactory performance.

Exceeding the upper limit of 5 to condition (3) is not preferable for correction of aberrations, because the negative power becomes too strong, resulting in large coma occurring at the wide-angle end, and large astigmatism, etc. occurring at the telephoto end. As the lower limit of 0.5 to condition (3) is not reached, the negative power becomes weak, failing to achieve sufficient decreases in the effective diameter of lenses and the length of the lens system.

It is preferable to satisfy condition (3-2), because the effective diameter of lenses and the length of the lens system can be more reduced while keeping satisfactory performance.

$$1 < |f_1|/f_w < 3 \tag{3-2}$$

It is more desirable to satisfy condition (3-3), because the effective diameter of lenses and the length of the lens system can be much more reduced while keeping satisfactory performance.

$$1.5 < |f_1|/f_w < 2 \tag{3-3}$$

According to the $8^{th}$ aspect of the invention, any one of the $1^{st}$, and the $3^{rd}$ to $7^{th}$ zoom optical systems is further characterized in that said first lens group comprises at least one cemented lens.

The advantage of, and the requirement for, the $8^{th}$ zoom optical system of the invention is now explained.

With the cemented lens in the first lens group, decentration sensitivity is minimized, and so the optical system is easier to assemble at lower costs.

According to the $9^{th}$ aspect of the invention, any one of the $1^{st}$, and the $3^{rd}$ to $8^{th}$ zoom optical systems is further characterized in that said first lens group comprises at least one positive lens.

The advantage of, and the requirement for, the $9^{th}$ zoom optical system of the invention is now explained.

The first lens group is larger in lens diameter than the second lens group or the third lens group. Here, if the first lens group is permitted to have large negative refracting power, the entrance pupil is then positioned nearer to the object side, so that not just can an effective lens diameter be decreased but the length of the lens system can be decreased as well. However, to impart too large power to the negative lens in the first lens group is not preferable for correction of aberrations, because there is a large chromatic aberration of magnification. The amount of chromatic aberration of magnification occurring at the first lens group can be minimized by using a positive lens in the first lens group. It is here noted that the positive lens is of meniscus shape, and is cemented to the negative lens into a doublet. This prevents the first lens group to become bulky.

According to the 10$^{th}$ aspect of the invention, the 9$^{th}$ zoom optical system is further characterized in that said positive lens is located nearest to the image side of the first lens group.

The advantage of, and the requirement for, the 10$^{th}$ zoom optical system of the invention is now explained.

With the positive lens located nearest to the image side of the first lens group, it is possible to cut back fluctuations with zooming of various aberrations such as spherical aberration, coma and chromatic aberration of magnification.

According to the 11$^{th}$ aspect of the invention, any one of the 1$^{st}$ to 10$^{th}$ zoom optical systems is further characterized in that said first lens group satisfies condition (4):

$$-10 < SF_{G1} < 1 \quad (4)$$

where $SF_{G1} = (r_{G11} + r_{G12})/(r_{G11} - r_{G12})$, provided that:

$SF_{G1}$ is a shaping factor of said first lens group, $r_{G11}$ is a radius of curvature of the surface nearest to an object side of said first lens group, and $r_{G12}$ is a radius of curvature of the surface nearest to an image side of said first lens group.

The advantage of, and the requirement for, the 11$^{th}$ zoom optical system of the invention is now explained.

The first lens group is larger in lens diameter than the second lens group or the third lens group. Here, if the first lens group is permitted to have power, the entrance pupil is then positioned nearer to the object side, so that not just can an effective lens diameter be decreased but also the length of the lens system can be made short. If condition (4) is satisfied in this state, the effective lens diameter can be minimized while keeping satisfactory performance.

Exceeding the upper limit of 1 to condition (4) is not preferable, because the positive power of the object-side surface becomes too large, bringing the entrance pupil position nearer to the image side and, hence, resulting in an increased effective lens diameter. Falling short of the lower limit of −10 to condition (4) is again not preferable, because the negative power of the object-side surface becomes too strong, resulting in an increase in the amount of coma occurring at the wide-angle end and astigmatism, etc. occurring at the telephoto end.

More preferably, the first lens group should satisfy condition (4-2), because the effective lens diameter is more decreased while keeping satisfactory performance.

$$-1 < SF_{G1} < 1 \quad (4-2)$$

Even more preferably, the first lens group should satisfy condition (4-3), because the effective lens diameter is much more decreased while keeping satisfactory performance.

$$-0.5 < SF_{G1} < 0.5 \quad (4-3)$$

According to the 12$^{th}$ aspect of the invention, any one of the 1$^{st}$ to 11$^{th}$ zoom optical systems is further characterized in that said second lens group consists of one positive lens.

The advantage of, and the requirement for, the 12$^{th}$ zoom optical system of the invention is now explained.

If the second lens group is comprised of one positive lens, the optical system can then be set up with a fewer lenses at lower costs.

According to the 13$^{th}$ aspect of the invention, any one of the 1$^{st}$ to 12$^{th}$ zoom optical systems is further characterized in that at least one positive lens included in said second lens group has an aspheric surface on its object side.

The advantage of, and the requirement for, the 13$^{th}$ zoom optical system of the invention is now explained.

At the second lens group, there is a large light beam diameter. Here, if the positive lens has an aspheric surface on its object side, it is then possible to make satisfactory correction for spherical aberrations, etc. at the wide-angle end in particular.

According to the 14$^{th}$ aspect of the invention, any one of the 1$^{st}$ to 13$^{th}$ zoom optical systems is further characterized in that at least one positive lens included in said second lens group has an aspheric surface on its image side.

The advantage of, and the requirement for, the 14$^{th}$ zoom optical system of the invention is now explained.

At the second lens group, there is a large light beam diameter. Here, if the positive lens has an aspheric surface on its image side, it is then possible to make satisfactory correction for spherical aberrations, etc. at the wide-angle end in particular.

With large power given to the positive lens in the second lens group, the amount of movement of the second lens group is so reduced that a compact optical system is achievable. However, as the positive lens in the second lens group has large power, considerable astigmatism, coma or other aberrations occur. Here, if that positive lens is permitted to have an aspheric surface on its image side, it is then possible to make satisfactory correction for coma, astigmatism, etc. at the wide-angle end in particular and, hence, achieve a compact optical system having reduced aberrations.

According to the 15$^{th}$ aspect of the invention, any one of the 1$^{st}$ to 14$^{th}$ zoom optical systems is further characterized in that at least one positive lens included in said second lens group is fabricated of a resinous material.

The advantage of, and the requirement for, the 15$^{th}$ zoom optical system of the invention is now explained.

Lenses of a resinous material can be fabricated at lower costs than glass lenses. Therefore, if a lens fabricated of a resinous material is used for the positive lens in the second lens group, the optical system can be assembled more inexpensively.

According to the 16$^{th}$ aspect of the invention, any one of the 1$^{st}$ to 15$^{th}$ zoom optical systems is further characterized in that at least one positive lens included in said second lens group is fabricated of a material that satisfies condition (5):

$$40 < \nu_{d2} < 100 \quad (5)$$

where $\nu_{d2}$ is an Abbe number of the positive lens in said second lens group.

The advantage of, and the requirement for, the 16$^{th}$ zoom optical system of the invention is now explained.

With large power imparted to the positive lens in the second lens group, a compact optical system is achievable because of a reduced amount of movement of the second lens group. As the power of the positive lens in the second lens group becomes large, however, there is considerable longitudinal chromatic aberration. To minimize such longitudinal chromatic aberration, the positive lens in the second lens group should satisfy condition (5).

As the upper limit of 100 to condition (5) is exceeded, materials well fit for lenses are hardly available. As the lower limit of 40 is not reached, longitudinal chromatic aberration occurring at the second lens group becomes too large. In this case, size reductions of the optical system are little achievable, because more lenses are needed for cutting back longitudinal chromatic aberration throughout the optical system.

More preferably, that positive lens should satisfy condition (5-2) because the amount of longitudinal chromatic aberration produced is more reduced.

$$45 < v_{d2} < 100 \quad (5\text{-}2)$$

Even more preferably, that positive lens should satisfy condition (5-3) because the amount of longitudinal chromatic aberration produced is much more reduced.

$$50 < v_{d2} < 100 \quad (5\text{-}3)$$

According to the 17$^{th}$ aspect of the invention, any one of the 1$^{st}$ to 16$^{th}$ zoom optical systems is further characterized in that at least one positive negative lens included in said second lens group satisfies condition (6):

$$0.3 < |f_2|/f_w < 1.3 \quad (6)$$

where $f_2$ is a focal length of the positive lens in said second lens group, and $f_w$ is a focal length of the zoom optical system at the wide-angle end.

The advantage of, and the requirement for, the 17$^{th}$ zoom optical system of the invention is now explained.

With large power imparted to the positive lens in the second lens group, a compact optical system is achievable because of a reduced amount of movement of the second lens group. As the power of the positive lens in the second lens group becomes large, however, there are considerable aberrations inclusive of longitudinal chromatic aberration, coma and astigmatism. Such aberrations are reduced by satisfying condition (6), so that a compact optical system is achievable with its satisfactory performance kept intact.

As the lower limit of 1.3 to condition (6) is exceeded, the positive power becomes too strong, resulting in increased longitudinal chromatic aberration as well as increased coma, astigmatism, etc. at the wide-angle end. As the lower limit of 0.3 to condition (6) is not reached, the positive power becomes weak, resulting in an increased amount of movement of the second lens group and, hence, failing to make the length of the lens system sufficiently short.

More preferably, that positive lens should satisfy condition (6-2) because the effective lens diameter and the length of the lens system can be more reduced while keeping satisfactory performance.

$$0.5 < |f_2|/f_w < 1 \quad (6\text{-}2)$$

Even more preferably, that positive lens should satisfy condition (6-3) because the effective lens diameter and the length of the lens system can be much more reduced while keeping satisfactory performance.

$$0.6 < |f_2|/f_w < 0.8 \quad (6\text{-}3)$$

According to the 18$^{th}$ aspect of the invention, any one of the 1$^{st}$ to 11$^{th}$, and the 13$^{th}$ to 17$^{th}$ zoom optical systems is further characterized in that said second lens group comprises at least one cemented lens.

The advantage of, and the requirement for, the 18$^{th}$ zoom optical system of the invention is now explained.

With the cemented lens in the second lens group, decentration sensitivity is minimized, and so the optical system is easier to assemble at lower costs.

According to the 19$^{th}$ aspect of the invention, any one of the 1$^{st}$ to 11$^{th}$, and the 13$^{th}$ to 18$^{th}$ zoom optical systems is further characterized in that said second lens group comprises at least one negative lens.

The advantage of, and the requirement for, the 19$^{th}$ zoom optical system of the invention is now explained.

With large power imparted to the positive lens in the second lens group, a compact optical system is achievable because of a reduced amount of movement of the second lens group. As the power of the positive lens in the second lens group becomes large, however, there are large fluctuations of longitudinal chromatic aberration with zooming. To minimize the amount of longitudinal chromatic aberration at the second lens group, the negative lens should be located in the second lens group.

According to the 20$^{th}$ aspect of the invention, the 19$^{th}$ zoom optical system is further characterized in that said negative lens is located nearest to the image side of the second lens group.

The advantage of, and the requirement for, the 20$^{th}$ zoom optical system is now explained.

With the negative lens located nearest to the image side of the second lens group, the following merits are obtained. (1) The principal points are shifted toward the first lens group side, so that the spacing between the principal points of the first lens group and the second lens group can be narrowed, leading to a reduction of the length of the lens system. (2) The magnification of the second lens group is so increased that the amount of movement of the second lens group with zooming can be reduced, again leading to a reduction of the lens system.

According to the 21$^{st}$ aspect of the invention, any one of the 1$^{st}$ to 20$^{th}$ zoom optical systems is further characterized in that said second lens group satisfies condition (7):

$$-5 < SF_{G2} < 1 \quad (7)$$

where $SF_{G2} = (r_{G21} + r_{G22})/(r_{G21} - r_{G22})$, provided that:

$SF_{G2}$ is a shaping factor of said second lens group, $r_{G21}$ is a radius of curvature of the surface nearest to the object side of said second lens group, and $r_{G22}$ is a radius of curvature of the surface nearest to the image side of said second lens group.

The advantage of, and the requirement for, the 21$^{st}$ zoom optical system of the invention is now explained.

With condition (7) satisfied by the second lens group, it is possible to decrease the positive refracting power of the image-side surface of the positive lens in the second lens group. As a result, the following merits are obtained. (1) The principal points are shifted toward the first lens group side, so that the spacing between the principal points of the first lens group and the second lens group can be narrowed, leading to a reduction of the length of the lens system. (2) The magnification of the second lens group is so increased that the amount of movement of the second lens group with zooming can be reduced, again leading to a reduction of the lens system.

As the upper limit of 1 condition (7) is exceeded, the positive refracting power of the surface nearest to the image side becomes large. This in turn causes the magnification of the second lens group to become low, ending up with a zoom ratio drop. In other words, to obtain the same zoom ratio, it is necessary to increase the amount of movement of the second lens group with zooming. As the lower limit of −5 is not reached, both astigmatism occurring at the surface nearest to the object side and coma occurring at the surface nearest to the image side become large. For correction of both such aberrations, more lenses are needed.

More preferably, that second lens group should satisfy condition (7-2) because a more compact optical system is achievable.

$$-1 < SF_{G2} < 0.5 \qquad (7\text{-}2)$$

Even more preferably, that second lens group should satisfy condition (7-3) because a much more compact optical system is achievable.

$$-0.5 < SF_{G2} < 0 \qquad (7\text{-}3)$$

According to the 22$^{nd}$ aspect of the invention, any one of the 1$^{st}$ to 21$^{st}$ zoom optical systems is further characterized in that at least one negative lens in said third lens group is fabricated of a resinous material.

The advantage of, and the requirement for, the 22$^{nd}$ zoom optical system of the invention is now explained.

Lenses of a resinous material can be fabricated at lower costs than glass lenses. Therefore, if a lens fabricated of a resinous material is used for the negative lens in the third lens group, the optical system can be assembled more inexpensively.

According to the 23$^{rd}$ aspect of the invention, any one of the 1$^{st}$ to 22$^{nd}$ zoom optical systems is further characterized in that at least one negative lens in said third lens group satisfies condition (8):

$$-1 < SF_{G3} < 10 \qquad (8)$$

where $SF_{G3} = (r_{G31} + r_{G32})/(r_{G31} - r_{G32})$, provided that:

$SF_{G3}$ is a shaping factor of the negative lens in said third lens group, $r_{G31}$ is a radius of curvature of an object-side surface of the negative lens in said third lens group, and $r_{G32}$ is a radius of curvature of an image-side surface of the negative lens in said third lens group.

The advantage of, and the requirement for, the 23$^{rd}$ zoom optical system of the invention is now explained.

With condition (8) satisfied, the principal points of the negative lens in the third lens group are shifted nearer to the object side with the result that the spacing between the principal points of the second lens group and the third lens groups can be shortened, leading to a reduction in the length of the lens system.

As the upper limit of 10 to condition (8) is exceeded, fluctuations of various aberrations inclusive of astigmatism occurring at the image-side surface become large, and as the lower limit of −1 is not reached, the principal points of the negative lens in the third lens group are shifted to the image side. For this reason, the spacing between the principal points of the second lens group and the third lens groups become wide, leading to an increase in lens length.

More preferably, that negative lens should satisfy condition (8-2), because a more compact optical system is achievable.

$$0 < SF_{G3} < 5 \qquad (8\text{-}2)$$

Even more preferably, that negative lens should satisfy condition (8-3), because a much more compact optical system is achievable.

$$1 < SF_{G3} < 2 \qquad (8\text{-}3)$$

According to the 24$^{th}$ aspect of the invention, any one of the 1$^{st}$ to 23$^{rd}$ zoom optical systems is further characterized in that at least one negative lens in said third lens group is fabricated of a material that satisfies condition (9):

$$0 < v_{d3} < 40 \qquad (9)$$

where $v_{d3}$ is an Abbe number of the negative lens in said third lens group.

The advantage of, and the requirement for, the 24$^{th}$ zoom optical system is now explained.

When the first lens group is made up of one negative lens, there is a large chromatic aberration of magnification, and there is longitudinal chromatic aberration at the second lens group as well. Insofar as condition (9) is satisfied, not just can the chromatic aberration of magnification be well corrected but the longitudinal chromatic aberration at the second lens group can also be corrected, even through the first lens group is built up of one negative lens.

As the upper limit of 40 to condition (9) is exceeded, it is impossible to cut back chromatic aberration of magnification occurring at the first lens group and longitudinal chromatic aberration produced at the second lens group. Especially when the longitudinal chromatic aberration occurring at the second lens group remains uncorrected, there are large fluctuations of longitudinal chromatic aberration with zooming, which may otherwise cause grave deterioration in the quality of an image at its central area. As the lower limit of 0 is not reached, materials well fit for lenses are hardly available.

More preferably, that negative lens should satisfy condition (9-2), because chromatic aberrations occurring at the first lens group and the second lens group can be better corrected.

$$0 < v_{d3} < 35 \qquad (9\text{-}2)$$

Even more preferably, that negative lens should satisfy condition (9-3), because chromatic aberrations occurring at the first lens group and the second lens group can be much better corrected.

$$0 < v_{d3} < 30 \qquad (9\text{-}3)$$

According to the 25$^{th}$ aspect of the invention, any one of the 1$^{st}$ to 24$^{th}$ zoom optical systems is further characterized in that at least one positive lens in said fourth lens group is fabricated of a resinous material.

The advantage of, and the requirement for, the 25$^{th}$ zoom optical system of the invention is now explained.

Lenses of a resinous material can be fabricated at lower costs than glass lenses. Therefore, if a lens fabricated of a resinous material is used for the positive lens in the fourth lens group, the optical system can be assembled more inexpensively.

According to the 26$^{th}$ aspect of the invention, any one of the 1$^{st}$ to 25$^{th}$ zoom optical systems is further characterized in that at least one positive lens in said fourth lens group satisfies condition (10):

$$-1 < SF_{G4} < 10 \qquad (10)$$

where $SF_{G4} = (r_{G41} + r_{G42})/(r_{G41} - r_{G42})$, provided that:

$SF_{G4}$ is a shaping factor of the positive lens in said fourth lens group, $r_{G41}$ is a radius of curvature of an object-side surface of the positive lens in said fourth lens group, and $r_{G42}$ is a radius of curvature of an image-side surface of the positive lens in said fourth lens group.

The advantage of, and the requirement for, the 26th zoom optical system of the invention is now explained.

To make the amount of aberrations taking place at the third lens group small, it is preferable to bring down the height of rays at the third lens group. Specifically, it is preferable for the fourth lens group to satisfy condition (10), thereby decreasing the positive refracting power of the object-side surface of that positive lens, so that the amount of coma, astigmatism, etc. occurring at that object-side surface can be minimized.

As the upper limit of 10 to condition (10) is exceeded, the negative refracting power of that object-side surface becomes too large. This in turn causes large coma, astigmatism, etc. to occur with a sign opposite to that of condition (10), and decentration sensitivity become high as well. As the lower limit of −1 is not reached, the positive refracting power of the object-side surface becomes large. This renders the amount of various aberrations produced, inclusive of coma and astigmatism, too large, resulting in the need of more lenses for correction.

More preferably, that positive lens should satisfy condition (10-2), because the amount of various aberrations produced can be more reduced.

$$0 < SF_{G4} < 7 \tag{10-2}$$

Even more preferably, that positive lens should satisfy condition (10-3), because the amount of various aberrations produced can be much more reduced.

$$1.5 < SF_{G4} < 3 \tag{10-3}$$

According to the 27th aspect of the invention, any one of the 1st to 26th zoom optical systems is further characterized in that at least one positive lens in said fourth lens group is fabricated of a material that satisfies condition (11):

$$40 < v_{d4} < 100 \tag{11}$$

where $v_{d4}$ is an Abbe number of the positive lens in said fourth lens group.

The advantage of, and the requirement for, the 27th zoom optical system is now explained.

When the first lens group is made up of one negative lens, considerable chromatic aberration of magnification is produced at the wide-angle end in particular. An attempt to make correction for this chromatic aberration of magnification with the negative refracting power of the third lens groups gives rise to overcorrection at the telephoto end. It is thus preferable for that positive lens to satisfy condition (11), thereby achieving satisfactory prevention of chromatic aberration of magnification due to overcorrection at the telephoto end.

As the upper limit of 100 to condition (11) is exceeded, materials well fit for lenses are hardly available. As the lower limit of 40 is not reached, it is impossible to prevent chromatic aberration of magnification from occurring at the telephoto end; more lenses are needed for correction.

More preferably, that positive lens should satisfy condition (11-2), because chromatic aberration of magnification can be better held back.

$$45 < v_{d4} < 100 \tag{11-2}$$

Even more preferably, that positive lens should satisfy condition (11-3), because chromatic aberration of magnification can be much better held back.

$$50 < v_{d4} < 100 \tag{11-3}$$

According to the 28th aspect of the invention, any one of the 1st to 27th zoom optical systems is further characterized by satisfying condition (12):

$$20 < |v_{d2} - v_{d3}| < 100 \tag{12}$$

where $v_{d2}$ is an Abbe number of the positive lens in said second lens group, and $v_{d3}$ is an Abbe number of the negative lens in said third lens group.

The advantage of, and the requirement for, the 28th zoom optical system of the invention is now explained.

When the first lens group is made up of one negative lens, there is large chromatic aberration of magnification, and there is longitudinal chromatic aberration occurring at the second lens group as well. It is thus preferable to satisfy condition (12), because even when the first lens group is composed of one negative lens, not just can the chromatic aberration of magnification be well corrected but it is also possible to cut back the longitudinal chromatic aberration occurring at the second lens group as well. In addition, the longitudinal chromatic aberration occurring at the second lens group can be well corrected at the third lens group.

As the upper limit of 100 to condition (12) is exceeded, materials well fit for lenses are hardly available. As the lower limit of 20 is not reached, longitudinal chromatic aberration occurring at the second lens group can never be corrected at the third lens group with the consequence that large fluctuations of longitudinal chromatic aberration with zooming incur large deterioration in the quality of an image at its central area.

It is more preferable to satisfy condition (12-2), because chromatic aberrations produced at the first lens group and the second lens group can be better corrected at the third lens group while minimizing the amount of longitudinal chromatic aberration produced at the second lens group.

$$25 < |v_{d2} - v_{d3}| < 100 \tag{12-2}$$

It is even more preferable to satisfy condition (12-3), because chromatic aberrations produced at the first lens group and the second lens group can be much better corrected at the third lens group while minimizing the amount of longitudinal chromatic aberration produced at the second lens group.

$$30 < |v_{d2} - v_{d3}| < 100 \tag{12-3}$$

According to the 29th aspect of the invention, any one of the 1st to 28th zoom optical systems is further characterized by satisfying condition (13):

$$-30 < DT_{min} < 20 \tag{13}$$

where $DT_{min}$ is a minimum amount of distortion in %.

The advantage of, and the requirement for, the 29th zoom optical system of the invention is now explained.

When distortion is electrically corrected to achieve a wide-angle arrangement, it is preferable to generate minus distortion at the wide-angle end; it is preferable to satisfy condition (13), because the wide-angle arrangement is achievable with satisfactory image quality upon electrical correction of distortion.]

As the upper limit of 20 to condition (13) is exceeded, plus distortion will occur at the wide-angle end. Thus, even though distortion is electrically corrected, any wide-angle arrangement is no longer achievable. As the lower limit of −30 is not reached, the magnification upon enlargement of the outermost periphery of an image becomes high with the result that the image becomes rough after electrical correction of distortion.

It is more preferable to satisfy condition (13-2), because the desired wide-angle arrangement is achievable without rendering the image rough.

$$-20<DT_{min}<0 \qquad (13\text{-}2)$$

It is even more preferable to satisfy condition (13-3), because the desired wide-angle arrangement is achievable without rendering the image rougher.

$$-15<DT_{min}<-5 \qquad (13\text{-}3)$$

According to the 30$^{th}$ aspect of the invention, any one of the 1$^{st}$ to 29$^{th}$ zoom optical systems is further characterized in that distortion occurring throughout the optical system is electrically corrected.

The advantage of, and the requirement for, the 30$^{th}$ zoom optical system is now explained.

An attempt to make satisfactory correction for distortion throughout the optical system requires more lenses, resulting in a size increase. Therefore, if a portion of distortion that remains uncorrected throughout the optical system is electrically corrected, the optical system can then be made more compact.

In an optical system of the retrofocus type, there is a large negative distortion at the wide-angle end. For this reason, such an optical system is likely to have a wide-angle arrangement and high magnifications upon electrical correction of image distortion.

According to the 31$^{st}$ aspect of the invention, any one of the 1$^{st}$ to 30$^{th}$ zoom optical systems is further characterized in that chromatic aberration of magnification occurring throughout the optical system is electrically corrected.

The advantage of, and the requirement for, the 31$^{st}$ zoom optical system of the invention is now explained.

When the first lens group is made up of one negative lens, there is a large chromatic aberration of magnification at the wide-angle end. An attempt to make satisfactory correction for this chromatic aberration of magnification requires more lenses, resulting in a size increase. Therefore, if a portion of distortion that remains uncorrected throughout the optical system is electrically corrected, the optical system can then be made more compact.

According to the 32$^{nd}$ aspect of the invention, any one of the 1$^{st}$ to 31$^{st}$ zoom optical systems is further characterized in that an organic-inorganic composite material is used as an optical material for at least one optical element that forms a part of the optical system.

The advantage of, and the requirement for, the 32$^{nd}$ zoom optical system is now explained.

With the organic-inorganic composite material used as the optical material for the optical element, various optical properties (refractive index, chromatic dispersion) manifest themselves (or develop) depending on the types and quantitative proportions of an organic component(s) and an inorganic component(s). Thus, if the organic component(s) and the inorganic component(s) are blended together at any desired quantitative proportion, it is then possible to achieve an optical material that has the desired or higher optical properties. In other words, it is possible to obtain an optical element of higher performance; various aberrations can be corrected with fewer such optical elements. Therefore, the optical system can be provided in a more compact form and in a more inexpensive manner.

According to the 33$^{rd}$ aspect of the invention, the 32$^{nd}$ zoom optical system is further characterized in that said organic-inorganic composite material contains a nano-particle form of zirconia.

According to the 34$^{th}$ aspect of the invention, the 32$^{nd}$ zoom optical system is further characterized in that said organic-inorganic composite material contains a nano-particle form of zirconia and alumina.

According to the 35$^{th}$ aspect of the invention, the 32$^{nd}$ zoom optical system is further characterized in that said organic-inorganic composite material contains a nano-particle form of niobium oxide.

According to the 36$^{th}$ aspect of the invention, the 32$^{nd}$ zoom optical system is further characterized in that said organic-inorganic composite material contains a nano-particle form of zirconium alkoxide hydrolysate and alumina.

The advantages of, and the requirement for, any one of the 33$^{rd}$ to 36$^{th}$ zoom optical systems is now explained.

These materials in the nano-particle form are typical inorganic components. If such nano-particles are dispersed in the organic component, e.g., a plastic component at a given quantitative proportion, various optical properties (refractive index, chromatic dispersion) can then manifest themselves.

According to the 37$^{th}$ aspect of the invention, there is provided a zoom optical system comprising, in order from an object side thereof, a first lens group having negative refracting power, a second lens group having positive refracting power, a third lens group having negative refracting power and a fourth lens group having positive refracting power, characterized in that:

said second lens group comprises one homogeneous positive lens.

With an optical arrangement that has negative refracting power, positive refracting power, negative refracting power and positive refracting power in this order as contemplated herein, it is possible to achieve an optical system having a fixed total length with a reduced number of lenses yet with a short total length. Thus, this optical system is preferable for a compact, low-cost one.

By constructing the second lens group of one negative lens according to the invention, it is possible to set up an optical system with fewer lenses and, hence, at lower costs.

By composing the second lens group of a homogeneous lens, it is also possible to make the length of the lens system shorter than that achieved using an inhomogeneous lens such as a gradient index lens.

According to the 38$^{th}$ aspect of the invention, the 37$^{th}$ zoom optical system is further characterized in that at least one negative lens included in said first lens group has an aspheric surface on an object side thereof.

The advantage of, and the requirement for, the 38$^{th}$ lens system of the invention is now explained.

In the zoom optical system of this type, light rays at the first lens group are at a high position. Here, if that negative lens has an aspheric surface on its object side, off-axis aberrations such as coma can then be well corrected.

At the telephoto end, a light beam at the first lens group has a large diameter. Here, if that negative lens has an aspheric surface on its object side, spherical or other aberrations can then be well corrected.

According to the 39$^{th}$ aspect of the invention, the 37$^{th}$ or 38$^{th}$ zoom optical systems is further characterized in that at least one negative lens included in said first lens group has an aspheric surface on an image side thereof.

The advantage of, and the requirement for, the 39$^{th}$ zoom lens system of the invention is now explained.

In the zoom optical system of this type, light rays at the first lens group are at a high position. Here, if that negative lens has an aspheric surface on its image side, off-axis aberrations such as astigmatism can then be well corrected.

According to the 40th aspect of the invention, any one of the 37th to 39th zoom optical systems is further characterized in that at least one negative lens included in said first lens group is a lens fabricated of a resinous material.

The advantage of, and the requirement for, the 40th zoom optical system of the invention is now explained. A resinous material lens can be fabricated at lower costs than glass lenses. Therefore, if a lens fabricated of a resinous material is used for the negative lens in the first lens group, the optical system becomes more inexpensive.

According to the 41st aspect of the invention, any one of the 37th to 40th zoom optical systems is further characterized in that at least one negative lens included in said first lens group is fabricated of a material that satisfies condition (14):

$$40 < v_{d1} < 100 \tag{14}$$

where $v_{d1}$ is an Abbe number of the negative lens in said first lens group.

The advantage of, and the requirement for, the 41st zoom optical system of the invention is now explained.

Since the first lens group has negative power, large chromatic aberration of magnification is produced at the wide-angle end in particular. However, when the first lens group is comprised of one negative lens, it is impossible to cut back the amount of chromatic aberration of magnification produced by locating a positive lens in the first lens group. This is the reason the negative lens in the first lens group should satisfy condition (14). Insofar as condition (14) is satisfied, the amount of chromatic aberration of magnification produced can be minimized.

A material exceeding the upper limit of 100 to condition (14) is hardly available, and as the lower limit of 40 is not reached, the amount of chromatic aberration of magnification occurring at the first lens group becomes too large. To minimize this chromatic aberration of magnification throughout the optical system, more lenses are needed, rendering cost and size reductions difficult.

Preferably for further decreases in the amount of chromatic aberration of magnification, condition (14-2) should be satisfied.

$$50 < v_{d1} < 100 \tag{14-2}$$

More preferably, condition (14-3) should be satisfied, because the amount of chromatic aberration of magnification produced can be much more reduced.

$$55 < v_{d1} < 100 \tag{14-3}$$

According to the 42nd aspect of the invention, any one of the 37th to 41st zoom optical systems is further characterized in that at least one negative lens included in said first lens group satisfies condition (15):

$$0.5 < |f_1|/f_w < 5 \tag{15}$$

where $f_1$ is a focal length of the negative lens in said first lens group, and $f_w$ is a focal length of the zoom optical system at the wide-angle end.

The advantage of, and the requirement for, the 42nd zoom optical system of the invention is now explained.

The first lens group is larger in lens diameter than the second lens group or the third lens group. Here, if the first lens group is permitted to have power, the entrance pupil is then positioned nearer to the object side, so that not just can an effective lens diameter be decreased but also the length of the lens system can be decreased. Insofar as condition (15) is satisfied, the effective lens diameter and the length of the lens system can be minimized while keeping satisfactory performance.

Exceeding the upper limit of 5 to condition (15) is not preferable for correction of aberrations, because the negative power becomes too strong, resulting in large coma occurring at the wide-angle end, and large astigmatism, etc. occurring at the telephoto end. As the lower limit of 0.5 to condition (15) is not reached, the negative power becomes weak, failing to achieve sufficient decreases in the effective diameter of lenses and the length of the lens system.

It is preferable to satisfy condition (15-2), because the effective lens diameter and the length of the lens system can be more reduced while keeping satisfactory performance.

$$1 < |f_1|/f_w < 3 \tag{15-2}$$

It is more desirable to satisfy condition (15-3), because the effective lens diameter and the length of the lens system can be much more reduced while keeping satisfactory performance.

$$1.5 < |f_1|/f_w < 2 \tag{15-3}$$

According to the 43rd aspect of the invention, any one of the 37th to 43rd zoom optical systems is further characterized in that said first lens group comprises at least one cemented lens.

The advantage of, and the requirement for, the 43rd zoom optical system of the invention is now explained.

With the cemented lens in the first lens group, decentration sensitivity is minimized, and so the optical system is easier to assemble at lower costs.

According to the 44th aspect of the invention, any one of the 37th to 43rd zoom optical systems is further characterized in that said first lens group comprises at least one positive lens.

The advantage of, and the requirement for, the 44th zoom optical system of the invention is now explained.

The first lens group is larger in lens diameter than the second lens group or the third lens group. Here, if the first lens group is permitted to have large negative refracting power, the entrance pupil is then positioned nearer to the object side, so that not just can an effective lens diameter be decreased but the length of the lens system can be decreased as well. However, to impart too large power to the negative lens in the first lens group is not preferable for correction of aberrations, because there is a large chromatic aberration of magnification. The amount of chromatic aberration of magnification occurring at the first lens group can be minimized by using a positive lens in the first lens group. It is here noted that the positive lens is of meniscus shape, and is cemented to the negative lens into a doublet. This prevents the first lens group to become bulky.

According to the 45th aspect of the invention, the 44th zoom optical system is further characterized in that said positive lens is located nearest to the image side of the first lens group.

The advantage of, and the requirement for, the 45th zoom optical system of the invention is now explained.

With the positive lens located nearest to the image side of the first lens group, it is possible to cut back fluctuations of various aberrations such as spherical aberration, coma and chromatic aberration of magnification with zooming.

According to the 46th aspect of the invention, any one of the 37th to 40th zoom optical systems is further characterized in that said first lens group satisfies condition (16):

$$-10 < SF_{G1} < 1 \tag{16}$$

where $SF_{G1} = (r_{G11} + r_{G12})/(r_{G11} - r_{G12})$, provided that:
$SF_{G1}$ is a shaping factor of said first lens group,
$r_{G11}$ is a radius of curvature of the surface nearest to the object side of said first lens group, and
$r_{G12}$ is a radius of curvature of the surface nearest to the image side of said first lens group.

The advantage of, and the requirement for, the 46th zoom optical system of the invention is now explained.

The first lens group is larger in lens diameter than the second lens group or the third lens group. Here, if the first lens group is permitted to have power, the entrance pupil is then positioned nearer to the object side, so that not just can an effective lens diameter be decreased but also the length of the lens system can be made short. Insofar as condition (16) is satisfied, the effective lens diameter can be minimized while keeping satisfactory performance.

Exceeding the upper limit of 1 to condition (16) is not preferable, because the positive power of the object-side surface becomes too large, bringing the entrance pupil position nearer to the image side and, hence, resulting in an increased effective lens diameter. Falling short of the lower limit of −10 to condition (16) is again not preferable, because the negative power of the object-side surface becomes too strong, resulting in an increase in the amount of coma occurring at the wide-angle end and astigmatism, etc. occurring at the telephoto end.

More preferably, the first lens group should satisfy condition (16-2), because the effective lens diameter is more decreased while keeping satisfactory performance.

$$-1 < SF_{G1} < 1 \tag{16-2}$$

Even more preferably, the first lens group should satisfy condition (16-3), because the effective lens diameter is much more decreased while keeping satisfactory performance.

$$-0.5 < SF_{G1} < 0.5 \tag{16-3}$$

According to the 47th aspect of the invention, any one of the 37th to 46th zoom optical systems is further characterized in that the positive lens in said second lens group has aspheric surfaces nearest to the object and image sides of said second lens group.

The advantage of, and the requirement for, the 47th zoom optical system of the invention is now explained.

At the second lens group, there is a large light beam diameter. Here, applying aspheric surfaces to both sides of the positive lens makes it possible to make satisfactory correction for spherical aberrations, etc. at the wide-angle end in particular.

According to the 48th aspect of the invention, any one of the 37th to 47th zoom optical systems is further characterized in that the positive lens in said second lens group has an aspheric surface on its image side.

The advantage of, and the requirement for, the 48th zoom optical system of the invention is now explained.

At the second lens group, there is a large light beam diameter. Here, if the positive lens has an aspheric surface on its image side, it is then possible to make satisfactory correction for spherical aberrations, etc. at the wide-angle end in particular.

With large power given to the positive lens in the second lens group, the amount of movement of the second lens group is so reduced that a compact optical system is achievable. However, as the positive lens in the second lens group has large power, considerable astigmatism, coma or other aberrations occur. Here, if the positive lens is permitted to have an aspheric surface on its image side, it is then possible to make satisfactory correction for coma, astigmatism, etc. at the wide-angle end in particular and, hence, achieve a compact optical system having reduced aberrations.

According to the 49th aspect of the invention, any one of the 37th to 48th zoom optical systems is further characterized in that the positive lens in said second lens group is fabricated of a resinous material.

The advantage of, and the requirement for, the 49th zoom optical system of the invention is now explained.

Lenses of a resinous material can be fabricated at lower costs than glass lenses. Therefore, if a lens fabricated of a resinous material is used for the positive lens in the second lens group, the optical system can be assembled more inexpensively.

According to the 50th aspect of the invention, any one of the 37th to 49th zoom optical systems is further characterized in that said second lens group satisfies condition (17):

$$-5 < SF_{G2} < 1 \tag{17}$$

where $SF_{G2} = (r_{G21} + r_{G22})/(r_{G21} - r_{G22})$, provided that:
$SF_{G2}$ is a shaping factor of said second lens group,
$r_{G21}$ is a radius of curvature of an object-side surface of the positive lens in said second lens group, and
$r_{G22}$ is a radius of curvature of an image-side surface of the positive lens in said second lens group.

The advantage of, and the requirement for, the 50th zoom optical system of the invention is now explained.

With condition (17) satisfied by the second lens group, it is possible to decrease the positive refracting power of the image-side surface of the positive lens in the second lens group. As a result, the following merits are obtained. (1) The principal points are shifted toward the first lens group side, so that the spacing between the principal points of the first lens group and the second lens group can be narrowed, leading to a reduction of the length of the lens system. (2) The magnification of the second lens group is so increased that the amount of movement of the second lens group with zooming can be reduced, again leading to a reduction of the lens system.

As the upper limit of 1 condition (17) is exceeded, the positive refracting power of the surface nearest to the image side becomes large. This in turn causes the magnification of the second lens group to become low, ending up with a zoom ratio drop. In other words, to obtain the same zoom ratio, it is necessary to increase the amount of movement of the second lens group with zooming. As the lower limit of −5 is not reached, both astigmatism occurring at the surface nearest to the object side and coma occurring at the surface nearest to the image side become large. For correction of both such aberrations, more lenses are needed.

More preferably, that second lens group should satisfy condition (17-2) because a more compact optical system is achievable.

$$-1 < SF_{G2} < 0.5 \tag{17-2}$$

Even more preferably, that second lens group should satisfy condition (17-3) because a much more compact optical system is achievable.

$$-0.5 < SF_{G2} < 0 \tag{17-3}$$

According to the 51st aspect of the invention, any one of the 37th to 50th zoom optical systems is further characterized in that the positive lens in said second lens group is fabricated of a material that satisfies condition (18):

$$40 < \nu_{d2} < 100 \tag{18}$$

where $\nu_{d2}$ is an Abbe number of the positive lens in said second lens group.

The advantage of, and the requirement for, the 51$^{st}$ zoom optical system of the invention is now explained.

With large power imparted to the positive lens in the second lens group, a compact optical system is achievable because of a reduced amount of movement of the second lens group. As the power of the positive lens in the second lens group becomes large, however, there is considerable longitudinal chromatic aberration. To minimize such longitudinal chromatic aberration, the positive lens in the second lens group should satisfy condition (18).

As the upper limit of 100 to condition (18) is exceeded, materials well fit for lenses are hardly available. As the lower limit of 40 is not reached, longitudinal chromatic aberration occurring at the second lens group becomes too large. In this case, size reductions of the optical system are little achievable, because more lenses are needed for cutting back longitudinal chromatic aberration throughout the optical system.

More preferably, that positive lens should satisfy condition (18-2) because the amount of longitudinal chromatic aberration produced is more reduced.

$$45 < \nu_{d2} < 100 \tag{18-2}$$

Even more preferably, that positive lens should satisfy condition (18-3) because the amount of longitudinal chromatic aberration produced is much more reduced.

$$50 < \nu_{d2} < 100 \tag{18-3}$$

According to the 52$^{nd}$ aspect of the invention, any one of the 37$^{th}$ to 51$^{st}$ zoom optical systems is further characterized in that the positive negative lens in said second lens group satisfies condition (19):

$$0.3 < |f_2|/f_w < 1.3 \tag{19}$$

where $f_2$ is a focal length of the positive lens in said second lens group, and $f_w$ is a focal length of the zoom optical system at the wide-angle end.

The advantage of, and the requirement for, the 52$^{nd}$ zoom optical system of the invention is now explained.

With large power imparted to the positive lens in the second lens group, a compact optical system is achievable because of a reduced amount of movement of the second lens group. As the power of the positive lens in the second lens group becomes large, however, there are considerable aberrations inclusive of longitudinal chromatic aberration, coma and astigmatism. Such aberrations are reduced by satisfying condition (19), so that a compact optical system is achievable with its satisfactory performance kept intact.

As the lower limit of 1.3 to condition (19) is exceeded, the positive power becomes too strong, resulting in increased longitudinal chromatic aberration as well as increased coma, astigmatism, etc. at the wide-angle end. As the lower limit of 0.3 to condition (19) is not reached, the positive power becomes weak, resulting in an increased amount of movement of the second lens group and, hence, failing to make the length of the lens system sufficiently short.

More preferably, that positive lens should satisfy condition (19-2) because the effective lens diameter and the length of the lens system can be reduced while keeping satisfactory performance.

$$0.5 < |f_2|/f_w < 1 \tag{19-2}$$

Even more preferably, that positive lens should satisfy condition (19-3) because the effective lens diameter and the length of the lens system can be more reduced while keeping satisfactory performance.

$$0.6 < |f_2|/f_w < 0.8 \tag{19-3}$$

According to the 53$^{rd}$ aspect of the invention, any one of the 37$^{th}$ to 52$^{nd}$ zoom optical systems is further characterized in that at least one negative lens included in said third lens group is fabricated of a resinous material.

The advantage of, and the requirement for, the 53$^{rd}$ zoom optical system of the invention is now explained.

Lenses of a resinous material can be fabricated at lower costs than glass lenses. Therefore, if a lens fabricated of a resinous material is used for the negative lens in the third lens group, the optical system can be assembled more inexpensively.

According to the 54$^{th}$ aspect of the invention, any one of the 37$^{th}$ to 53$^{rd}$ zoom optical systems is further characterized in that at least one negative lens in said third lens group satisfies condition (20):

$$-1 < SF_{G3} < 10 \tag{20}$$

where $SF_{G3} = (r_{G31} + r_{G32})/(r_{G31} - r_{G32})$, provided that:

$SF_{G3}$ is a shaping factor of the negative lens in said third lens group, $r_{G31}$ is a radius of curvature of an object-side surface of the negative lens in said third lens group, and $r_{G32}$ is a radius of curvature of an image-side surface of the negative lens in said third lens group.

The advantage of, and the requirement for, the 54$^{th}$ zoom optical system of the invention is now explained.

With condition (20) satisfied, the principal points of the negative lens in the third lens group are shifted nearer to the object side with the result that the spacing between the principal points of the second lens group and the third lens groups can be shortened, leading to a reduction in the length of the lens system.

As the upper limit of 10 to condition (20) is exceeded, fluctuations of various aberrations inclusive of astigmatism occurring at the image-side surface become large, and as the lower limit of −1 is not reached, the principal points of the negative lens in the third lens group are shifted to the image side. For this reason, the spacing between the principal points of the second lens group and the third lens groups become wide, leading to an increase in lens length.

More preferably, that that negative lens should satisfy condition (20-2), because a more compact optical system is achievable.

$$0 < SF_{G3} < 5 \tag{20-2}$$

Even more preferably, that negative lens should satisfy condition (20-3), because a much more compact optical system is achievable.

$$1 < SF_{G3} < 2 \tag{20-3}$$

According to the 55$^{th}$ aspect of the invention, any one of the 37$^{th}$ to 54$^{th}$ zoom optical systems is further characterized in that at least one negative lens in said third lens group is fabricated of a material that satisfies condition (21):

$$0 < \nu_{d3} < 40 \tag{21}$$

where $\nu_{d3}$ is an Abbe number of the negative lens in said third lens group.

The advantage of, and the requirement for, the 55th zoom optical system is now explained.

When the first lens group is made up of one negative lens, there is large chromatic aberration of magnification, and there is longitudinal chromatic aberration at the second lens group as well. Insofar as condition (21) is satisfied, not just can the chromatic aberration of magnification be well corrected but the longitudinal chromatic aberration at the second lens group can also be corrected, even through the first lens group is built up of one negative lens.

As the upper limit of 40 to condition (21) is exceeded, it is impossible to cut back chromatic aberration of magnification occurring at the first lens group and longitudinal chromatic aberration produced at the second lens group. Especially when the longitudinal chromatic aberration occurring at the second lens group remains uncorrected, there are large fluctuations of longitudinal chromatic aberration with zooming, which may otherwise cause grave deterioration in the quality of an image at its central area. As the lower limit of 0 is not reached, materials well fit for lenses are hardly available.

More preferably, that negative lens should satisfy condition (21-2), because chromatic aberrations occurring at the first lens group and the second lens group can be better corrected.

$$0<v_{d3}<35 \qquad (21\text{-}2)$$

Even more preferably, that negative lens should satisfy condition (21-3), because chromatic aberrations occurring at the first lens group and the second lens group can be much better corrected.

$$0<v_{d3}<30 \qquad (21\text{-}3)$$

According to the 56th aspect of the invention, any one of the 37th to 55th zoom optical systems is further characterized in that at least one positive lens included in said fourth lens group is fabricated of a resinous material.

The advantage of, and the requirement for, the 56th zoom optical system of the invention is now explained.

Lenses of a resinous material can be fabricated at lower costs than glass lenses. Therefore, if a lens fabricated of a resinous material is used for the positive lens in the fourth lens group, the optical system can be assembled more inexpensively.

According to the 57th aspect of the invention, any one of the 37th to 56th zoom optical systems is further characterized in that at least one positive lens in said fourth lens group satisfies condition (22):

$$-1<SF_{G4}<10 \qquad (22)$$

where $SF_{G4}=(r_{G41}+r_{G42})/(r_{G41}-r_{G42})$, provided that:

$SF_{G4}$ is a shaping factor of the positive lens in said fourth lens group, $r_{G41}$ is a radius of curvature of an object-side surface of the positive lens in said fourth lens group, and $r_{G42}$ is a radius of curvature of an image-side surface of the positive lens in said fourth lens group.

The advantage of, and the requirement for, the 57th zoom optical system of the invention is now explained.

To make the amount of aberrations taking place at the third lens group small, it is preferable to bring down the height of rays at the third lens group. Specifically, it is preferable for the fourth lens group to satisfy condition (22), thereby decreasing the positive refracting power of the object-side surface of that positive lens, so that the amount of coma, astigmatism, etc. occurring at that object-side surface can be minimized.

As the upper limit of 10 to condition (22) is exceeded, the negative refracting power of that object-side surface becomes too large. This in turn causes large coma, astigmatism, etc. to occur with a sign opposite to that of condition (22), and decentration sensitivity to become high as well. As the lower limit of −1 is not reached, the positive refracting power of the object-side surface becomes large. This renders the amount of various aberrations produced, inclusive of coma and astigmatism, too large to need more lenses for correction.

More preferably, that positive lens should satisfy condition (22-2), because the amount of various aberrations produced can be more reduced.

$$0<SF_{G4}<7 \qquad (22\text{-}2)$$

Even more preferably, that positive lens should satisfy condition (22-3), because the amount of various aberrations produced can be much more reduced.

$$1.5<SF_{G4}<3 \qquad (22\text{-}3)$$

According to the 58th aspect of the invention, any one of the 37th to 57th zoom optical systems is further characterized in that at least one positive lens in said fourth lens group is fabricated of a material that satisfies condition (23):

$$40<v_{d4}<100 \qquad (23)$$

where $v_{d4}$ is an Abbe number of the positive lens in said fourth lens group.

The advantage of, and the requirement for, the 58th zoom optical system is now explained.

When the first lens group is made up of one negative lens, considerable chromatic aberration of magnification is produced at the wide-angle end in particular. An attempt to make correction for this chromatic aberration of magnification with the negative refracting power of the third lens groups gives rise to overcorrection at the telephoto end. It is thus preferable for that positive lens to satisfy condition (23), thereby achieving satisfactory prevention of chromatic aberration of magnification due to overcorrection at the telephoto end.

As the upper limit of 100 to condition (23) is exceeded, materials well fit for lenses are hardly available. As the lower limit of 40 is not reached, it is impossible to prevent chromatic aberration of magnification from occurring at the telephoto end; more lenses are needed for correction.

More preferably, that positive lens should satisfy condition (23-2), because chromatic aberration of magnification can be better held back.

$$45<v_{d4}<100 \qquad (23\text{-}2)$$

Even more preferably, that positive lens should satisfy condition (23-3), because chromatic aberration of magnification can be much better held back.

$$50<v_{d4}<100 \qquad (23\text{-}3)$$

According to the 59th aspect of the invention, any one of the 37th to 58th zoom optical systems is further characterized by satisfying condition (24):

$$-30<DT_{min}<20 \qquad (24)$$

where $DT_{min}$ is a minimum amount of distortion in %.

The advantage of, and the requirement for, the 59th zoom optical system of the invention is now explained.

When distortion is electrically corrected to achieve a wide-angle arrangement, it is preferable to generate minus distortion at the wide-angle end; it is preferable to satisfy condition (24), because the wide-angle arrangement is achievable with satisfactory image quality upon electrical correction of distortion.]

As the upper limit of 20 to condition (24) is exceeded, plus distortion occurs practically at the wide-angle end. Thus, even though distortion is electrically corrected, any wide-angle arrangement is no longer achievable. As the lower limit of −30 is not reached, the magnification upon enlargement of the outermost periphery of an image becomes high with the result that the image becomes rough after electrical correction of distortion.

It is more preferable to satisfy condition (24-2), because the desired wide-angle arrangement is achievable without rendering the image rough.

$$-20 < DT_{min} < 0 \tag{24-2}$$

It is even more preferable to satisfy condition (24-3), because the desired wide-angle arrangement is achievable without rendering the image rougher.

$$-15 < DT_{min} < -5 \tag{24-3}$$

According to the $60^{th}$ aspect of the invention, any one of the $37^{th}$ to $59^{th}$ zoom optical systems is further characterized in that distortion occurring throughout the optical system is electrically corrected.

The advantage of, and the requirement for, the $60^{th}$ zoom optical system is now explained.

An attempt to make satisfactory correction for distortion throughout the optical system requires more lenses, resulting in a size increase. Therefore, if a portion of distortion that remains uncorrected throughout the optical system is electrically corrected, the optical system can then be made more compact.

In an optical system of the retrofocus type, there is large negative distortion at the wide-angle end. For this reason, such an optical system is likely to have a wide-angle arrangement and high magnifications upon electrical correction of image distortion.

According to the $61^{st}$ aspect of the invention, any one of the $37^{th}$ to $60^{th}$ zoom optical systems is further characterized in that chromatic aberration of magnification occurring throughout the optical system is electrically corrected.

The advantage of, and the requirement for, the $61^{st}$ zoom optical system of the invention is now explained.

When the first lens group is made up of one negative lens, there is large chromatic aberration of magnification at the wide-angle end. An attempt to make satisfactory correction for this chromatic aberration of magnification requires more lenses, resulting in a size increase. Therefore, if a portion of distortion that remains uncorrected throughout the optical system is electrically corrected, the optical system can then be made more compact.

According to the $62^{nd}$ aspect of the invention, any one of the $37^{th}$ to $61^{st}$ zoom optical systems is further characterized in that an organic-inorganic composite material is used as an optical material for at least one optical element that forms a part of the optical system.

The advantage of, and the requirement for, the $62^{nd}$ zoom optical system is now explained.

With the organic-inorganic composite material used as the optical material for the optical element, various optical properties (refractive index, chromatic dispersion) manifest themselves (or develop) depending on the types, and proportions of existence, of an organic component(s) and an inorganic component(s). Thus, if the organic component(s) and the inorganic component(s) are blended together at any desired proportion, it is then possible to achieve an optical material that has the desired or higher optical properties. In other words, it is possible to obtain an optical element of higher performance; various aberrations can be corrected with fewer such optical elements. Therefore, the optical system can be provided in a more compact form and in a more inexpensive manner.

According to the $63^{rd}$ aspect of the invention, the $62^{nd}$ zoom optical system is further characterized in that said organic-inorganic composite material contains a nano-particle form of zirconia.

According to the $64^{th}$ aspect of the invention, the $62^{nd}$ zoom optical system is further characterized in that said organic-inorganic composite material contains a nano-particle form of zirconia and alumina.

According to the $65^{th}$ aspect of the invention, the $62^{nd}$ zoom optical system is further characterized in that said organic-inorganic composite material contains a nano-particle form of niobium oxide.

According to the $66^{th}$ aspect of the invention, the $62^{nd}$ zoom optical system is further characterized in that said organic-inorganic composite material contains a nano-particle form of zirconium alkoxide hydrolysate and alumina.

The advantages of, and the requirement for, any one of the $63^{rd}$ to $66^{th}$ zoom optical systems is now explained.

These materials in the nano-particle form are typical inorganic components. If such nano-particles are dispersed in the organic component, e.g., a plastic component at a given quantitative proportion, various optical properties (refractive index, chromatic dispersion) can then manifest themselves.

According to the $67^{th}$ aspect of the invention, there is provided a zoom optical system comprising, in order from an object side thereof, a first lens group having negative refracting power, a second lens group having positive refracting power, a third lens group having negative refracting power and a fourth lens group having positive refracting power, characterized in that:

said first lens group and said third lens group each comprise one negative lens.

The advantage of, the requirement for, the $67^{th}$ zoom optical system of the invention is now explained.

With an optical arrangement that has negative refracting power, positive refracting power, negative refracting power and positive refracting power in this order as contemplated herein, it is possible to achieve an optical system having a fixed total length with a reduced number of lenses yet with a short total length. Thus, this optical system is preferable for a compact, low-cost one.

By constructing the first lens group of one negative lens according to the invention, it is possible to set up an optical system with fewer lenses and, hence, at lower costs.

Further, since the third lens group comprises one negative lens, the optical system can be assembled with fewer lenses and, hence, at lower costs.

Furthermore, since the third lens group comprises one negative lens, moving groups including a lens barrel can be so reduced in weight that the moving groups can be smoothly moved for zooming or focusing.

Referring more to such a zoom optical system as contemplated herein, for instance, the second lens group and the third lens group are moved for the purpose of zooming from the wide-angle end to the telephoto end. Specifically, both the lens groups are moved while varying slightly the spacing between them. Of course, it is acceptable to move at least one of the first and fourth lens groups as well.

According to the 68th aspect of the invention, the 67th zoom optical system is further characterized in that the negative lens in said first lens group has an aspheric surface on an object side thereof.

The advantage of, and the requirement for, the 68th zoom lens system of the invention is now explained.

In the zoom optical system of this type, light rays at the first lens group are at a high position. Here, if that negative lens has an aspheric surface on its object side, off-axis aberrations such as coma can then be well corrected.

At the telephoto end, a light beam at the first lens group has a large diameter. Here, if that negative lens has an aspheric surface on its object side, spherical or other aberrations can then conveniently be corrected.

According to the 69th aspect of the invention, the 67th or 68th zoom optical systems is further characterized in that the negative lens in said first lens group has an aspheric surface on an image side thereof.

The advantage of, and the requirement for, the 69th zoom lens system of the invention is now explained.

In the zoom optical system of this type, light rays at the first lens group are at a high position. Here, if that negative lens has an aspheric surface on its image side, off-axis aberrations such as astigmatism can then be well corrected.

According to the 70th aspect of the invention, any one of the 67th to 69th zoom optical systems is further characterized in that the negative lens in said first lens group is a lens fabricated of a resinous material.

The advantage of, and the requirement for, the 70th zoom optical system of the invention is now explained. A resinous material lens can be fabricated at lower costs than glass lenses. Therefore, if a lens fabricated of a resinous material is used for the negative lens in the first lens group, the optical system becomes more inexpensive.

According to the 71st aspect of the invention, any one of the 67th to 70th zoom optical systems is further characterized in that said first lens group satisfies condition (25):

$$-5 < SF_{G1} < 5 \quad (25)$$

where $SF_{G1} = (r_{G11} + r_{G12})/(r_{G11} - r_{G12})$, provided that:

$SF_{G1}$ is a shaping factor of the negative lens in said first lens group, $r_{G11}$ is a radius of curvature of an object-side surface of the negative lens in said first lens group, and $r_{G12}$ is a radius of curvature of an image-side surface of the negative lens in said first lens group.

The advantage of, and the requirement for, the 71st zoom optical system of the invention is now explained.

The first lens group is larger in lens diameter than the second lens group or the third lens group. Here, if the first lens group is permitted to have power, the entrance pupil is then positioned nearer to the object side, so that not just can an effective lens diameter be decreased but also the length of the lens system can be made short. Insofar as condition (25) is satisfied, the effective lens diameter can be minimized while keeping satisfactory performance.

Exceeding the upper limit of 1 to condition (25) is not preferable, because the positive power of the object-side surface becomes too large, bringing the entrance pupil position nearer to the image side and, hence, resulting in an increased effective lens diameter. Falling short of the lower limit of −10 to condition (25) is again not preferable, because the negative power of the object-side surface becomes too strong, resulting in an increase in the amount of coma occurring at the wide-angle end and astigmatism, etc. occurring at the telephoto end.

More preferably, that negative lens should satisfy condition (25-2), because the effective lens diameter is more decreased while keeping satisfactory performance.

$$-1 < SF_{G1} < 1 \quad (25-2)$$

Even more preferably, that negative lens should satisfy condition (25-3), because the effective lens diameter is much more decreased while keeping satisfactory performance.

$$-0.5 < SF_{G1} < 0.5 \quad (25-3)$$

According to the 72nd aspect of the invention, any one of the 67th to 71st zoom optical systems is further characterized in that the negative lens in said first lens group is fabricated of a material that satisfies condition (26):

$$40 < v_{d1} < 100 \quad (26)$$

where $v_{d1}$ is an Abbe number of the negative lens in said first lens group.

The advantage of, and the requirement for, the 72nd zoom optical system of the invention is now explained.

Since the first lens group has negative power, large chromatic aberration of magnification is produced at the wide-angle end in particular. However, when the first lens group is comprised of one negative lens, it is impossible to cut back the amount of chromatic aberration of magnification produced by locating a positive lens in the first lens group. This is the reason the negative lens in the first lens group should satisfy condition (2). Insofar as condition (26) is satisfied, the amount of chromatic aberration of magnification produced can be minimized.

A material exceeding the upper limit of 100 to condition (26) is hardly available, and as the lower limit of 40 is not reached, the amount of chromatic aberration of magnification occurring at the first lens group becomes too large. To minimize this chromatic aberration of magnification throughout the optical system, more lenses are needed, rendering cost and size reductions difficult.

Preferably for further decreases in the amount of chromatic aberration of magnification, condition (26-2) should be satisfied.

$$50 < v_{d1} < 100 \quad (26-2)$$

More preferably, condition (26-3) should be satisfied, because the amount of chromatic aberration of magnification produced can be much more reduced.

$$55 < v_{d1} < 100 \quad (26-3)$$

According to the 73rd aspect of the invention, any one of the 67th to 72nd zoom optical systems is further characterized in that the negative lens in said first lens group satisfies condition (27):

$$0.5 < |f_1|/f_w < 5 \quad (27)$$

where $f_1$ is a focal length of the negative lens in said first lens group, and $f_w$ is a focal length of the zoom optical system at the wide-angle end.

The advantage of, and the requirement for, the 73rd zoom optical system of the invention is now explained.

The first lens group is larger in lens diameter than the second lens group or the third lens group. Here, if the first lens group is permitted to have power, the entrance pupil is then positioned nearer to the object side, so that not just can an effective lens diameter be decreased but also the length of the lens system can be decreased. If condition (27) is satisfied in this state, the effective lens diameter and the length of the lens system can be minimized while keeping satisfactory performance.

Exceeding the upper limit of 5 to condition (27) is not preferable for correction of aberrations, because the negative power becomes too strong, resulting in large coma occurring at the wide-angle end, and large astigmatism, etc. occurring at the telephoto end. As the lower limit of 0.5 to condition (27) is not reached, the negative power becomes weak, failing to achieve sufficient decreases in the effective diameter of lenses and the length of the lens system.

It is preferable to satisfy condition (27-2), because the lens effective diameter and the length of the lens system can be more reduced while keeping satisfactory performance.

$$1<|f_1|/f_w<3 \qquad (27\text{-}2)$$

It is more desirable to satisfy condition (27-3), because the lens effective diameter and the length of the lens system can be much more reduced while keeping satisfactory performance.

$$1.5<|f_1|/f_w<2 \qquad (27\text{-}3)$$

According to the 74$^{th}$ aspect of the invention, any one of the 67$^{th}$ to 73$^{rd}$ zoom optical systems is further characterized in that at least one positive lens included in said second lens group has an aspheric surface on its object side.

The advantage of, and the requirement for, the 74$^{th}$ zoom optical system of the invention is now explained.

At the second lens group, there is a large light beam diameter. Here, if the positive lens has an aspheric surface on its object side, it is then possible to make satisfactory correction for spherical aberrations, etc. at the wide-angle end in particular.

According to the 75$^{th}$ aspect of the invention, any one of the 67$^{th}$ to 74$^{th}$ zoom optical systems is further characterized in that at least one positive lens included in said second lens group has an aspheric surface on its image side.

The advantage of, and the requirement for, the 75$^{th}$ zoom optical system of the invention is now explained.

At the second lens group, there is a large light beam diameter. Here, if the positive lens has an aspheric surface on its image side, it is then possible to make satisfactory correction for spherical aberrations, etc. at the wide-angle end in particular.

With large power given to the positive lens in the second lens group, the amount of movement of the second lens group is so reduced that a compact optical system is achievable. However, as the positive lens in the second lens group has large power, considerable astigmatism, coma or other aberrations occur. Here, if the positive lens is permitted to have an aspheric surface on its image side, it is then possible to make satisfactory correction for coma, astigmatism, etc. at the wide-angle end in particular and, hence, achieve a compact optical system having reduced aberrations.

According to the 76$^{th}$ aspect of the invention, any one of the 67$^{th}$ to 75$^{th}$ zoom optical systems is further characterized in that at least one positive lens included in said second lens group is fabricated of a resinous material.

The advantage of, and the requirement for, the 76$^{th}$ zoom optical system of the invention is now explained.

Lenses of a resinous material can be fabricated at lower costs than glass lenses. Therefore, if a lens fabricated of a resinous material is used for the positive lens in the second lens group, the optical system can be assembled more inexpensively.

According to the 77$^{th}$ aspect of the invention, any one of the 67$^{th}$ to 76$^{th}$ zoom optical systems is further characterized in that at least one positive lens included in said second lens group is fabricated of a material that satisfies condition (28):

$$40<\nu_{d2}<100 \qquad (28)$$

where $\nu_{d2}$ is an Abbe number of the positive lens in said second lens group.

The advantage of, and the requirement for, the 77$^{th}$ zoom optical system of the invention is now explained.

With large power imparted to the positive lens in the second lens group, a compact optical system is achievable because of a reduced amount of movement of the second lens group. As the power of the positive lens in the second lens group becomes large, however, there is considerable longitudinal chromatic aberration. To minimize such longitudinal chromatic aberration, the positive lens in the second lens group should satisfy condition (28).

As the upper limit of 100 to condition (28) is exceeded, materials well fit for lenses are hardly available. As the lower limit of 40 is not reached, longitudinal chromatic aberration occurring at the second lens group becomes too large. In this case, size reductions of the optical system are little achievable, because more lenses are needed for cutting back longitudinal chromatic aberration throughout the optical system.

More preferably, that positive lens should satisfy condition (28-2) because the amount of longitudinal chromatic aberration produced is more reduced.

$$45<\nu_{d2}<100 \qquad (28\text{-}2)$$

Even more preferably, that positive lens should satisfy condition (28-3) because the amount of longitudinal chromatic aberration produced is more reduced.

$$50<\nu_{d2}<100 \qquad (28\text{-}3)$$

According to the 78$^{th}$ aspect of the invention, any one of the 67$^{th}$ to 77$^{th}$ zoom optical systems is further characterized in that at least one positive negative lens included in said second lens group satisfies condition (29):

$$0.3<|f_2|/f<1.3 \qquad (29)$$

where $f_2$ is a focal length of the positive lens in said second lens group, and $f_w$ is a focal length of the zoom optical system at the wide-angle end.

The advantage of, and the requirement for, the 78$^{th}$ zoom optical system of the invention is now explained.

With large power imparted to the positive lens in the second lens group, a compact optical system is achievable because of a reduced amount of movement of the second lens group. As the power of the positive lens in the second lens group becomes large, however, there are considerable aberrations inclusive of longitudinal chromatic aberration, coma and astigmatism. Such aberrations are reduced by satisfying condition (29), so that a compact optical system is achievable with its satisfactory performance kept intact.

As the lower limit of 1.3 to condition (29) is exceeded, the positive power becomes too strong, resulting in increased longitudinal chromatic aberration as well as increased coma, astigmatism, etc. at the wide-angle end. As the lower limit of 0.3 to condition (29) is not reached, the positive power becomes weak, resulting in an increased amount of movement of the second lens group and, hence, failing to make the length of the lens system sufficiently short.

More preferably, that positive lens should satisfy condition (29-2) because the effective lens diameter and the length of the lens system can be reduced while keeping satisfactory performance.

$$0.5<|f_2|/f_w<1 \tag{29-2}$$

Even more preferably, that positive lens should satisfy condition (29-3) because the effective lens diameter and the length of the lens system can be reduced while keeping satisfactory performance.

$$0.6<|f_2|/f_w<0.8 \tag{29-3}$$

According to the 79$^{th}$ aspect of the invention, any one of the 67$^{th}$ to 78$^{th}$ zoom optical systems is further characterized in that said second lens group comprises at least one cemented lens.

The advantage of, and the requirement for, the 79$^{th}$ zoom optical system of the invention is now explained.

With the cemented lens in the second lens group, decentration sensitivity is minimized, and so the optical system is easier to assemble at lower costs.

According to the 80$^{th}$ aspect of the invention, any one of the 67$^{th}$ to 79$^{th}$ zoom optical systems is further characterized in that said second lens group comprises at least one negative lens.

The advantage of, and the requirement for, the 80$^{th}$ zoom optical system of the invention is now explained.

With large power imparted to the positive lens in the second lens group, a compact optical system is achievable because of a reduced amount of movement of the second lens group. As the power of the positive lens in the second lens group becomes large, however, there are large fluctuations of longitudinal chromatic aberration with zooming. To minimize the amount of longitudinal chromatic aberration at the second lens group, the negative lens should be located in the second lens group.

According to the 81$^{st}$ aspect of the invention, the 80$^{th}$ zoom optical system is further characterized in that said negative lens is located nearest to the image side of the second lens group.

The advantage of, and the requirement for, the 81$^{st}$ zoom optical system is now explained.

With the negative lens located nearest to the image side of the second lens group, the following merits are obtained. (1) The principal points are shifted toward the first lens group side, so that the spacing between the principal points of the first lens group and the second lens group can be narrowed, leading to a reduction of the length of the lens system. (2) The magnification of the second lens group is so increased that the amount of movement of the second lens group with zooming can be reduced, again leading to a reduction of the lens system.

According to the 82$^{nd}$ aspect of the invention, any one of the 67$^{th}$ to 81$^{st}$ zoom optical systems is further characterized in that said second lens group satisfies condition (30):

$$-5<SF_{G2}<1 \tag{30}$$

where $SF_{G2}=(r_{G21}+r_{G22})/(r_{G21}-r_{G22})$, provided that:

$SF_{G2}$ is a shaping factor of said second lens group, $r_{G21}$ is a radius of curvature of the surface nearest to the object side of said second lens group, and $r_{G22}$ is a radius of curvature of the surface nearest to the image side of said second lens group.

The advantage of, and the requirement for, the 82$^{nd}$ zoom optical system of the invention is now explained.

With condition (30) satisfied by the second lens group, it is possible to decrease the positive refracting power of the image-side surface of the positive lens in the second lens group. As a result, the following merits are obtained. (1) The principal points are shifted toward the first lens group side, so that the spacing between the principal points of the first lens group and the second lens group can be narrowed, leading to a reduction of the length of the lens system. (2) The magnification of the second lens group is so increased that the amount of movement of the second lens group with zooming can be reduced, again leading to a reduction of the lens system.

As the upper limit of 1 condition (30) is exceeded, the positive refracting power of the surface nearest to the image side becomes large. This in turn causes the magnification of the second lens group to become low, ending up with a zoom ratio drop. In other words, to obtain the same zoom ratio, it is necessary to increase the amount of movement of the second lens group with zooming. As the lower limit of −5 is not reached, both astigmatism occurring at the surface nearest to the object side and coma occurring at the surface nearest to the image side become large. For correction of both such aberrations, more lenses are needed.

More preferably, that second lens group should satisfy condition (30-2) because a more compact optical system is achievable.

$$-1<SF_{G2}<0.5 \tag{30-2}$$

Even more preferably, that second lens group should satisfy condition (30-3) because a much more compact optical system is achievable.

$$-0.5<SF_{G2}<0 \tag{30-3}$$

According to the 83$^{rd}$ aspect of the invention, any one of the 67$^{th}$ to 82$^{nd}$ zoom optical systems is further characterized in that at least one negative lens in said third lens group is fabricated of a resinous material.

The advantage of, and the requirement for, the 83$^{rd}$ zoom optical system of the invention is now explained.

Lenses of a resinous material can be fabricated at lower costs than glass lenses. Therefore, if a lens fabricated of a resinous material is used for the negative lens in the third lens group, the optical system can be assembled more inexpensively.

According to the 84$^{th}$ aspect of the invention, any one of the 67$^{th}$ to 83$^{rd}$ zoom optical systems is further characterized in that at least one negative lens in said third lens group satisfies condition (31):

$$-1<SF_3<10 \tag{31}$$

where $SF_3=(r_{31}+r_{32})/(r_{31}-r_{32})$, provided that:

$SF_3$ is a shaping factor of the negative lens in said third lens group, $r_{31}$ is a radius of curvature of an object-side surface of the negative lens in said third lens group, and $r_{32}$ is a radius of curvature of an image-side surface of the negative lens in said third lens group.

The advantage of, and the requirement for, the 84$^{th}$ zoom optical system of the invention is now explained.

With condition (31) satisfied, the principal points of the negative lens in the third lens group are shifted nearer to the object side with the result that the spacing between the principal points of the second lens group and the third lens groups can be shortened, leading to a reduction in the length of the lens system.

As the upper limit of 10 to condition (31) is exceeded, fluctuations of various aberrations inclusive of astigmatism occurring at the image-side surface become large, and as the lower limit of −1 is not reached, the principal points of the negative lens in the third lens group are shifted to the image side. For this reason, the spacing between the principal points of the second lens group and the third lens groups become wide, leading to an increase in lens length.

More preferably, that third lens should satisfy condition (31-2), because a more compact optical system is achievable.

$$0 < SF_3 < 5 \quad (31\text{-}2)$$

Even more preferably, that third lens should satisfy condition (31-3), because a much more compact optical system is achievable.

$$1 < SF_3 < 2 \quad (31\text{-}3)$$

According to the 85$^{th}$ aspect of the invention, any one of the 67$^{th}$ to 84$^{th}$ zoom optical systems is further characterized in that at least one negative lens in said third lens group is fabricated of a material that satisfies condition (32):

$$0 < \nu_{d3} < 40 \quad (32)$$

where $\nu_{d3}$ is an Abbe number of the negative lens in said third lens group.

The advantage of, and the requirement for, the 85$^{th}$ zoom optical system is now explained.

When the first lens group is made up of one negative lens, there is large chromatic aberration of magnification, and there is longitudinal chromatic aberration at the second lens group as well. Insofar as condition (32) is satisfied, not just can the chromatic aberration of magnification be well corrected but the longitudinal chromatic aberration at the second lens group can also be corrected, even through the first lens group is built up of one negative lens.

As the upper limit of 40 to condition (32) is exceeded, it is impossible to cut back chromatic aberration of magnification occurring at the first lens group and longitudinal chromatic aberration produced at the second lens group. Especially when the longitudinal chromatic aberration occurring at the second lens group remains uncorrected, there are large fluctuations of longitudinal chromatic aberration with zooming, which may otherwise cause grave deterioration in the quality of an image at its central area. As the lower limit of 0 is not reached, materials well fit for lenses are hardly available.

More preferably, that negative lens should satisfy condition (32-2), because chromatic aberrations occurring at the first lens group and the second lens group can be better corrected.

$$0 < \nu_{d3} < 35 \quad (32\text{-}2)$$

Even more preferably, that negative lens should satisfy condition (32-3), because chromatic aberrations occurring at the first lens group and the second lens group can be much better corrected.

$$0 < \nu_{d3} < 30 \quad (32\text{-}3)$$

According to the 86$^{th}$ aspect of the invention, any one of the 67$^{th}$ to 85$^{th}$ zoom optical systems is further characterized in that at least one positive lens included in said fourth lens group is fabricated of a resinous material.

The advantage of, and the requirement for, the 86$^{th}$ zoom optical system of the invention is now explained.

Lenses of a resinous material can be fabricated at lower costs than glass lenses. Therefore, if a lens fabricated of a resinous material is used for the positive lens in the fourth lens group, the optical system can be assembled more inexpensively.

According to the 87$^{th}$ aspect of the invention, any one of the 67$^{th}$ to 86$^{th}$ zoom optical systems is further characterized in that at least one positive lens in said fourth lens group satisfies condition (33):

$$-1 < SF_{G4} < 10 \quad (33)$$

where $SF_{G4} = (r_{G41} + r_{G42})/(r_{G41} - r_{G42})$, provided that:

$SF_{G4}$ is a shaping factor of the positive lens in said fourth lens group, $r_{G41}$ is a radius of curvature of an object-side surface of the positive lens in said fourth lens group, and $r_{G42}$ is a radius of curvature of an image-side surface of the positive lens in said fourth lens group.

The advantage of, and the requirement for, the 87$^{th}$ zoom optical system of the invention is now explained.

To make the amount of aberrations taking place at the third lens group small, it is preferable to bring down the height of rays at the third lens group. Specifically, it is preferable for the fourth lens group to satisfy condition (33), thereby decreasing the positive refracting power of the object-side surface of that positive lens, so that the amount of coma, astigmatism, etc. occurring at that object-side surface can be minimized.

As the upper limit of 10 to condition (33) is exceeded, the negative refracting power of that object-side surface becomes too large. This in turn causes large coma, astigmatism, etc. to occur with a sign opposite to that of condition (33), and decentration sensitivity become high as well. As the lower limit of −1 is not reached, the positive refracting power of the object-side surface becomes large. This renders the amount of various aberrations produced, inclusive of coma and astigmatism, too large to need more lenses for correction.

More preferably, that positive lens should satisfy condition (33-2), because the amount of various aberrations produced can be more reduced.

$$0 < SF_{G4} < 7 \quad (33\text{-}2)$$

Even more preferably, that positive lens should satisfy condition (33-3), because the amount of various aberrations produced can be much more reduced.

$$1.5 < SF_{G4} < 3 \quad (33\text{-}3)$$

According to the 88$^{th}$ aspect of the invention, any one of the 67$^{th}$ to 87$^{th}$ zoom optical systems is further characterized in that at least one positive lens in said fourth lens group is fabricated of a material that satisfies condition (34):

$$40 < \nu_{d4} < 100 \quad (34)$$

where $\nu_{d4}$ is an Abbe number of the positive lens in said fourth lens group.

The advantage of, and the requirement for, the 88$^{th}$ zoom optical system is now explained.

When the first lens group is made up of one negative lens, considerable chromatic aberration of magnification is produced at the wide-angle end in particular. An attempt to make correction for this chromatic aberration of magnification with the negative refracting power of the third lens groups gives rise to overcorrection at the telephoto end. It is thus preferable for that positive lens to satisfy condition (34), thereby achieving satisfactory prevention of chromatic aberration of magnification due to overcorrection at the telephoto end.

As the upper limit of 100 to condition (34) is exceeded, materials well fit for lenses are hardly available. As the lower limit of 40 is not reached, it is impossible to prevent chromatic aberration of magnification from occurring at the telephoto end; more lenses are needed for correction.

More preferably, that positive lens should satisfy condition (34-2), because chromatic aberration of magnification can be better held back.

$$45 < \nu_{d4} < 100 \quad (34\text{-}2)$$

Even more preferably, that positive lens should satisfy condition (34-3), because chromatic aberration of magnification can be much better held back.

$$50 < v_{d4} < 100 \quad (34\text{-}3)$$

According to the 89th aspect of the invention, any one of the 67th to 88th zoom optical systems is further characterized by satisfying condition (35):

$$-30 < DT_{min} < 20 \quad (35)$$

where $DT_{min}$ is a minimum amount of distortion in %.

The advantage of, and the requirement for, the 89th zoom optical system of the invention is now explained.

When distortion is electrically corrected to achieve a wide-angle arrangement, it is preferable to generate minus distortion at the wide-angle end; it is preferable to satisfy condition (35), because the wide-angle arrangement is achievable with satisfactory image quality upon electrical correction of distortion.]

As the upper limit of 20 to condition (35) is exceeded, plus distortion occurs practically at the wide-angle end. Thus, even though distortion is electrically corrected, any wide-angle arrangement is no longer achievable. As the lower limit of −30 is not reached, the magnification upon enlargement of the outermost periphery of an image becomes high with the result that the image becomes rough after electrical correction of distortion.

It is more preferable to satisfy condition (35-2), because the desired wide-angle arrangement is achievable without rendering the image rough.

$$-20 < DT_{min} < 0 \quad (35\text{-}2)$$

It is even more preferable to satisfy condition (35-3), because the desired wide-angle arrangement is achievable without rendering the image rougher.

$$-15 < DT_{min} < -5 \quad (35\text{-}3)$$

According to the 90th aspect of the invention, any one of the 67th to 89th zoom optical systems is further characterized in that distortion occurring throughout the optical system is electrically corrected.

The advantage of, and the requirement for, the 90th zoom optical system is now explained.

An attempt to make satisfactory correction for distortion throughout the optical system requires more lenses, resulting in a size increase. Therefore, if a portion of distortion that remains uncorrected throughout the optical system is electrically corrected, the optical system can then be made more compact.

In an optical system of the retrofocus type, there is large negative distortion at the wide-angle end. For this reason, such an optical system is likely to have a wide-angle arrangement and high magnifications upon electrical correction of image distortion.

According to the 91st aspect of the invention, any one of the 67th to 90th zoom optical systems is further characterized in that chromatic aberration of magnification occurring throughout the optical system is electrically corrected.

The advantage of, and the requirement for, the 91st zoom optical system of the invention is now explained.

When the first lens group is made up of one negative lens, there is large chromatic aberration of magnification at the wide-angle end. An attempt to make satisfactory correction for this chromatic aberration of magnification requires more lenses, resulting in a size increase. Therefore, if a portion of distortion that remains uncorrected throughout the optical system is electrically corrected, the optical system can then be made more compact.

According to the 92nd aspect of the invention, any one of the 67th to 91st zoom optical systems is further characterized in that an organic-inorganic composite material is used as an optical material for at least one optical element that forms a part of the optical system.

The advantage of, and the requirement for, the 92nd zoom optical system is now explained.

With the organic-inorganic composite material used as the optical material for the optical element, various optical properties (refractive index, chromatic dispersion) manifest themselves (or develop) depending on the types, and proportions of existence, of an organic component(s) and an inorganic component(s). Thus, if the organic component(s) and the inorganic component(s) are blended together at any desired proportion, it is then possible to achieve an optical material that has the desired or higher optical properties. In other words, it is possible to obtain an optical element of higher performance; various aberrations can be corrected with fewer such optical elements. Therefore, the optical system can be provided in a more compact form and in a more inexpensive manner.

According to the 93rd aspect of the invention, the 92nd zoom optical system is further characterized in that said organic-inorganic composite material contains a nano-particle form of zirconia.

According to the 94th aspect of the invention, the 92nd zoom optical system is further characterized in that said organic-inorganic composite material contains a nano-particle form of zirconia and alumina.

According to the 95th aspect of the invention, the 92nd zoom optical system is further characterized in that said organic-inorganic composite material contains a nano-particle form of niobium oxide.

According to the 96th aspect of the invention, the 92nd zoom optical system is further characterized in that said organic-inorganic composite material contains a nano-particle form of zirconium alkoxide hydrolysate and alumina.

The advantages of, and the requirement for, any one of the 93rd to 96th zoom optical systems is now explained.

These materials in the nano-particle form are typical inorganic components. If such nano-particles are dispersed in the organic component, e.g., a plastic component at a given quantitative proportion, various optical properties (refractive index, chromatic dispersion) can then manifest themselves.

Electronic equipment of the invention is characterized by comprising the zoom optical system according to any one of the 1st to 96th aspects of the invention and an electronic image pickup device located on an image side thereof.

The advantage of, and the requirement for, the electronic equipment of the invention is now explained.

Each zoom optical system as explained above is smaller in size and lower in cost. Accordingly, electronic equipments, with such a zoom optical system built in them, are also smaller in size and lower in cost. The electronic equipments referred to herein, for instance, encompasses digital cameras, video cameras, digital video units, personal computers, mobile computers, cellular phones and personal digital assistants.

According to the invention as recounted above, effective tradeoffs can be made between the cost and the size reductions of zoom optical systems, and electronic equipments incorporating them can be made lower in cost and smaller in size as well.

Examples 1–7 of the zoom optical system (zoom lens) of the invention are now explained specifically with reference to the accompanying drawings. FIGS. 1–7 are illustrative of sectional lens arrangements along their optical axes at the wide-angle ends (a), in intermediate states (b) and at the telephoto ends (c) upon focusing on an object point at infinity, respectively. Throughout the drawings, G1 is indicative of a first lens group, G2 a second lens group, G3 a third lens group, G4 a fourth lens group, S an aperture stop, F a near-infrared cut filter, a low-pass filter, a plane parallel plate of an electronic image pickup device such as a cover glass etc., and I an image plane. FIGS. 8–14 are aberration diagrams for Examples 1–7 regarding spherical aberrations, astigmatisms, chromatic aberrations of magnification and distortions at the wide-angle ends (a), in intermediate states (b) and at the telephoto ends (c) upon focusing on an object point at infinity, with "FIY" indicative of an image height.

EXAMPLE 1

Figure 1B:
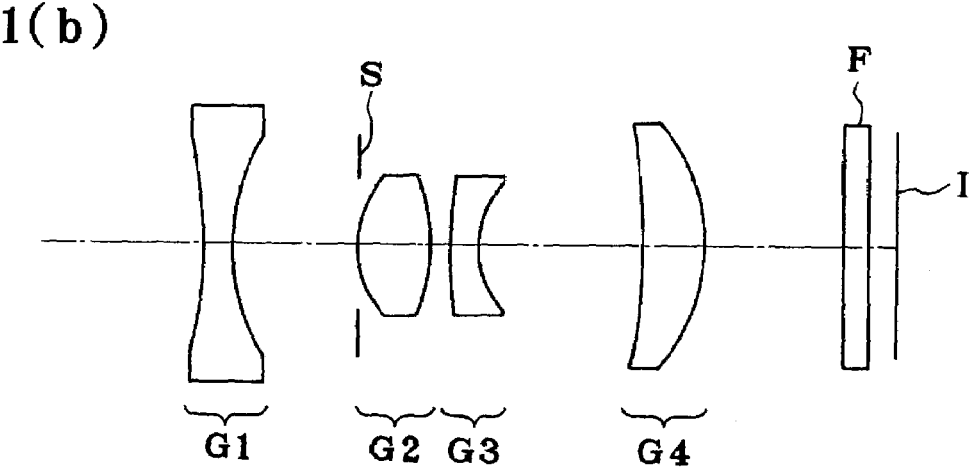
Figure 1C:
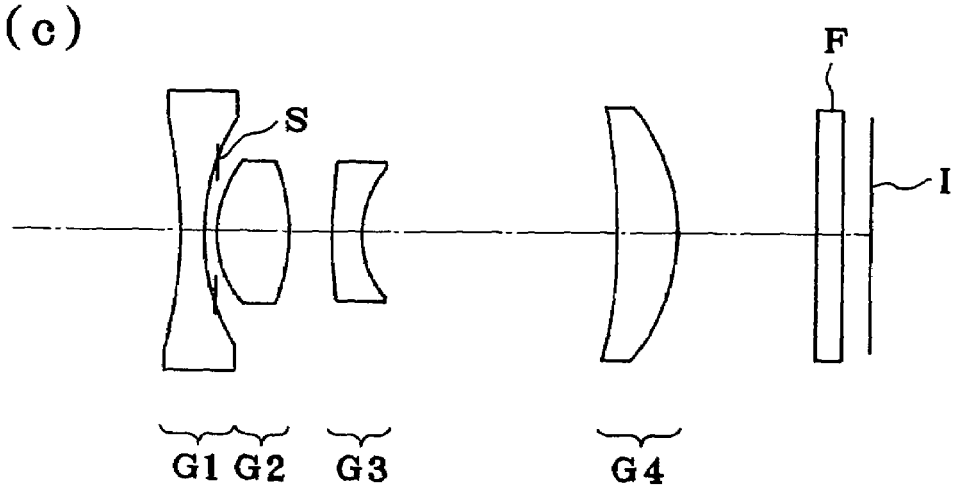

This example is directed to a zoom optical system that is built up of, in order from its object side, a first lens group G1, an aperture stop S, a second lens group G2, a third lens group G3 and a fourth lens group G4, as shown in FIG. 1. Upon zooming from the wide-angle end to the telephoto end of the zoom optical system, the first lens group G1 stays fixed, both the second lens group G2 and the third lens group G3 move toward the object side while the spacing between them becomes wide, and the fourth lens group G4 remains fixed. The aperture stop S moves together with the second lens group G2 toward on the object side.

The first lens group G1 is made up of a double-concave negative lens, having negative power. Both surfaces of the double-concave negative lens are aspheric.

The second lens group G2 is made up of a double-convex positive lens, having positive power. Both surfaces of the double-convex positive lens are aspheric.

The third lens group G3 is made up of a negative meniscus lens convex on its object side, having negative power. The negative meniscus lens has an aspheric surface on its image side.

The fourth lens group G4 is made up of a positive meniscus lens concave on its object side, having positive power. The positive meniscus lens has an aspheric surface on its image side.

The lenses in the instant example are all fabricated of a resinous material.

EXAMPLE 2

Figure 2A:
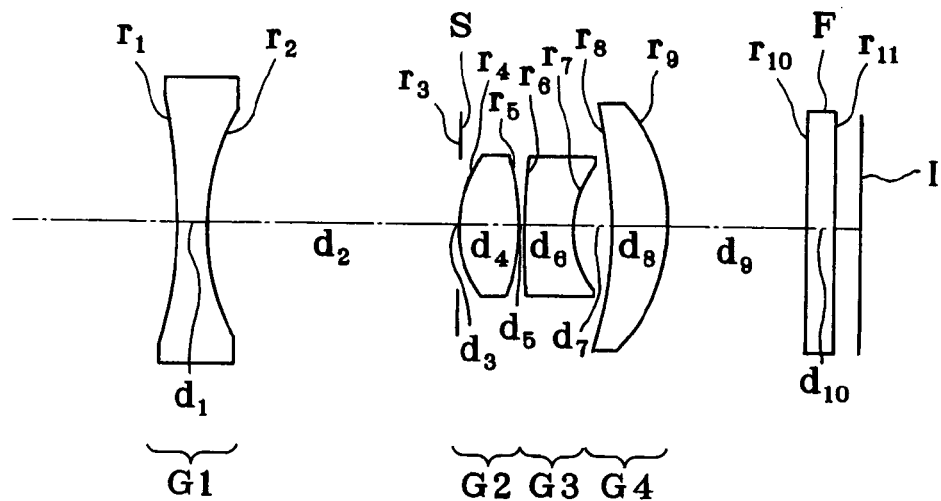
FIGS. 2(a), 2(b) and 2(c) are lens section views of Example 2 of the zoom optical system of the invention, similar to FIGS. 1(a), 1(b) and 1(c).
Figure 2B:
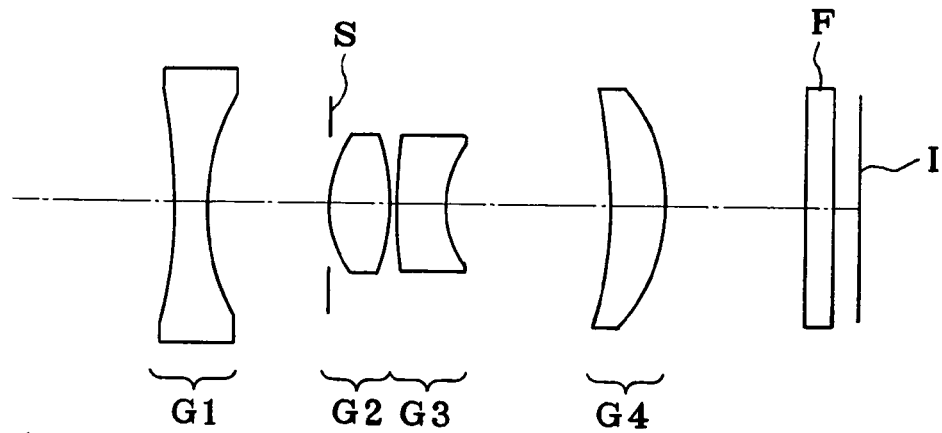
Figure 2C:
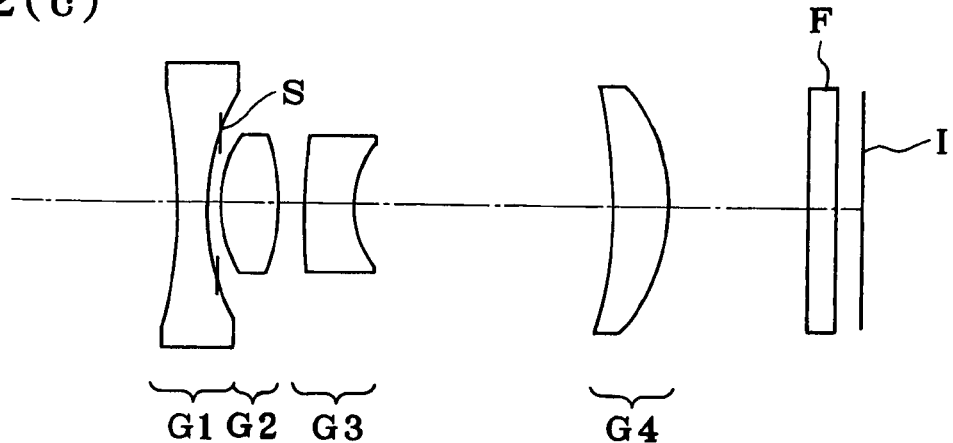

This example is directed to a zoom optical system that is built up of, in order from its object side, a first lens group G1, an aperture stop S, a second lens group G2, a third lens group G3 and a fourth lens group G4, as shown in FIG. 2. Upon zooming from the wide-angle end to the telephoto end of the zoom optical system, the first lens group G1 stays fixed, both the second lens group G2 and the third lens group G3 move toward the object side while the spacing between them becomes wide, and the fourth lens group G4 remains fixed. The aperture stop S moves together with the second lens group G2 toward on the object side.

The first lens group G1 is made up of a double-concave negative lens, having negative power. Both surfaces of the double-concave negative lens are aspheric.

The second lens group G2 is made up of a double-convex positive lens, having positive power. Both surfaces of the double-convex positive lens are aspheric.

The third lens group G3 is made up of a negative meniscus lens convex on its object side, having negative power. The negative meniscus lens has an aspheric surface on its image side.

The fourth lens group G4 is made up of a positive meniscus lens concave on its object side, having positive power. The positive meniscus lens has an aspheric surface on its image side.

The lenses in the instant example are all fabricated of a resinous material with the exception that the double-concave negative lens in the first lens group G1 is fabricated of glass.

EXAMPLE 3

Figure 3A:
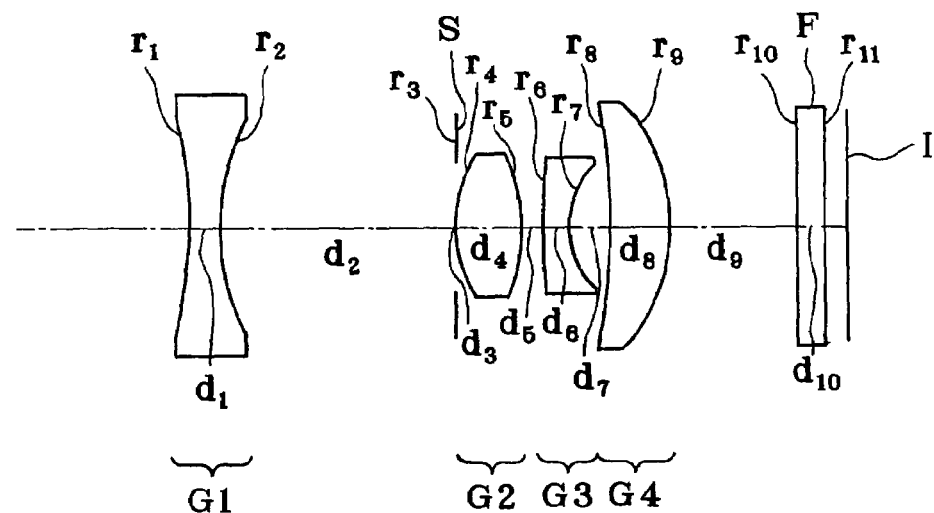
FIGS. 3(a), 3(b) and 3(c) are lens section views of Example 3 of the zoom optical system of the invention, similar to FIGS. 1(a), 1(b) and 1(c).
Figure 3B:
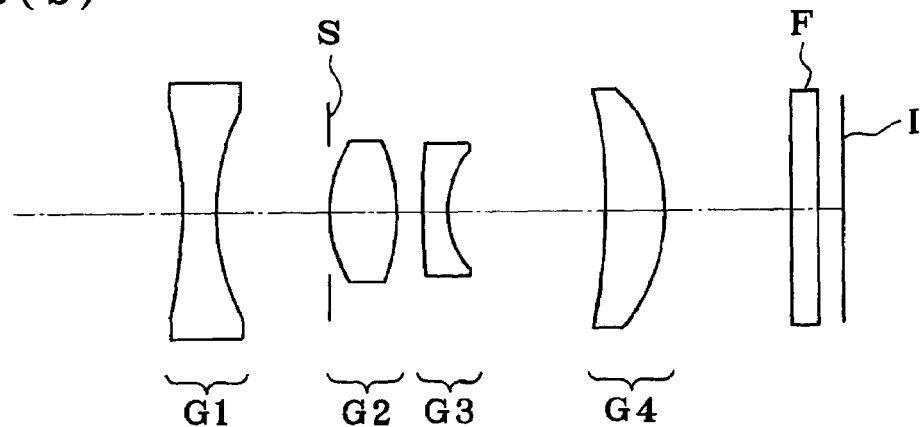
Figure 3C:
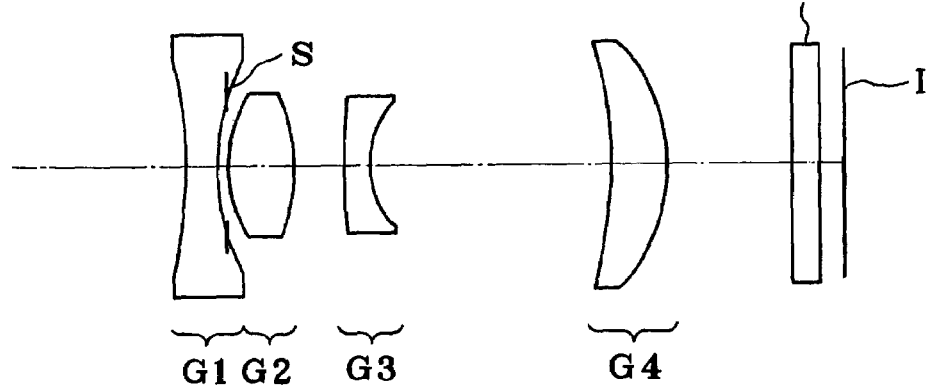

This example is directed to a zoom optical system that is built up of, in order from its object side, a first lens group G1, an aperture stop S, a second lens group G2, a third lens group G3 and a fourth lens group G4, as shown in FIG. 3. Upon zooming from the wide-angle end to the telephoto end of the zoom optical system, the first lens group G1 stays fixed, both the second lens group G2 and the third lens group G3 move toward the object side while the spacing between them becomes wide, and the fourth lens group G4 remains fixed. The aperture stop S moves together with the second lens group G2 toward on the object side.

The first lens group G1 is made up of a double-concave negative lens, having negative power. Both surfaces of the double-concave negative lens are aspheric.

The second lens group G2 is made up of a double-convex positive lens, having positive power. Both surfaces of the double-convex positive lens are aspheric.

The third lens group G3 is made up of a negative meniscus lens convex on its object side, having negative power. The negative meniscus lens has an aspheric surface on its image side.

The fourth lens group G4 is made up of a positive meniscus lens concave on its object side, having positive power. The positive meniscus lens has an aspheric surface on its image side.

The lenses in the instant example are all fabricated of a resinous material with the exception that the double-convex positive lens in the second lens group G2 is fabricated of glass.

EXAMPLE 4

Figure 4A:
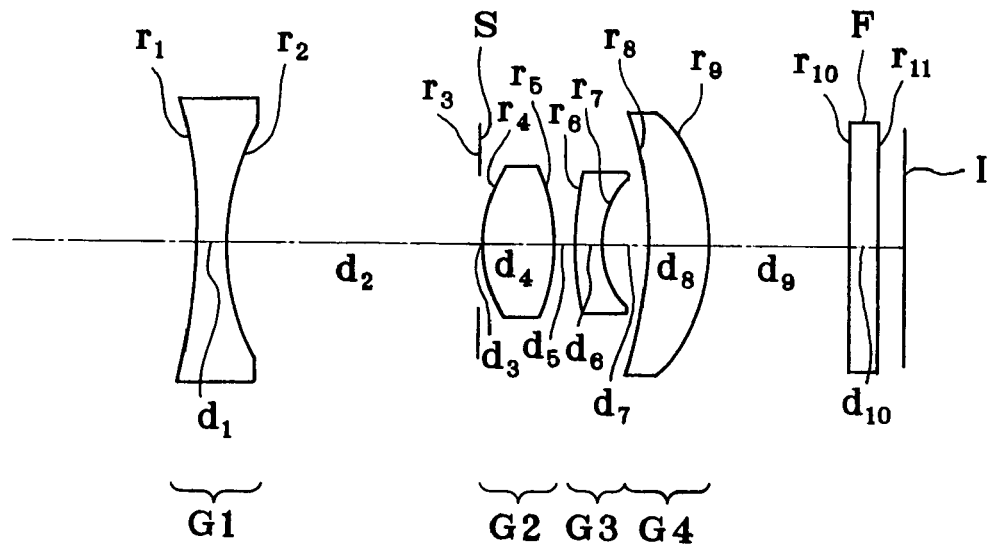
FIGS. 4(a), 4(b) and 4(c) are lens section views of Example 4 of the zoom optical system of the invention, similar to FIGS. 1(a), 1(b) and 1(c).
Figure 4B:
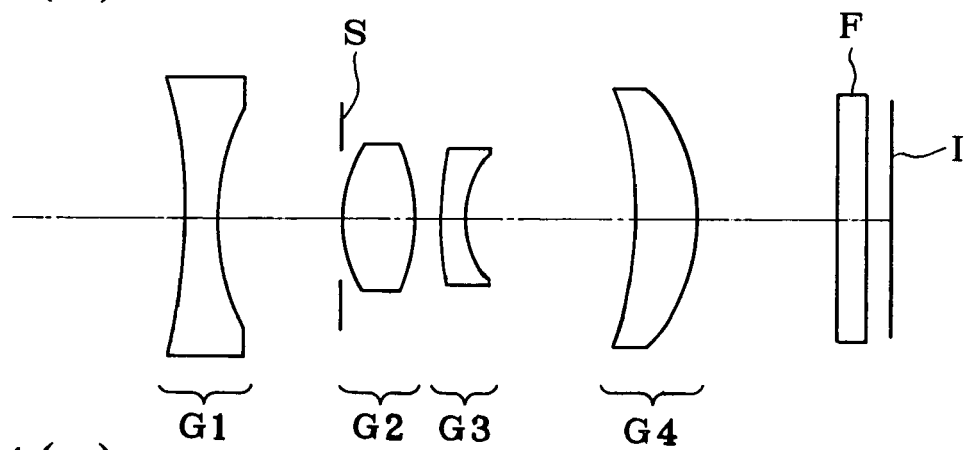
Figure 4C:
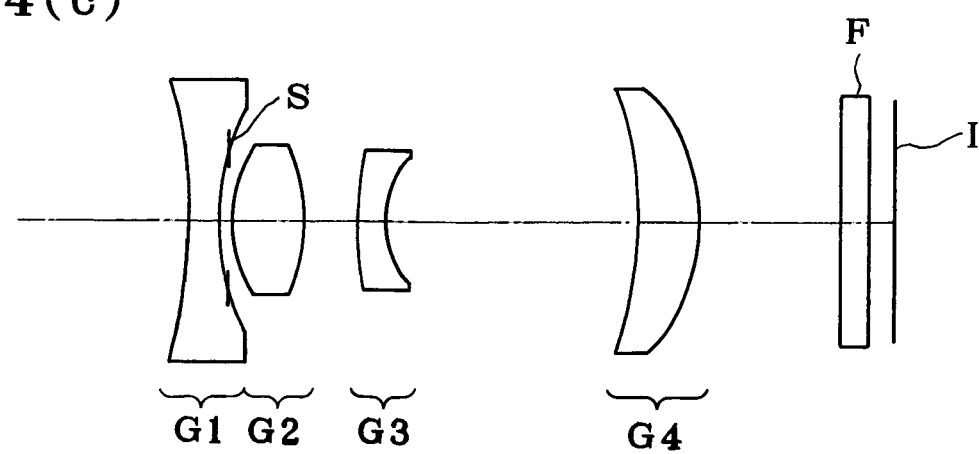

This example is directed to a zoom optical system that is built up of, in order from its object side, a first lens group G1, an aperture stop S, a second lens group G2, a third lens group G3 and a fourth lens group G4, as shown in FIG. 4. Upon zooming from the wide-angle end to the telephoto end of the zoom optical system, the first lens group G1 stays fixed, both the second lens group G2 and the third lens group G3 move toward the object side while the spacing between them becomes wide, and the fourth lens group G4 remains fixed. The aperture stop S moves together with the second lens group G2 toward on the object side.

The first lens group G1 is made up of a double-concave negative lens, having negative power. Both surfaces of the double-concave negative lens are aspheric.

The second lens group G2 is made up of a double-convex positive lens, having positive power. Both surfaces of the double-convex positive lens are aspheric.

The third lens group G3 is made up of a negative meniscus lens convex on its object side, having negative power. The negative meniscus lens has an aspheric surface on its image side.

The fourth lens group G4 is made up of a positive meniscus lens concave on its object side, having positive power. The positive meniscus lens has an aspheric surface on its image side.

The lenses in the instant example are all fabricated of a resinous material with the exception that the negative meniscus lens in the third lens group G3 is fabricated of glass.

EXAMPLE 5

Figure 5A:
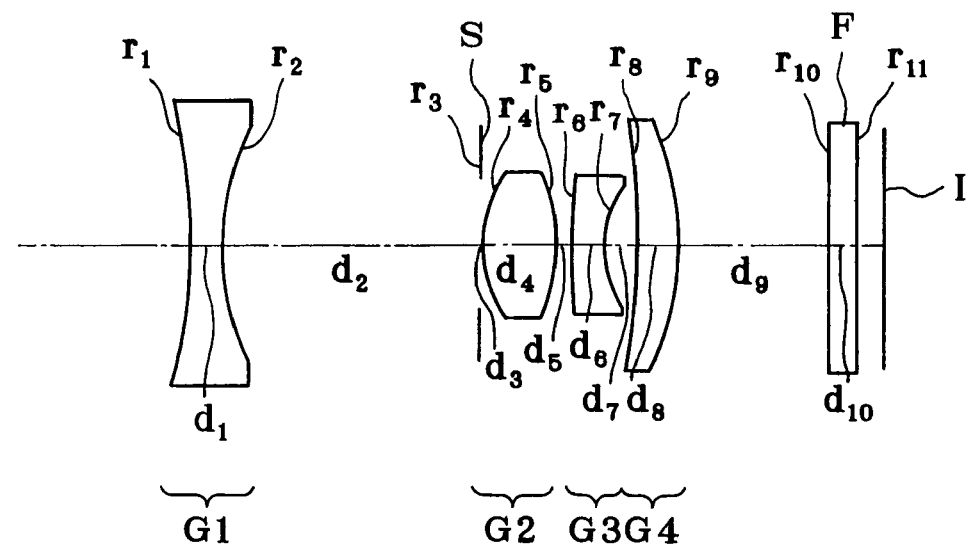
FIGS. 5(a), 5(b) and 5(c) are lens section views of Example 5 of the zoom optical system of the invention, similar to FIGS. 1(a), 1(b) and 1(c).
Figure 5B:
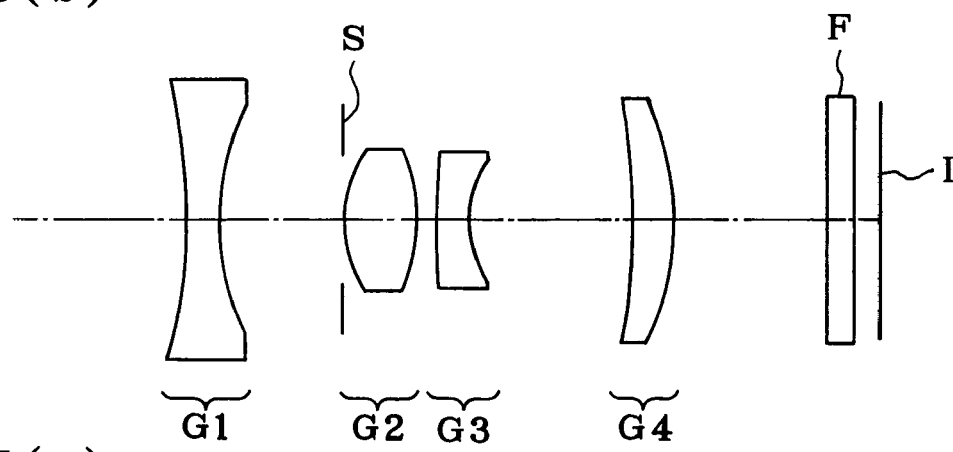
Figure 5C:
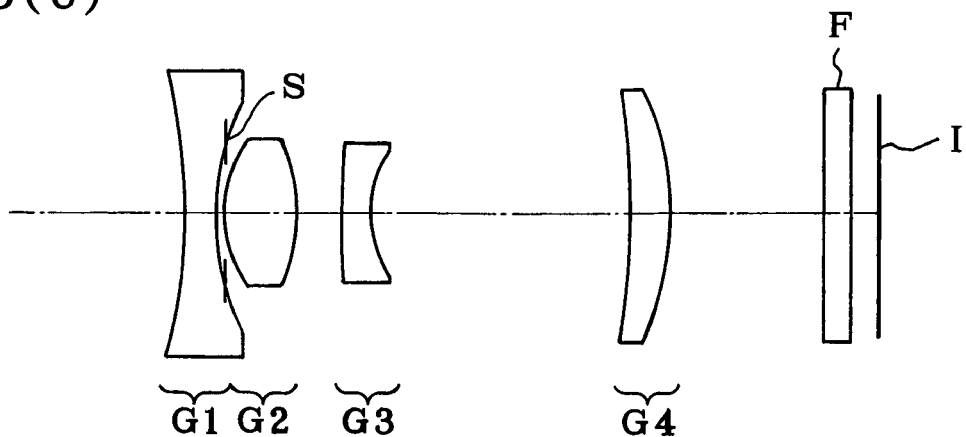

This example is directed to a zoom optical system that is built up of, in order from its object side, a first lens group G1, an aperture stop S, a second lens group G2, a third lens group G3 and a fourth lens group G4, as shown in FIG. 5. Upon zooming from the wide-angle end to the telephoto end of the zoom optical system, the first lens group G1 stays fixed, both the second lens group G2 and the third lens group G3 move toward the object side while the spacing between them becomes wide, and the fourth lens group G4 remains fixed. The aperture stop S moves together with the second lens group G2 toward on the object side.

The first lens group G1 is made up of a double-concave negative lens, having negative power. Both surfaces of the double-concave negative lens are aspheric.

The second lens group G2 is made up of a double-convex positive lens, having positive power. Both surfaces of the double-convex positive lens are aspheric.

The third lens group G3 is made up of a negative meniscus lens convex on its object side, having negative power. The negative meniscus lens has an aspheric surface on its image side.

The fourth lens group G4 is made up of a positive meniscus lens concave on its object side, having positive power. The positive meniscus lens has an aspheric surface on its image side.

The lenses in the instant example are all fabricated of a resinous material with the exception that the positive meniscus lens in the fourth lens group G4 is fabricated of glass.

EXAMPLE 6

Figure 6A:
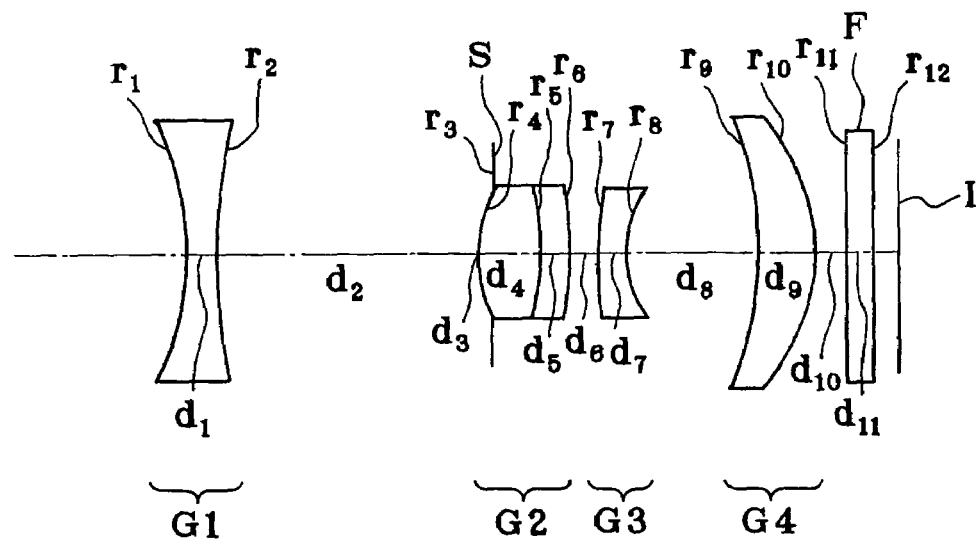
FIGS. 6(a), 6(b) and 6(c) are lens section views of Example 6 of the zoom optical system of the invention, similar to FIGS. 1(a), 1(b) and 1(c).
Figure 6B:
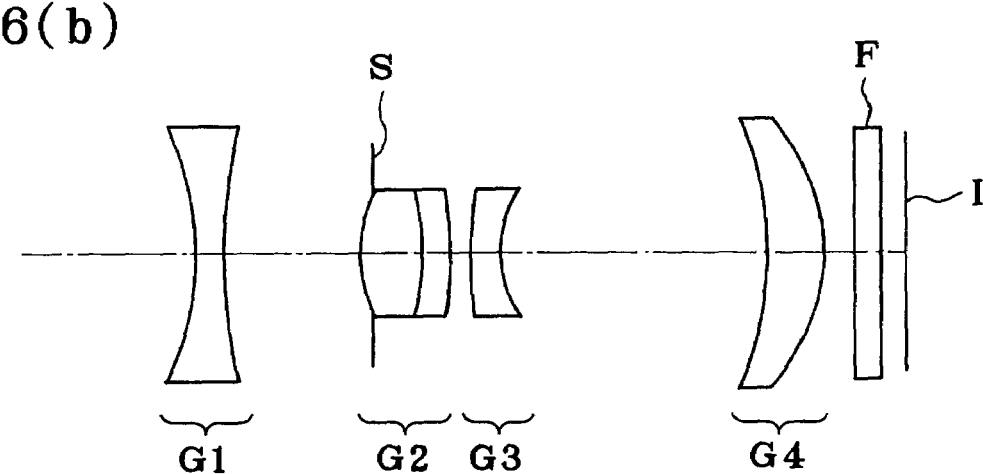
Figure 6C:
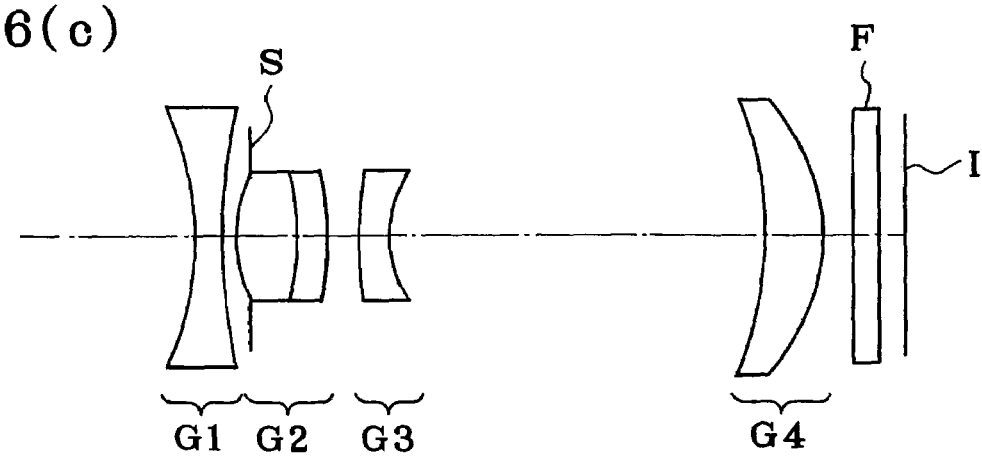

This example is directed to a zoom optical system that is built up of, in order from its object side, a first lens group G1, an aperture stop S, a second lens group G2, a third lens group G3 and a fourth lens group G4, as shown in FIG. 6. Upon zooming from the wide-angle end to the telephoto end of the zoom optical system, the first lens group G1 stays fixed, both the second lens group G2 and the third lens group G3 move toward the object side while the spacing between them becomes first narrow and then wide, and the fourth lens group G4 remains fixed. The aperture stop S moves together with the second lens group G2 toward on the object side.

The first lens group G1 is made up of a double-concave negative lens, having negative power. Both surfaces of the double-concave negative lens are aspheric.

The second lens group G2 is made up of a doublet consisting of a double-convex positive lens and a negative meniscus lens convex on its image side, having positive power. The doublet has aspheric surfaces nearest to its object and image sides.

The third lens group G3 is made up of a negative meniscus lens convex on its object side, having negative power. The negative meniscus lens has an aspheric surface on its image side.

The fourth lens group G4 is made up of a positive meniscus lens concave on its object side, having positive power. The positive meniscus lens has an aspheric surface on its image side.

The lenses in the instant example are all fabricated of glass with the exception that the negative meniscus lens in the third lens group G3 is fabricated of a resinous material.

EXAMPLE 7

Figure 7A:
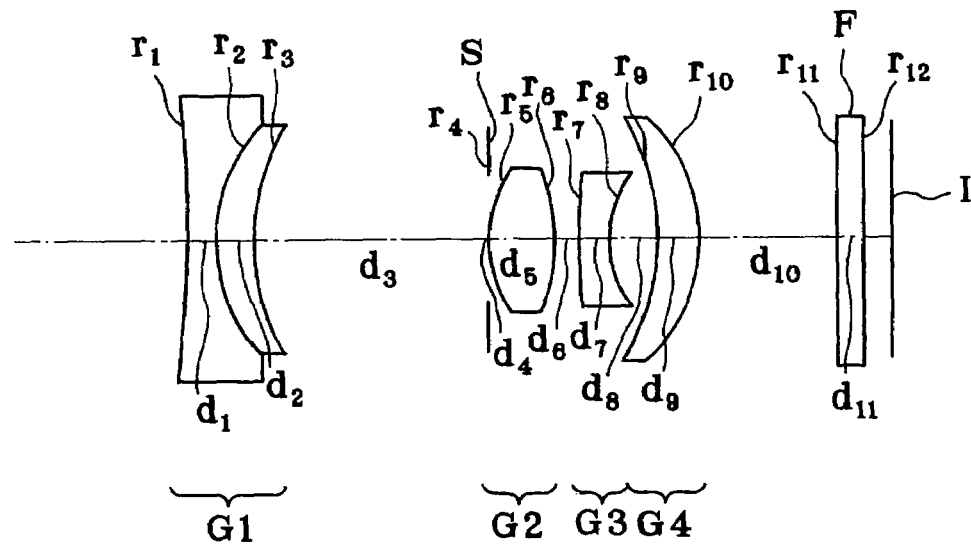
FIGS. 7(a), 7(b) and 7(c) are lens section views of Example 7 of the zoom optical system of the invention, similar to FIGS. 1(a), 1(b) and 1(c).
Figure 7B:
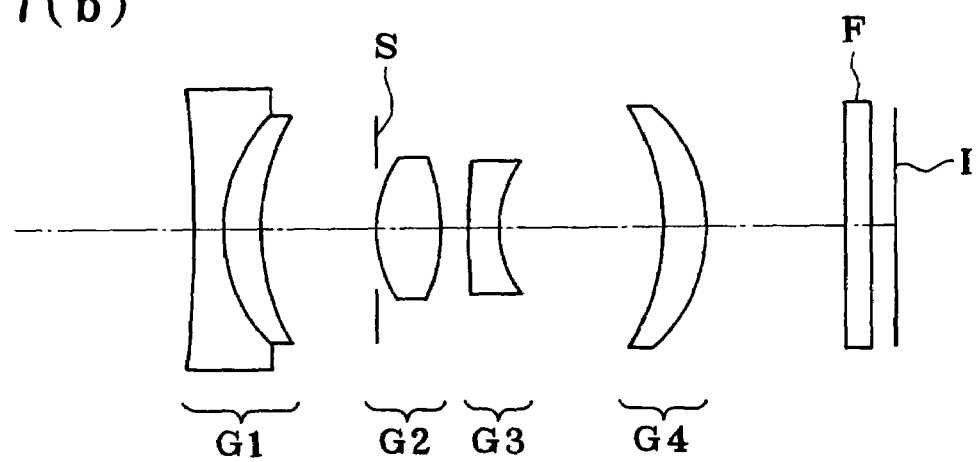
Figure 7C:
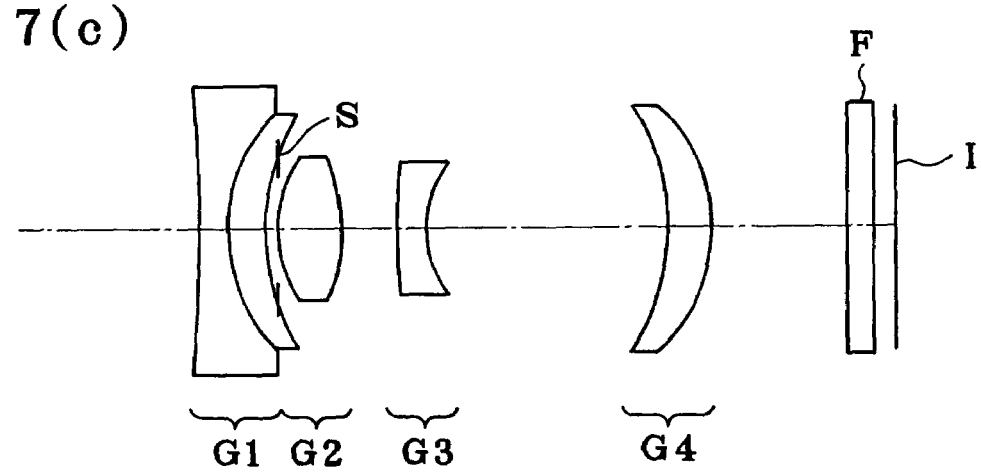
Figure 9A:
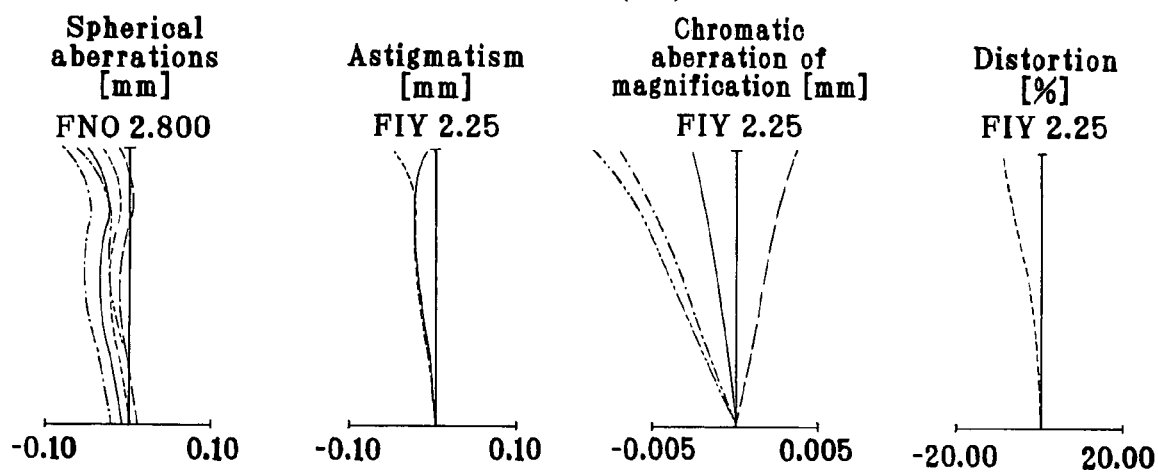
FIGS. 9(a), 9(b) and 9(c) are aberration diagrams for Example 2, similar to FIGS. 8(a), 8(b) and 8(c).
Figure 9B:
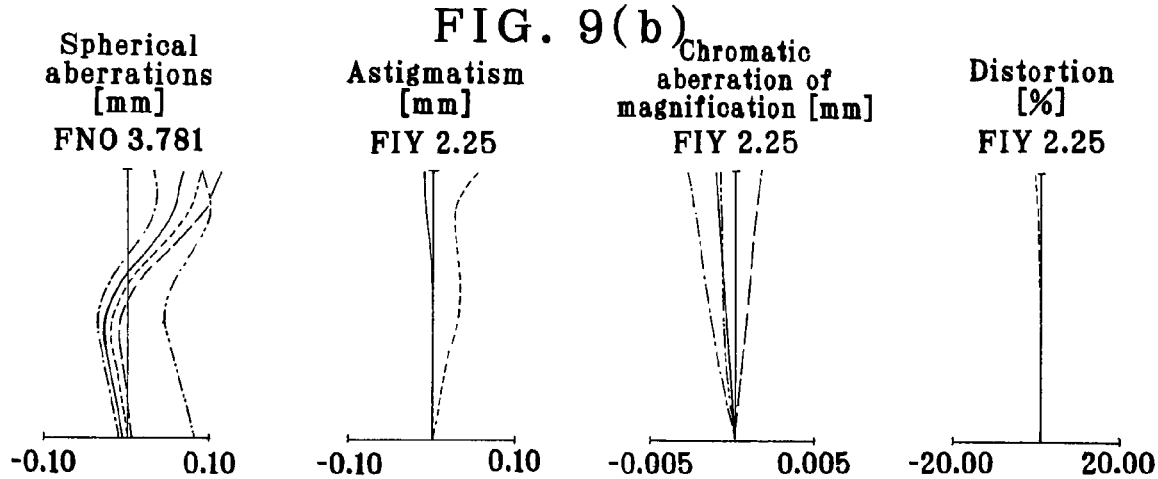
Figure 9C:
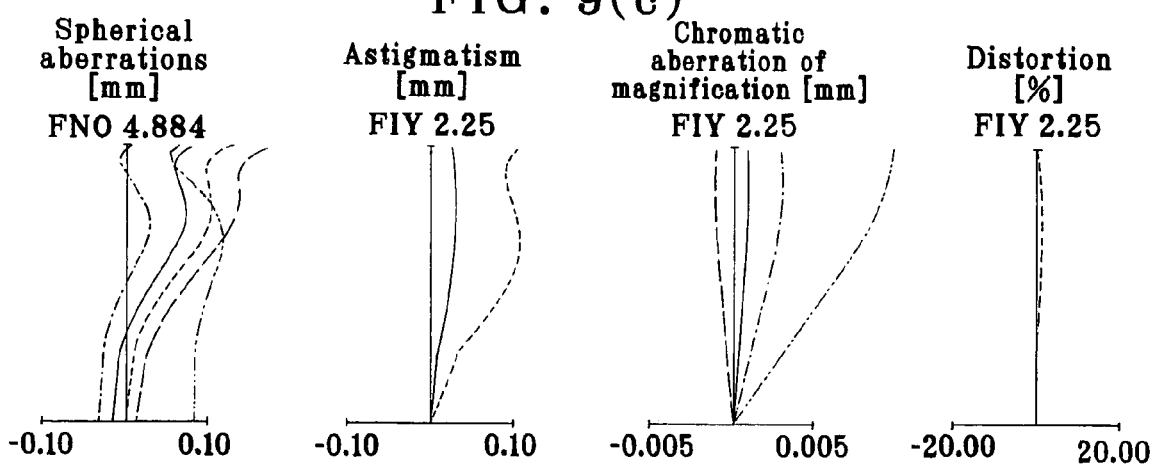
Figure 10A:
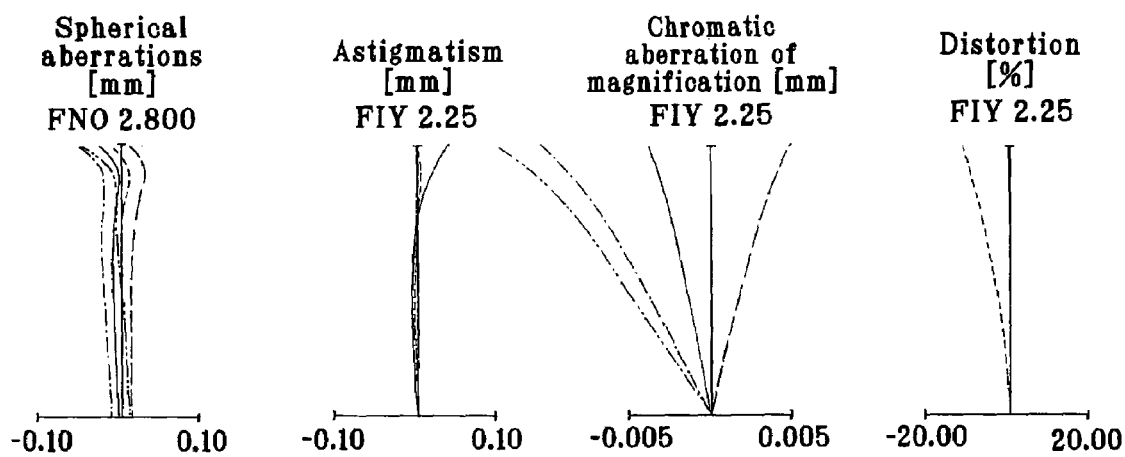
FIGS. 10(a), 10(b) and 10(c) are aberration diagrams for Example 3, similar to FIGS. 8(a), 8(b) and 8(c).
Figure 10B:
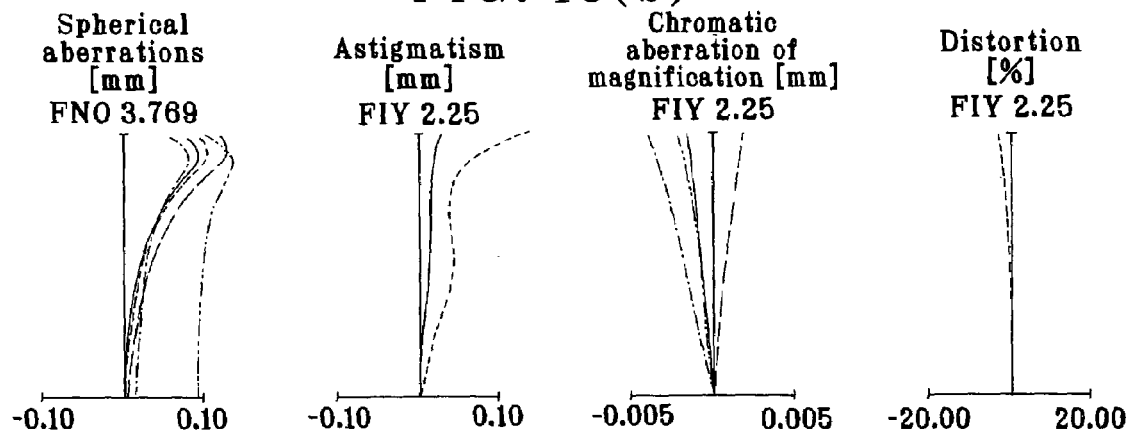
Figure 10C:
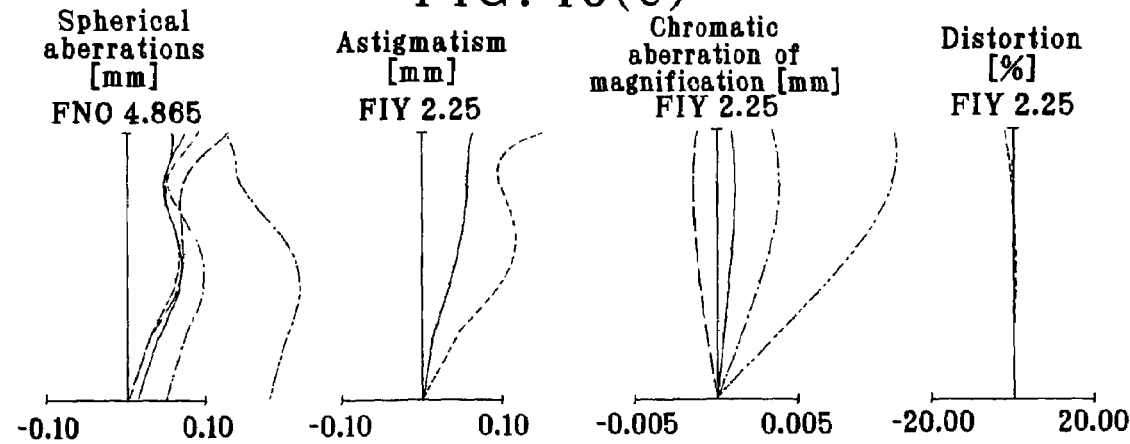
Figure 11A:
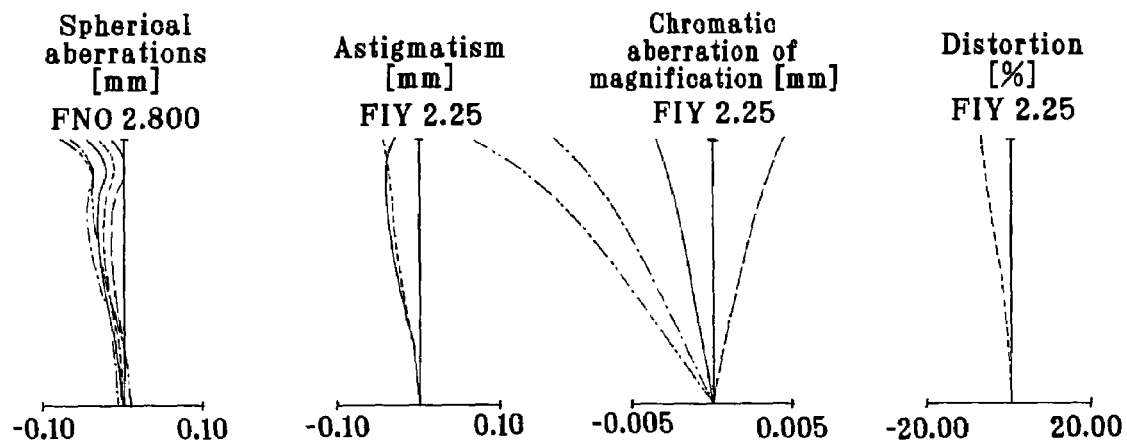
Figure 11B:
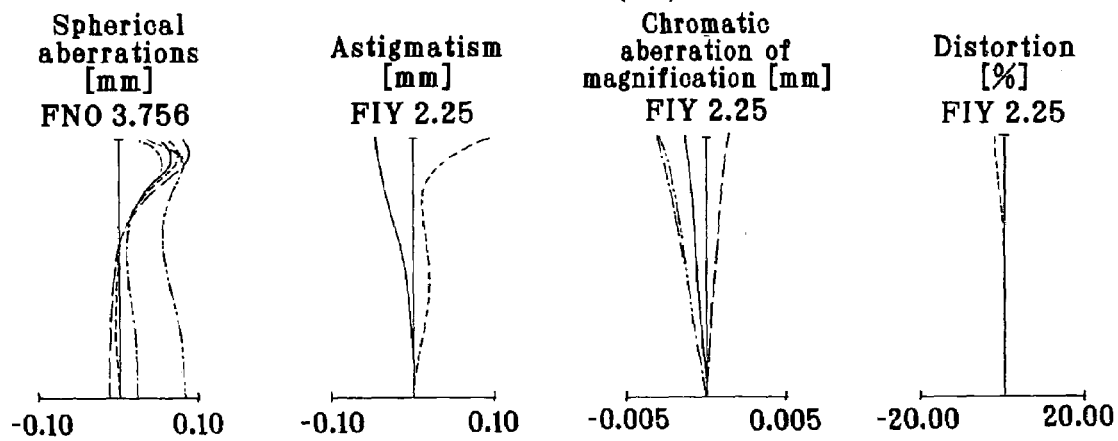
Figure 11C:
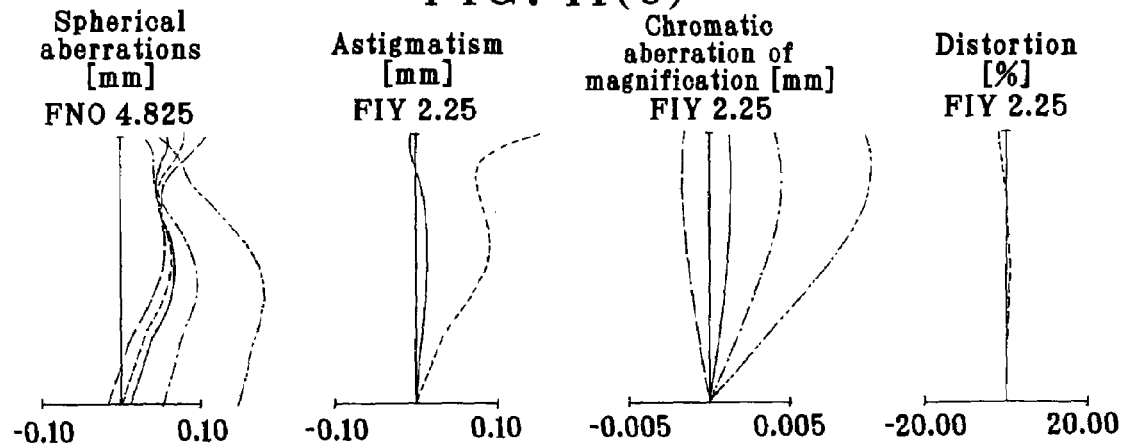
Figure 12A:
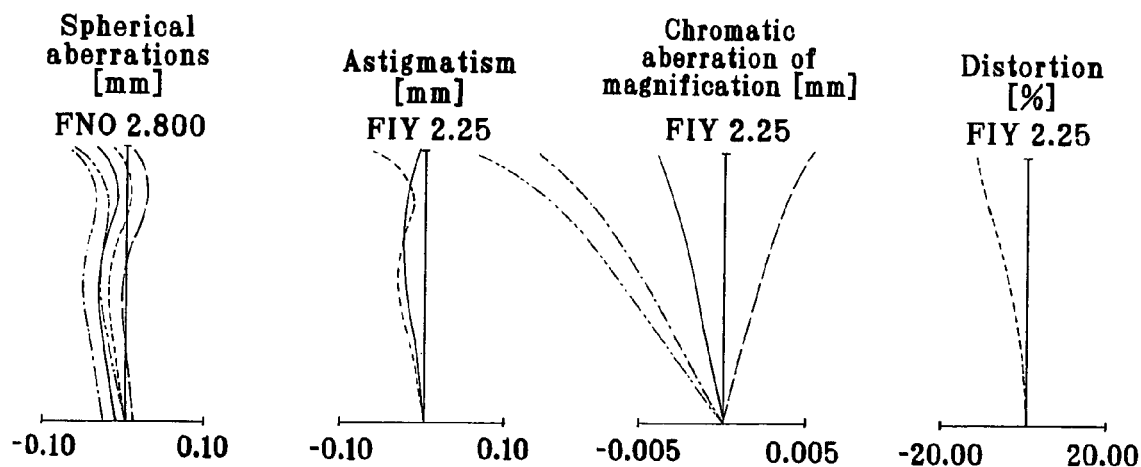
FIGS. 12(a), 12(b) and 12(c) are aberration diagrams for Example 5, similar to FIGS. 8(a), 8(b) and 8(c).
Figure 12B:
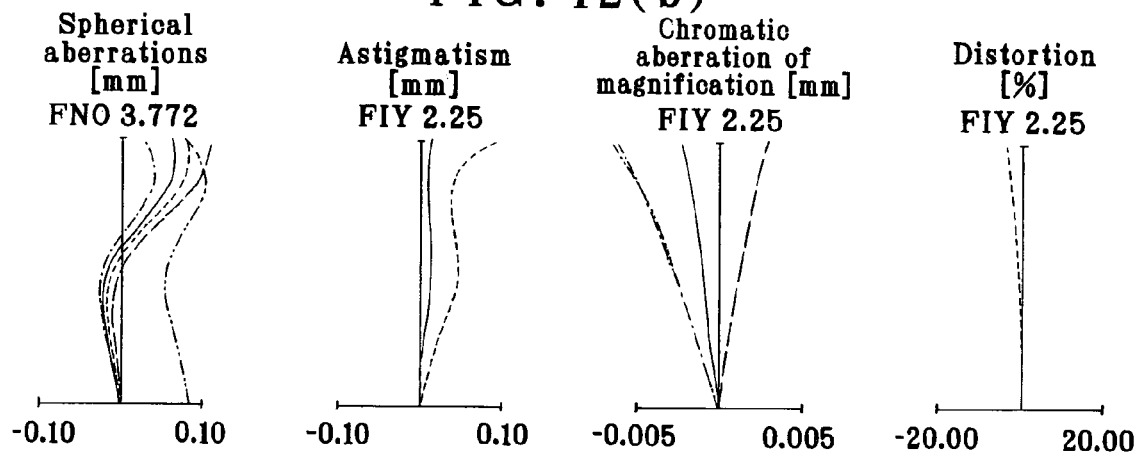
Figure 12C:
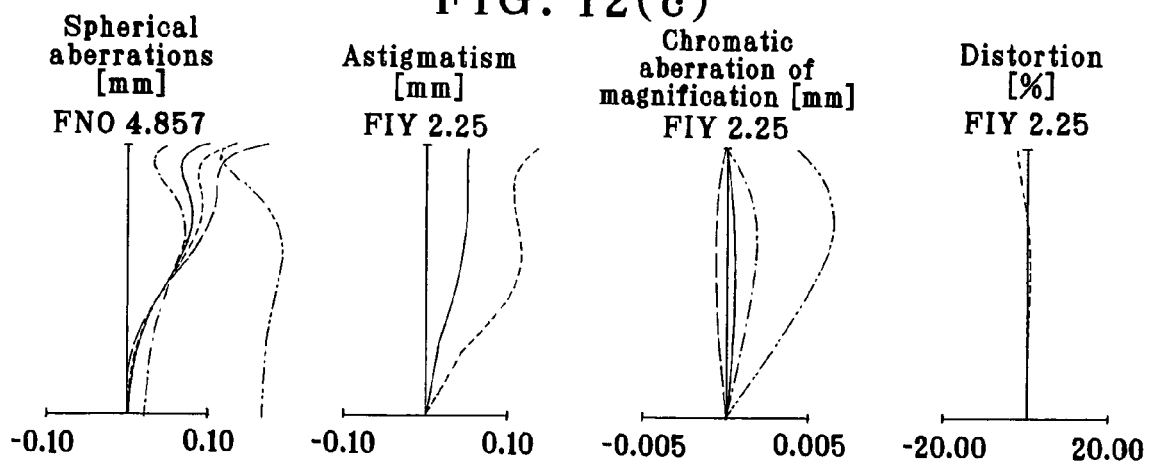
Figure 13A:
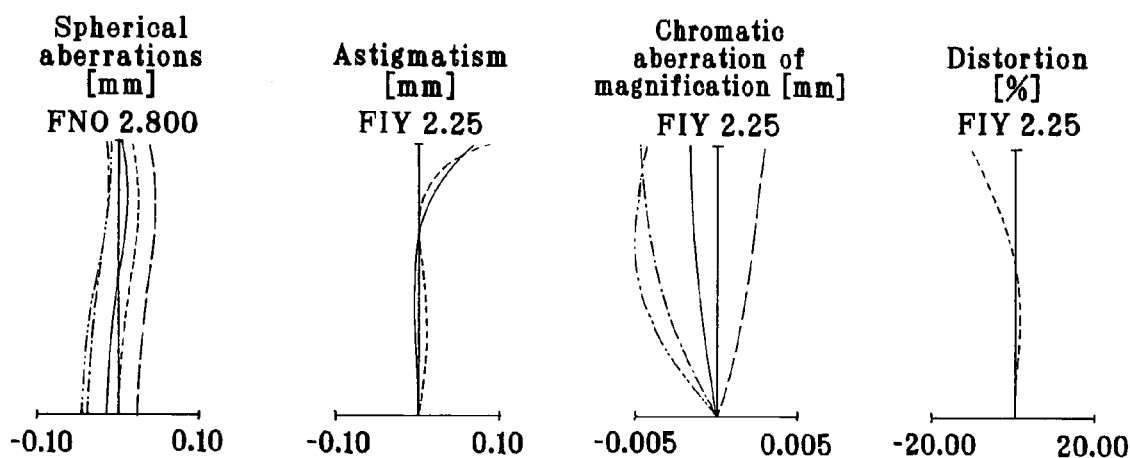
FIGS. 13(a), 13(b) and 13(c) are aberration diagrams for Example 6, similar to FIGS. 8(a), 8(b) and 8(c).
Figure 13B:
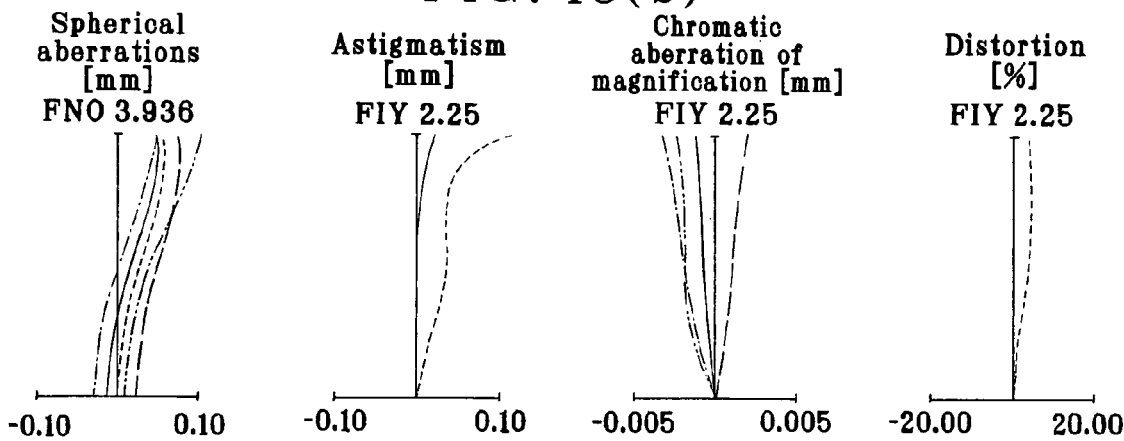
Figure 13C:
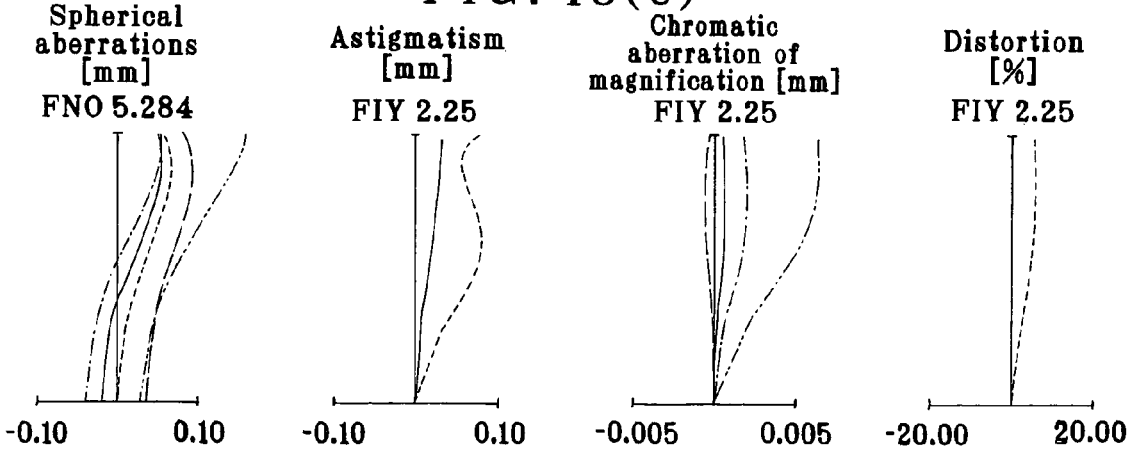
Figure 14A:
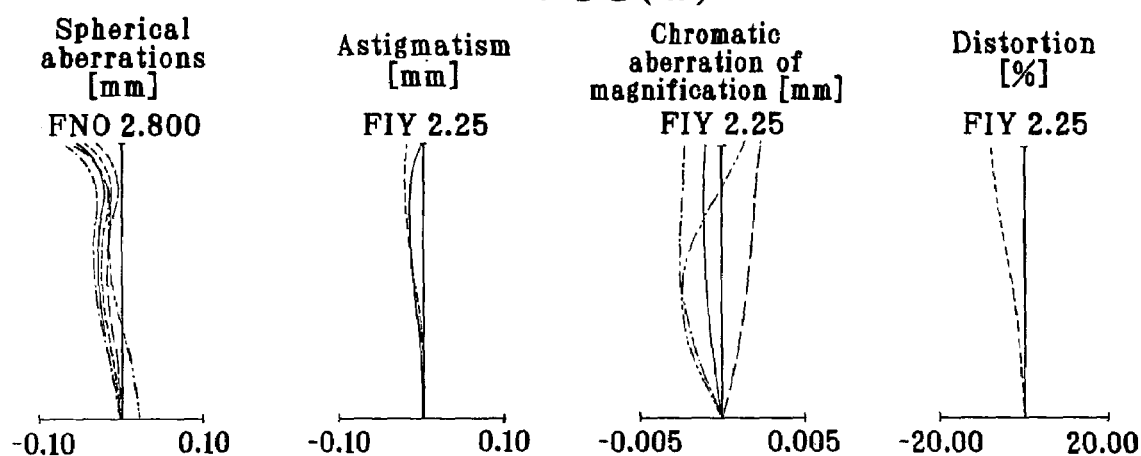
FIGS. 14(a), 14(b) and 14(c) are aberration diagrams for Example 7, similar to FIGS. 8(a), 8(b) and 8(c).
Figure 14B:
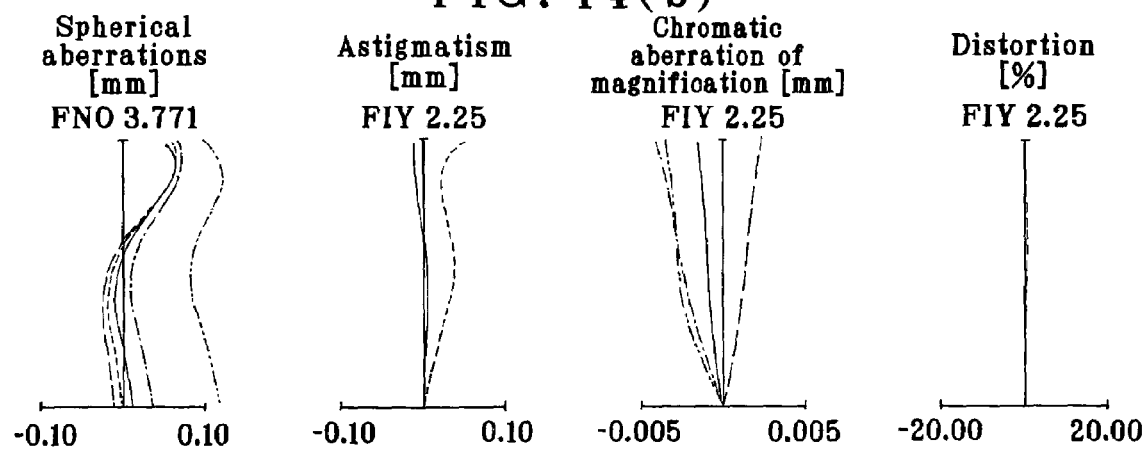
Figure 14C:
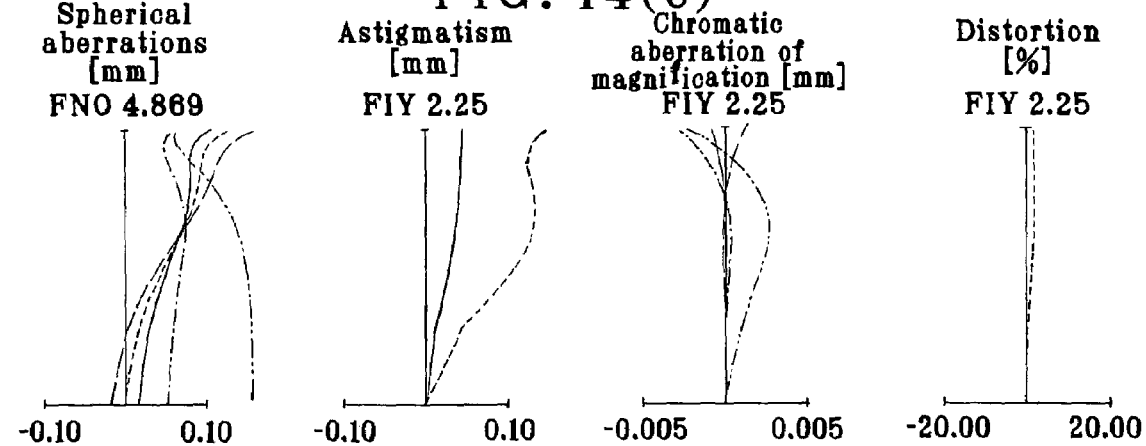

This example is directed to a zoom optical system that is built up of, in order from its object side, a first lens group G1, an aperture stop S, a second lens group G2, a third lens group G3 and a fourth lens group G4, as shown in FIG. 7. Upon zooming from the wide-angle end to the telephoto end of the zoom optical system, the first lens group G1 stays fixed, both the second lens group G2 and the third lens group G3 move toward the object side while the spacing between them becomes wide, and the fourth lens group G4 remains fixed. The aperture stop S moves together with the second lens group G2 toward on the object side.

The first lens group G1 is made up of a doublet consisting of a double-concave negative lens and a positive meniscus lens convex on its image side, having negative power. The doublet has aspheric surfaces nearest its object and image sides.

The second lens group G2 is made up of a double-convex positive lens, having positive power. Both surfaces of the double-convex positive lens are aspheric.

The third lens group G3 is made up of a negative meniscus lens convex on its object side, having negative power. The negative meniscus lens has an aspheric surface on its image side.

The fourth lens group G4 is made up of a positive meniscus lens concave on its object side, having positive power. The positive meniscus lens has an aspheric surface on its image side.

The lenses in the instant example are all fabricated of glass with the exception that the negative meniscus lens in the third lens group G3 is fabricated of a resinous material.

Enumerated below are numerical data on each example. The symbols used hereinafter but not hereinbefore have the following meanings.

f: focal length of the zoom optical system,
$F_{NO}$: F-number,
ω: half angle of view,
WE: wide-angle end,
ST: intermediate state,
TE: telephoto end,
$r_1, r_2, \ldots$ : radius of curvature of each lens surface,
$d_1, d_2, \ldots$ : spacing between adjacent lens surfaces,
$nd_1, nd_2, \ldots$ : d-line refractive index of each lens, and
$\nu_{d1}, \nu_{d2}, \ldots$ : Abbe number of each lens.

Here let x stand for an optical axis with the direction of propagation of light taken as positive, and y represent a direction that is orthogonal to the optical axis. Then, aspheric shape is given by $$x=(y^2/r)/[1+\{1-(K+1)(y/r)^2\}^{1/2}]+A_4 y^4+A_6 y^6+A_8 y^8+A_{10} y^{10}$$

Here r is a paraxial radius of curvature, K is a conical coefficient, and $A_4$, $A_6$, $A_8$ and $A_{10}$ are the fourth-, sixth-, eighth- and tenth-order aspherical coefficients, respectively.

EXAMPLE 1

| | | | |
|---|---|---|---|
| $r_1 = -6.301$ (Aspheric) | $d_1 = 0.50$ | $n_{d1} = 1.52542$ | $\nu_{d1} = 55.78$ |
| $r_2 = 6.669$ (Aspheric) | $d_2 =$ (Variable) | | |

-continued

| | | | |
|---|---|---|---|
| $r_3 = \infty$ (Stop) | $d_3 = 0.00$ | | |
| $r_4 = 2.086$ (Aspheric) | $d_4 = 1.32$ | $n_{d2} = 1.52542$ | $\nu_{d2} = 55.78$ |
| $r_5 = -3.231$ (Aspheric) | $d_5 =$ (Variable) | | |
| $r_6 = 18.094$ | $d_6 = 0.50$ | $n_{d3} = 1.60687$ | $\nu_{d3} = 27.03$ |
| $r_7 = 1.822$ (Aspheric) | $d_7 =$ (Variable) | | |
| $r_8 = -12.307$ | $d_8 = 1.07$ | $n_{d4} = 1.52542$ | $\nu_{d4} = 55.78$ |
| $r_9 = -3.906$ (Aspheric) | $d_9 = 2.64$ | | |
| $r_{10} = \infty$ | $d_{10} = 0.50$ | $n_{d5} = 1.51633$ | $\nu_{d5} = 64.14$ |
| $r_{11} = \infty$ | | | |

Aspherical Coefficients

1st surface $K = 0.000$
$A_4 = 4.32714 \times 10^{-3}$
$A_6 = 4.14536 \times 10^{-4}$
$A_8 = -3.27778 \times 10^{-5}$
$A_{10} = 0$ 2nd surface $K = 0.000$
$A_4 = 1.38944 \times 10^{-3}$
$A_6 = 1.02204 \times 10^{-3}$
$A_8 = 5.50333 \times 10^{-5}$
$A_{10} = 0$ 4th surface $K = -0.977$
$A_4 = 1.25280 \times 10^{-3}$
$A_6 = -2.01568 \times 10^{-3}$
$A_8 = 0$
$A_{10} = 0$ 5th surface $K = 0.000$
$A_4 = 2.91744 \times 10^{-2}$
$A_6 = -1.10534 \times 10^{-2}$
$A_8 = 1.98860 \times 10^{-3}$
$A_{10} = 0$ 7th surface $K = -0.752$
$A_4 = -1.87308 \times 10^{-3}$
$A_6 = 2.47042 \times 10^{-2}$
$A_8 = -5.43689 \times 10^{-3}$
$A_{10} = 0$ 9th surface $K = -4.700$
$A_4 = -7.43924 \times 10^{-3}$
$A_6 = -9.40285 \times 10^{-5}$
$A_8 = 1.07428 \times 10^{-5}$
$A_{10} = 0$ Zooming Data ($\infty$)

| | WE | ST | TE |
|---|---|---|---|
| f (mm) | 3.600 | 6.235 | 10.800 |
| $F_{NO}$ | 2.80 | 3.76 | 4.84 |
| $\omega$ (°) | — | — | — |
| $d_2$ | 4.83 | 2.36 | 0.20 |
| $d_5$ | 0.31 | 0.40 | 0.85 |
| $d_7$ | 0.70 | 3.09 | 4.80 |

EXAMPLE 2

| | | | |
|---|---|---|---|
| $r_1 = -6.192$ (Aspheric) | $d_1 = 0.50$ | $n_{d1} = 1.49700$ | $\nu_{d1} = 81.54$ |
| $r_2 = 6.326$ (Aspheric) | $d_2 =$ (Variable) | | |
| $r_3 = \infty$ (Stop) | $d_3 = -0.01$ | | |
| $r_4 = 2.037$ (Aspheric) | $d_4 = 1.14$ | $n_{d2} = 1.52542$ | $\nu_{d2} = 55.78$ |
| $r_5 = -3.175$ (Aspheric) | $d_5 =$ (Variable) | | |
| $r_6 = 25.280$ | $d_6 = 0.85$ | $n_{d3} = 1.60687$ | $\nu_{d3} = 27.03$ |
| $r_7 = 1.808$ (Aspheric) | $d_7 =$ (Variable) | | |
| $r_8 = -7.945$ | $d_8 = 0.98$ | $n_{d4} = 1.52542$ | $\nu_{d4} = 55.78$ |
| $r_9 = -3.406$ (Aspheric) | $d_9 = 2.57$ | | |
| $r_{10} = \infty$ | $d_{10} = 0.50$ | $n_{d5} = 1.51633$ | $\nu_{d5} = 64.14$ |
| $r_{11} = \infty$ | | | |

Aspherical Coefficients

1st surface $K = 0.000$
$A_4 = 4.19483 \times 10^{-3}$
$A_6 = 3.77619 \times 10^{-4}$
$A_8 = -2.91910 \times 10^{-5}$
$A_{10} = 0$ 2nd surface $K = 0.000$
$A_4 = 1.32079 \times 10^{-3}$
$A_6 = 9.54364 \times 10^{-4}$
$A_8 = 6.88330 \times 10^{-5}$
$A_{10} = 0$ 4th surface $K = -0.921$
$A_4 = 2.81890 \times 10^{-3}$
$A_6 = -1.75660 \times 10^{-3}$
$A_8 = 0$
$A_{10} = 0$ 5th surface $K = 0.000$
$A_4 = 3.35772 \times 10^{-2}$
$A_6 = -1.14423 \times 10^{-2}$
$A_8 = 2.01674 \times 10^{-3}$
$A_{10} = 0$ 7th surface $K = -0.725$
$A_4 = -4.31569 \times 10^{-3}$
$A_6 = 2.60664 \times 10^{-2}$
$A_8 = -4.78944 \times 10^{-3}$
$A_{10} = 0$ 9th surface $K = -1.439$
$A_4 = -7.76886 \times 10^{-4}$
$A_6 = -6.77723 \times 10^{-4}$
$A_8 = 3.26587 \times 10^{-5}$
$A_{10} = 0$ Zooming Data ($\infty$)

| | WE | ST | TE |
|---|---|---|---|
| f (mm) | 3.600 | 6.235 | 10.800 |
| $F_{NO}$ | 2.80 | 3.78 | 4.88 |
| $\omega$ (°) | — | — | — |
| $d_2$ | 4.84 | 2.38 | 0.21 |
| $d_5$ | 0.10 | 0.15 | 0.53 |
| $d_7$ | 0.81 | 3.22 | 5.01 |

EXAMPLE 3

| | | | |
|---|---|---|---|
| $r_1 = -6.428$ (Aspheric) | $d_1 = 0.50$ | $n_{d1} = 1.52542$ | $\nu_{d1} = 55.78$ |
| $r_2 = 5.853$ (Aspheric) | $d_2 = $ (Variable) | | |
| $r_3 = \infty$ (Stop) | $d_3 = -0.02$ | | |
| $r_4 = 2.319$ (Aspheric) | $d_4 = 1.31$ | $n_{d2} = 1.58313$ | $\nu_{d2} = 59.38$ |
| $r_5 = -3.417$ (Aspheric) | $d_5 = $ (Variable) | | |
| $r_6 = 13.426$ | $d_6 = 0.50$ | $n_{d3} = 1.60687$ | $\nu_{d3} = 27.03$ |
| $r_7 = 1.748$ (Aspheric) | $d_7 = $ (Variable) | | |
| $r_8 = -9.086$ | $d_8 = 1.04$ | $n_{d4} = 1.52542$ | $\nu_{d4} = 55.78$ |
| $r_9 = -3.678$ (Aspheric) | $d_9 = 2.43$ | | |
| $r_{10} = \infty$ | $d_{10} = 0.50$ | $n_{d5} = 1.51633$ | $\nu_{d5} = 64.14$ |
| $r_{11} = \infty$ | | | |

Aspherical Coefficients

1st surface $K = 0.000$
$A_4 = 5.72036 \times 10^{-4}$
$A_6 = 9.00099 \times 10^{-4}$
$A_8 = -5.48955 \times 10^{-5}$
$A_{10} = 0$ 2nd surface $K = 0.000$
$A_4 = -1.97082 \times 10^{-3}$
$A_6 = 9.63123 \times 10^{-4}$
$A_8 = 1.39941 \times 10^{-4}$
$A_{10} = 0$ 4th surface $K = -1.332$
$A_4 = -1.68761 \times 10^{-3}$
$A_6 = -3.42873 \times 10^{-5}$
$A_8 = -1.91821 \times 10^{-3}$
$A_{10} = 0$ 5th surface $K = 0.000$
$A_4 = 1.62582 \times 10^{-2}$
$A_6 = -6.71707 \times 10^{-3}$
$A_8 = -1.90345 \times 10^{-4}$
$A_{10} = 0$ 7th surface $K = -0.808$
$A_4 = 6.89314 \times 10^{-3}$
$A_6 = 2.12931 \times 10^{-2}$
$A_8 = -4.86310 \times 10^{-3}$
$A_{10} = 0$ 9th surface $K = -4.680$
$A_4 = -8.68046 \times 10^{-3}$
$A_6 = -1.93553 \times 10^{-4}$
$A_8 = 1.87597 \times 10^{-5}$
$A_{10} = 0$ Zooming Data ($\infty$)

| | WE | ST | TE |
|---|---|---|---|
| f (mm) | 3.600 | 6.235 | 10.800 |
| $F_{NO}$ | 2.80 | 3.77 | 4.87 |
| $\omega$ (°) | — | — | — |
| $d_2$ | 4.56 | 2.24 | 0.22 |
| $d_5$ | 0.39 | 0.47 | 0.94 |
| $d_7$ | 0.80 | 3.04 | 4.59 |

EXAMPLE 4

| | | | |
|---|---|---|---|
| $r_1 = -6.033$ (Aspheric) | $d_1 = 0.50$ | $n_{d1} = 1.52542$ | $\nu_{d1} = 55.78$ |
| $r_2 = 6.342$ (Aspheric) | $d_2 = $ (Variable) | | |
| $r_3 = \infty$ (Stop) | $d_3 = -0.02$ | | |
| $r_4 = 2.148$ (Aspheric) | $d_4 = 1.43$ | $n_{d2} = 1.52542$ | $\nu_{d2} = 55.78$ |
| $r_5 = -2.989$ (Aspheric) | $d_5 = $ (Variable) | | |
| $r_6 = 6.270$ | $d_6 = 0.50$ | $n_{d3} = 1.84666$ | $\nu_{d3} = 23.78$ |
| $r_7 = 1.851$ (Aspheric) | $d_7 = $ (Variable) | | |
| $r_8 = -8.613$ | $d_8 = 1.13$ | $n_{d4} = 1.52542$ | $\nu_{d4} = 55.78$ |
| $r_9 = -3.368$ (Aspheric) | $d_9 = 2.52$ | | |
| $r_{10} = \infty$ | $d_{10} = 0.50$ | $n_{d5} = 1.51633$ | $\nu_{d5} = 64.14$ |
| $r_{11} = \infty$ | | | |

Aspherical Coefficients

1st surface $K = 0.000$
$A_4 = 5.69641 \times 10^{-3}$
$A_6 = 2.35992 \times 10^{-4}$
$A_8 = -2.52963 \times 10^{-5}$
$A_{10} = 0$ 2nd surface $K = 0.000$
$A_4 = 2.09681 \times 10^{-3}$
$A_6 = 8.85379 \times 10^{-4}$
$A_8 = 4.65698 \times 10^{-5}$
$A_{10} = 0$ 4th surface $K = -1.264$
$A_4 = -2.99871 \times 10^{-3}$
$A_6 = 8.56382 \times 10^{-4}$
$A_8 = -2.45981 \times 10^{-3}$
$A_{10} = 0$ 5th surface $K = 0.000$
$A_4 = 2.32834 \times 10^{-2}$
$A_6 = -9.13667 \times 10^{-3}$
$A_8 = 9.53145 \times 10^{-5}$
$A_{10} = 0$ 7th surface $K = -0.733$
$A_4 = 3.87360 \times 10^{-4}$
$A_6 = 2.27818 \times 10^{-2}$
$A_8 = -5.56995 \times 10^{-3}$
$A_{10} = 0$ 9th surface $K = -2.574$
$A_4 = -5.23761 \times 10^{-3}$
$A_6 = -5.27217 \times 10^{-4}$
$A_8 = 3.23103 \times 10^{-5}$
$A_{10} = 0$ Zooming Data ($\infty$)

| | WE | ST | TE |
|---|---|---|---|
| f (mm) | 3.600 | 6.235 | 10.800 |
| $F_{NO}$ | 2.80 | 3.76 | 4.82 |
| $\omega$ (°) | — | — | — |
| $d_2$ | 4.67 | 2.29 | 0.22 |
| $d_5$ | 0.32 | 0.44 | 0.92 |
| $d_7$ | 0.80 | 3.07 | 4.66 |

EXAMPLE 5

| | | | |
|---|---|---|---|
| $r_1 = -6.732$ (Aspheric) | $d_1 = 0.50$ | $n_{d1} = 1.52542$ | $\nu_{d1} = 55.78$ |
| $r_2 = 6.165$ (Aspheric) | $d_2 =$ (Variable) | | |
| $r_3 = \infty$ (Stop) | $d_3 = -0.01$ | | |
| $r_4 = 2.048$ (Aspheric) | $d_4 = 1.35$ | $n_{d2} = 1.52542$ | $\nu_{d2} = 55.78$ |
| $r_5 = -3.022$ (Aspheric) | $d_5 =$ (Variable) | | |
| $r_6 = 183.412$ | $d_6 = 0.50$ | $n_{d3} = 1.60687$ | $\nu_{d3} = 27.03$ |
| $r_7 = 1.933$ (Aspheric) | $d_7 =$ (Variable) | | |
| $r_8 = -17.147$ | $d_8 = 0.78$ | $n_{d4} = 1.80610$ | $\nu_{d4} = 40.92$ |
| $r_9 = -6.330$ (Aspheric) | $d_9 = 2.73$ | | |
| $r_{10} = \infty$ | $d_{10} = 0.50$ | $n_{d5} = 1.51633$ | $\nu_{d5} = 64.14$ |
| $r_{11} = \infty$ | | | |

Aspherical Coefficients

1st surface
$K = 0.000$
$A_4 = 4.63841 \times 10^{-4}$
$A_6 = 1.08537 \times 10^{-3}$
$A_8 = -6.98340 \times 10^{-5}$
$A_{10} = 0$ 2nd surface
$K = 0.000$
$A_4 = -1.88067 \times 10^{-3}$
$A_6 = 1.55321 \times 10^{-3}$
$A_8 = 1.17595 \times 10^{-4}$
$A_{10} = 0$ 4th surface
$K = -0.937$
$A_4 = 1.97158 \times 10^{-3}$
$A_6 = -1.62289 \times 10^{-3}$
$A_8 = 0$
$A_{10} = 0$ 5th surface
$K = 0.000$
$A_4 = 3.38035 \times 10^{-2}$
$A_6 = -1.14048 \times 10^{-2}$
$A_8 = 2.03601 \times 10^{-3}$
$A_{10} = 0$ 7th surface
$K = -0.819$
$A_4 = -3.16022 \times 10^{-3}$
$A_6 = 2.55549 \times 10^{-2}$
$A_8 = -4.49060 \times 10^{-3}$
$A_{10} = 0$ 9th Surface
$K = -15.541$
$A_4 = -6.65987 \times 10^{-3}$
$A_6 = 1.78885 \times 10^{-4}$
$A_8 = -4.33306 \times 10^{-6}$
$A_{10} = 0$ Zooming Data ($\infty$)

| | WE | ST | TE |
|---|---|---|---|
| f (mm) | 3.600 | 6.235 | 10.800 |
| $F_{NO}$ | 2.80 | 3.77 | 4.86 |
| $\omega$ (°) | — | — | — |
| $d_2$ | 4.78 | 2.35 | 0.21 |
| $d_5$ | 0.32 | 0.38 | 0.78 |
| $d_7$ | 0.63 | 3.00 | 4.73 |

EXAMPLE 6

| | | | |
|---|---|---|---|
| $r_1 = -5.793$ (Aspheric) | $d_1 = 0.50$ | $n_{d1} = 1.49700$ | $\nu_{d1} = 81.54$ |
| $r_2 = 9.342$ (Aspheric) | $d_2 =$ (Variable) | | |
| $r_3 = \infty$ (Stop) | $d_3 = -0.25$ | | |
| $r_4 = 2.700$ (Aspheric) | $d_4 = 1.15$ | $n_{d2} = 1.74320$ | $\nu_{d2} = 49.34$ |
| $r_5 = -3.929$ | $d_5 = 0.50$ | $n_{d3} = 1.68893$ | $\nu_{d3} = 31.07$ |
| $r_6 = -6.820$ (Aspheric) | $d_6 =$ (Variable) | | |
| $r_7 = 81.992$ | $d_7 = 0.50$ | $n_{d4} = 1.60687$ | $\nu_{d4} = 27.03$ |
| $r_8 = 2.126$ (Aspheric) | $d_8 = D8$ | | |
| $r_9 = -7.226$ | $d_9 = 1.06$ | $n_{d5} = 1.80610$ | $\nu_{d5} = 40.92$ |
| $r_{10} = -2.663$ (Aspheric) | $d_{10} =$ (Variable) | | |
| $r_{11} = \infty$ | $d_{11} = 0.50$ | $n_{d6} = 1.51633$ | $\nu_{d6} = 64.14$ |
| $r_{12} = \infty$ | | | |

Aspherical Coefficients

1st surface
$K = 0.000$
$A_4 = -4.96172 \times 10^{-3}$
$A_6 = 1.22172 \times 10^{-3}$
$A_8 = -7.41345 \times 10^{-5}$
$A_{10} = 0$ 2nd surface
$K = 0.000$
$A_4 = -6.58070 \times 10^{-3}$
$A_6 = 1.50318 \times 10^{-3}$
$A_8 = -5.37645 \times 10^{-5}$
$A_{10} = 0$ 4th surface
$K = -0.752$
$A_4 = 2.06095 \times 10^{-3}$
$A_6 = 1.47859 \times 10^{-3}$
$A_8 = 5.43256 \times 10^{-5}$
$A_{10} = 0$ 6th surface
$K = -3.479$
$A_4 = 1.65102 \times 10^{-2}$
$A_6 = 1.39860 \times 10^{-3}$
$A_8 = 0$
$A_{10} = 0$ 8th surface
$K = -0.628$
$A_4 = 3.05960 \times 10^{-3}$
$A_6 = 1.71933 \times 10^{-3}$
$A_8 = 2.46731 \times 10^{-3}$
$A_{10} = 0$ 10th surface
$K = -4.321$
$A_4 = -5.06390 \times 10^{-3}$
$A_6 = -8.03402 \times 10^{-5}$
$A_8 = 1.23075 \times 10^{-5}$
$A_{10} = 0$ ズームデータ ($\infty$)

| | WE | ST | TE |
|---|---|---|---|
| f (mm) | 3.600 | 6.235 | 10.800 |
| $F_{NO}$ | 2.80 | 3.94 | 5.28 |
| $\omega$ (°) | — | — | — |
| $d_2$ | 5.08 | 2.73 | 0.45 |
| $d_6$ | 0.51 | 0.40 | 0.68 |
| $d_8$ | 2.36 | 4.82 | 6.82 |

EXAMPLE 7

| | | | |
|---|---|---|---|
| $r_1 = -54.769$ (Aspheric) | $d_1 = 0.50$ | $n_{d1} = 1.69350$ | $\nu_{d1} = 53.21$ |
| $r_2 = 3.126$ | $d_2 = 0.70$ | $n_{d2} = 1.84666$ | $\nu_{d2} = 23.78$ |
| $r_3 = 3.947$ (Aspheric) | $d_3 =$ (Variable) | | |
| $r_4 = \infty$ (Stop) | $d_4 = -0.06$ | | |
| $r_5 = 1.992$ (Aspheric) | $d_5 = 1.21$ | $n_{d3} = 1.49700$ | $\nu_{d3} = 81.54$ |
| $r_6 = -2.932$ (Aspheric) | $d_6 =$ (Variable) | | |
| $r_7 = 15.805$ | $d_7 = 0.50$ | $n_{d4} = 1.60687$ | $\nu_{d4} = 27.03$ |
| $r_8 = 1.891$ (Aspheric) | $d_8 =$ (Variable) | | |
| $r_9 = -4.095$ | $d_9 = 0.73$ | $n_{d5} = 1.84666$ | $\nu_{d5} = 23.78$ |
| $r_{10} = -3.011$ (Aspheric) | $d_{10} = 2.47$ | | |
| $r_{11} = \infty$ | $d_{11} = 0.50$ | $n_{d6} = 1.51633$ | $\nu_{d6} = 64.14$ |
| $r_{12} = \infty$ | | | |

Aspherical Coefficients

1st surface $K = 0.000$
$A_4 = -6.72926 \times 10^{-3}$
$A_6 = 1.15286 \times 10^{-3}$
$A_8 = -5.26790 \times 10^{-5}$
$A_{10} = 0$ 3rd surface $K = 0.000$
$A_4 = -8.89810 \times 10^{-3}$
$A_6 = 1.48887 \times 10^{-3}$
$A_8 = 5.88055 \times 10^{-5}$
$A_{10} = 0$ 5th surface $K = -1.007$
$A_4 = 1.59735 \times 10^{-3}$
$A_6 = -2.61339 \times 10^{-3}$
$A_8 = 0$
$A_{10} = 0$ 6th surface $K = 0.000$
$A_4 = 3.08596 \times 10^{-2}$
$A_6 = -1.02710 \times 10^{-2}$
$A_8 = 1.61860 \times 10^{-3}$
$A_{10} = 0$ 8th surface $K = -0.405$
$A_4 = -6.12497 \times 10^{-3}$
$A_6 = 2.47450 \times 10^{-2}$
$A_8 = -4.85178 \times 10^{-3}$
$A_{10} = 0$ 10th surface $K = -1.024$
$A_4 = -1.06816 \times 10^{-3}$
$A_6 = -6.43565 \times 10^{-4}$
$A_8 = 5.39028 \times 10^{-6}$
$A_{10} = 0$

Zooming Data (∞)

| | WE | ST | TE |
|---|---|---|---|
| f (mm) | 3.600 | 6.236 | 10.800 |
| $F_{NO}$ | 2.80 | 3.77 | 4.87 |
| ω (°) | — | — | — |
| $d_3$ | 4.40 | 2.18 | 0.26 |
| $d_6$ | 0.44 | 0.53 | 1.07 |
| $d_8$ | 0.94 | 3.07 | 4.46 |

Set out below are the values of conditions (1)–(13) in Examples 1–7 given above.

| | Condition | | | | | | |
|---|---|---|---|---|---|---|---|
| | (1) | (2) | (3) | (4) | (5) | (6) | (7) |
| Example 1 | 8.57 | 55.78 | 1.69 | −0.03 | 55.78 | 0.73 | −0.22 |
| Example 2 | 10.77 | 81.54 | 1.73 | −0.01 | 55.78 | 0.71 | −0.22 |
| Example 3 | 7.89 | 55.78 | 1.60 | 0.05 | 59.38 | 0.72 | −0.19 |
| Example 4 | 7.42 | 55.78 | 1.61 | −0.02 | 55.78 | 0.73 | −0.16 |
| Example 5 | 9.93 | 55.78 | 1.68 | 0.04 | 55.78 | 0.71 | −0.19 |
| Example 6 | 27.24 | 81.54 | 1.98 | −0.23 | 49.34 | 0.65 | −0.43 |
| Example 7 | 6.57 | 53.21 | 1.18 | 0.87 | 81.54 | 0.72 | −0.19 |

| | Condition | | | | | |
|---|---|---|---|---|---|---|
| | (8) | (9) | (10) | (11) | (12) | (13) |
| Example 1 | 1.22 | 27.03 | 1.93 | 55.8 | 28.75 | −9.5 |
| Example 2 | 1.15 | 27.03 | 2.50 | 55.8 | 28.75 | −9.8 |
| Example 3 | 1.30 | 27.03 | 2.36 | 55.8 | 32.35 | −11.0 |
| Example 4 | 1.84 | 23.78 | 2.28 | 55.8 | 32.00 | −7.4 |
| Example 5 | 1.02 | 27.03 | 2.17 | 40.9 | 28.75 | −12.8 |
| Example 6 | 1.05 | 27.03 | 2.17 | 40.9 | 22.31 | −11.2 |
| Example 7 | 1.27 | 27.03 | 6.55 | 23.8 | 54.51 | −8.4 |

Set out below are the values of conditions (14)–(24) in Examples 1–5 and 7 given above.

| | Condition | | | | | |
|---|---|---|---|---|---|---|
| | (14) | (15) | (16) | (17) | (18) | (19) |
| Example 1 | 55.78 | 1.69 | −0.03 | −0.22 | 55.78 | 0.73 |
| Example 2 | 81.54 | 1.73 | −0.01 | −0.22 | 55.78 | 0.71 |
| Example 3 | 55.78 | 1.60 | 0.05 | −0.19 | 59.38 | 0.72 |
| Example 4 | 55.78 | 1.61 | −0.02 | −0.16 | 55.78 | 0.73 |
| Example 5 | 55.78 | 1.68 | 0.04 | −0.19 | 55.78 | 0.71 |
| Example 7 | 53.21 | 1.18 | 0.87 | −0.19 | 81.54 | 0.72 |

| | Condition | | | | |
|---|---|---|---|---|---|
| | (20) | (21) | (22) | (23) | (24) |
| Example 1 | 1.22 | 27.03 | 1.93 | 55.78 | −9.5 |
| Example 2 | 1.15 | 27.03 | 2.50 | 55.78 | −9.8 |
| Example 3 | 1.30 | 27.03 | 2.36 | 55.78 | −11.0 |
| Example 4 | 1.84 | 23.78 | 2.28 | 55.78 | −7.4 |
| Example 5 | 1.02 | 27.03 | 2.17 | 40.92 | −12.8 |
| Example 7 | 1.27 | 27.03 | 6.55 | 23.78 | −8.4 |

Set out below are the values of conditions (25)–(35) in Example 1–6 given above.

| | Condition | | | | | |
|---|---|---|---|---|---|---|
| | (25) | (26) | (27) | (28) | (29) | (30) |
| Example 1 | −0.03 | 55.78 | 1.69 | 55.78 | 0.73 | −0.22 |
| Example 2 | −0.01 | 81.54 | 1.73 | 55.78 | 0.71 | −0.22 |
| Example 3 | 0.05 | 55.78 | 1.60 | 59.38 | 0.72 | −0.19 |
| Example 4 | −0.02 | 55.78 | 1.61 | 55.78 | 0.73 | −0.16 |
| Example 5 | 0.04 | 55.78 | 1.68 | 55.78 | 0.71 | −0.19 |
| Example 6 | −0.23 | 81.54 | 1.98 | 49.34 | 0.65 | −0.43 |

| | Condition | | | | |
|---|---|---|---|---|---|
| | (31) | (32) | (33) | (34) | (35) |
| Example 1 | 1.22 | 27.03 | 1.93 | 55.78 | −9.5 |
| Example 2 | 1.15 | 27.03 | 2.50 | 55.78 | −9.8 |

-continued

| | | | | | |
|---|---|---|---|---|---|
| Example 3 | 1.30 | 27.03 | 2.36 | 55.78 | −11.0 |
| Example 4 | 1.84 | 23.78 | 2.28 | 55.78 | −7.4 |
| Example 5 | 1.02 | 27.03 | 2.17 | 40.92 | −12.8 |
| Example 6 | 1.05 | 27.03 | 2.17 | 40.92 | −11.2 |

Figure 15:
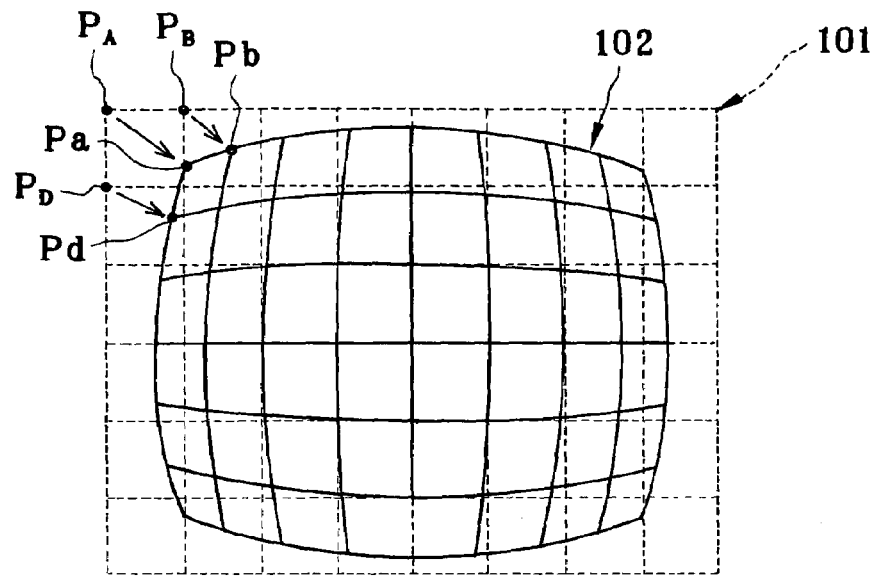
FIG. 15 is an optical distortion diagram that shows a barrel distortion as a typical optical distortion and an image on a real screen.
Figure 16:
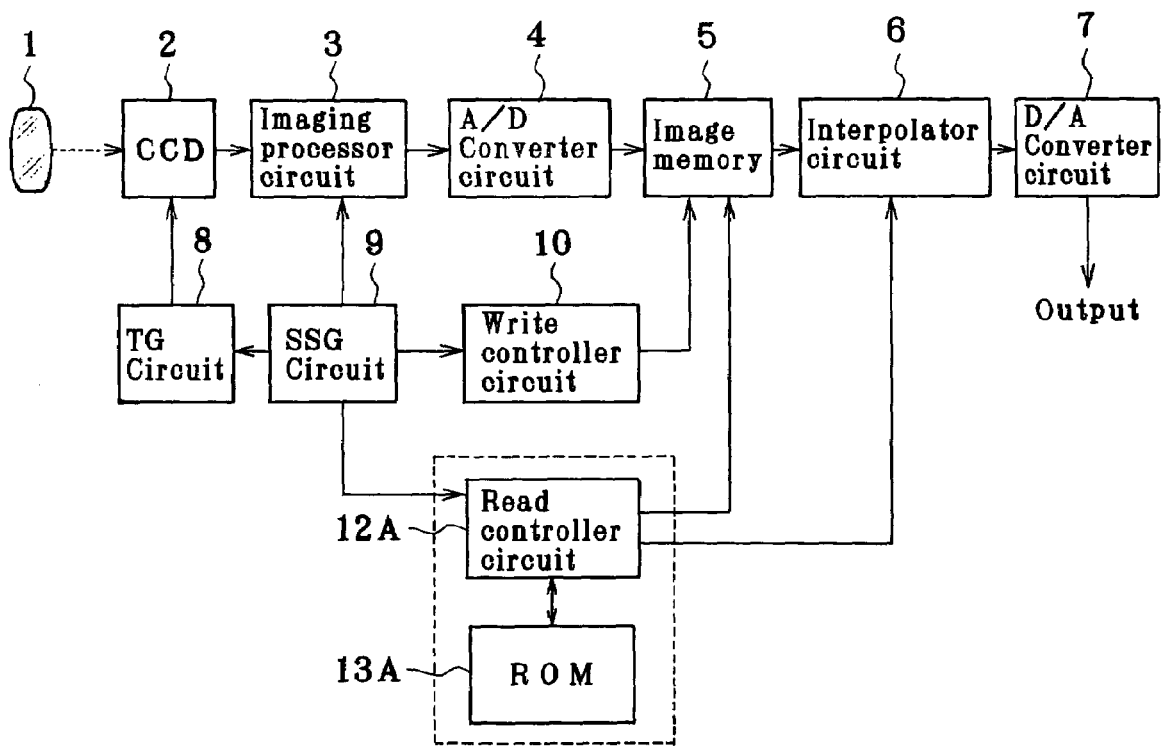
FIG. 16 is a block diagram for one example of an image processor for correction of optical distortions.

It should here be noted that all the zoom lenses described in the above examples produce relatively considerable distortions. With subject image information gained via an electronic image pickup device, accordingly, distortion information is also captured in image signal outputs from that electronic image pickup device. In other words, distorted image data are taken in the electronic image pickup device. One exemplary optical distortion is such barrel distortion as shown in FIG. 15. With such barrel distortion, for instance, an image to be by definition formed on a screen position 101 as indicated by broken lines will be formed on a screen position 102 as indicated by solid lines.

Throughout the examples given above, such distortion is electrically corrected. How to electrically correct for that distortion is now explained.

To make correction for optically distorted image signals gained via the electronic image pickup device, the image signals are first converted into digital signals for writing into an image memory. Then, the digital signals are read from the image memory depending on distortion characteristics, thereby correcting for distortion on the image memory. Referring here to FIG. 15, a lattice form of image will be formed on the screen position 101 shown by broken lines in the absence of any distortion. In the presence of distortion, on the other hand, that lattice form of image will be formed on the screen position 102 indicated by solid lines. In the zoom lens of the invention wherein optical distortion is produced throughout the optical system, the image 101 indicated by broken lines will be stored in the image memory in the form of the image 102 indicated by solid lines under the influence of the above optical distortion. To make correction for this distortion, the image data-before-correction must be read from the image memory as follows. Image data-before-correction stored at a point $P_a$ is read at timing for reading a $P_A$ point, image data-before-correction stored at a point $P_b$ at timing for reading a $P_B$ point, and image data-before-correction stored at a point $P_d$ at timing for reading a $P_D$ point. In this way, the image 102 before correction can be read as a distortion-free image to be properly formed at the lattice form of screen 101 indicated by broken lines, so that an image with corrected optical distortion can be displayed in place.

FIG. 15 is a block diagram illustrative of a unit having an image processing function for correction of optical distortion. Referring to this unit, a subject image is first formed on the image pickup plane of a CCD (electronic image pickup device) 2 via a zoom lens 1 of the invention. Including such optical distortion as described above, the subject image formed on the image pickup plane of CCD 2 is converted into electrical signals at CCD 2. The electrical signals are converted by given processing at an imaging processor circuit 3 into image signals that are then fed to an A/D converter circuit 4 where they are converted into digital signals for storage in an image memory 5. Writing and reading of signals to and from the image memory 5 are controlled by a write controller circuit 10 and a read controller circuit 12A.

It is noted that an SSG (synchronizing signal generator) circuit 9 is operable to generate a reference timing signal. That SSG (synchronizing signal generator) circuit 9 then feeds the reference timing signal to a TG (timing generator) circuit 8 (as described below), the imaging processor circuit 3, the write controller circuit 10 and the read controller circuit 12A. The TG circuit 8 is operable to send read timing signals in the horizontal (H) and vertical (V) directions to CCD 2. Quantitative correction data predetermined for each section of the screen are preloaded in a quantitative corrector ROM 13A. What is loaded as the predetermined quantitative correction, for instance, is a quantitative correction address value for correction of optical distortion, which is determined depending on the relations of positions on the solid lines to positions on the broken lines, as shown in FIG. 15.

Then, signals (data) are read from the image memory 5 via read signal outputs from the read controller circuit 12A. At this time, the signals are read from the image memory 5 for the purpose of correction of optical distortion. The read signals are interpolated at an interpolator circuit 6, and then converted by a D/A converter 7 into analog signals for outputting.

In this connection, it is noted that an image memory (5) mounted on some digital cameras (electronic cameras) has a tight space. In such a case, it is acceptable to change timing by a time length corresponding to the amount of optical distortion to be corrected before the image signals are stored in the image memory 5, that is, when the image signals are read from CCD 2.

Chromatic aberration of magnification, too, can be electrically corrected if the same distortion correction as mentioned above is made for each color separation image. Throughout the examples given above, not just distortion but also chromatic aberration of magnification is electrically corrected at the same time.

As already described, a resinous material or glass is used for lenses in the zoom optical system examples. Instead, however, an organic-inorganic composite material could be used. Organic-inorganic composite materials usable herein are now explained.

In an organic-inorganic composite material, an organic component and an inorganic component are mixed together into a composite material at a molecular level or a nano-scale. Some available forms include (1) a structure wherein a polymeric matrix comprising an organic skeleton and a matrix comprising an inorganic skeleton are entangled together and penetrated into each other, (2) a structure wherein inorganic fine particles (so-called nano-particles) much smaller than the wavelength of light on a nano-scale are uniformly dispersed throughout a polymeric matrix comprising an organic skeleton, and (3) a combined structure of both. Between the organic component and the inorganic component there are some interactions such as intermolecular forces, e.g., hydrogen bonds, dispersion forces and Coulomb force, attractive forces resulting from covalent bonds, ionic bonds and interaction of π electron clouds, etc. In the organic-inorganic composite material, the organic component and the inorganic component are mixed together at a molecular level or at a scale level smaller than the wavelength of the light. For this reason, that composite material provides a transparent material because of having little or no influence on light scattering. As can be derived from Maxwell equation, the composite material possesses the optical characteristics of each of the organic and inorganic components. Therefore, the organic-inorganic composite material can have various optical characteristics (such as refractive index and chromatic dispersion) depending on the type and quantitative ratio of the organic and inorganic components. Thus, it is possible to obtain various optical characteristics by blending together the organic and inorganic components at any desired ratio.

Some exemplary compositions of an organic-inorganic composite material comprising an acrylate resin (of the ultraviolet curable type) and nano-particles of zirconia ($ZrO_2$) are shown in Table 1; some exemplary compositions of an organic-inorganic composite material comprising an acrylate resin and nano-particles of zirconia ($ZrO_2$)/alumina ($Al_2O_3$) in Table 2; some exemplary composition of an organic-inorganic composite material comprising an acrylate resin and nano-particles of niobium oxide ($Nb_2O_5$) in Table 3; and some exemplary compositions of an acrylate resin and nano-particles of zirconium oxide/alumina ($Al_2O_3$) in Table 4.

TABLE 1

| Zirconia content | $n_d$ | $v_d$ | $n_C$ | $n_F$ | $n_g$ | Remarks |
|---|---|---|---|---|---|---|
| 0 | 1.49236 | 57.85664 | 1.48981 | 1.49832 | 1.50309 | 100% acrylic |
| 0.1 | 1.579526 | 54.85037 | 1.57579 | 1.586355 | 1.59311 | |
| 0.2 | 1.662128 | 53.223 | 1.657315 | 1.669756 | 1.678308 | |
| 0.3 | 1.740814 | 52.27971 | 1.735014 | 1.749184 | 1.759385 | |
| 0.4 | 1.816094 | 51.71726 | 1.809379 | 1.825159 | 1.836887 | |
| 0.5 | 1.888376 | 51.3837 | 1.880807 | 1.898096 | 1.911249 | |

TABLE 2

| Quantitative ratio of $Al_2O_3$ | Quantitative ratio of $ZrO_2$ | $n_d$ | $v_d$ | $n_C$ | $n_F$ | $n_g$ | Remarks |
|---|---|---|---|---|---|---|---|
| 0.1 | 0.4 | 1.831515 | 53.56672 | 1.824851 | 1.840374 | 1.851956 | 50% acrylate |
| 0.2 | 0.3 | 1.772832 | 56.58516 | 1.767125 | 1.780783 | 1.790701 | |
| 0.3 | 0.2 | 1.712138 | 60.97687 | 1.707449 | 1.719127 | 1.727275 | |
| 0.4 | 0.1 | 1.649213 | 67.85669 | 1.645609 | 1.655177 | 1.661429 | |
| 0.2 | 0.2 | 1.695632 | 58.32581 | 1.690903 | 1.702829 | 1.774891 | |

TABLE 3

| Content of $Nb_2O_5$ | Content of $Al_2O_3$ | $n_d$ | $v_d$ | $n_C$ | $n_F$ | $n_g$ |
|---|---|---|---|---|---|---|
| 0.1 | 0 | 1.589861 | 29.55772 | 1.584508 | 1.604464 | 1.617565 |
| 0.2 | 0 | 1.681719 | 22.6091 | 1.673857 | 1.70401 | 1.724457 |
| 0.3 | 0 | 1.768813 | 19.52321 | 1.758673 | 1.798053 | 1.8251 |
| 0.4 | 0 | 1.851815 | 17.80818 | 1.839583 | 1.887415 | 1.920475 |
| 0.5 | 0 | 1.931253 | 16.73291 | 1.91708 | 1.972734 | 2.011334 |

TABLE 4

| Content of $Al_2O_3$ (film) | Zirconia alkoxide | $n_d$ | $v_d$ | $n_C$ | $n_F$ |
|---|---|---|---|---|---|
| 0 | 0.3 | 1.533113 | 58.39837 | 1.530205 | 1.539334 |
| 0.1 | 0.27 | 1.54737 | 62.10192 | 1.544525 | 1.553339 |
| 0.2 | 0.24 | 1.561498 | 66.01481 | 1.558713 | 1.567219 |
| 0.3 | 0.21 | 1.575498 | 70.15415 | 1.572774 | 1.580977 |
| 0.4 | 0.18 | 1.589376 | 74.53905 | 1.586709 | 1.594616 |

Electronic equipments comprising such an inventive zoom or image-formation optical system as described above are now explained. Used for such electronic equipments is a phototaking system wherein an object image formed through the above optical system is received by a CCD or other image pickup device for phototaking. The electronic equipments include digital cameras, video cameras, digital video units, information processors such as personal computers and mobile computers, telephone sets in general and easy-to-carry cellular phones in particular, personal digital assistants, etc.

Figure 17:
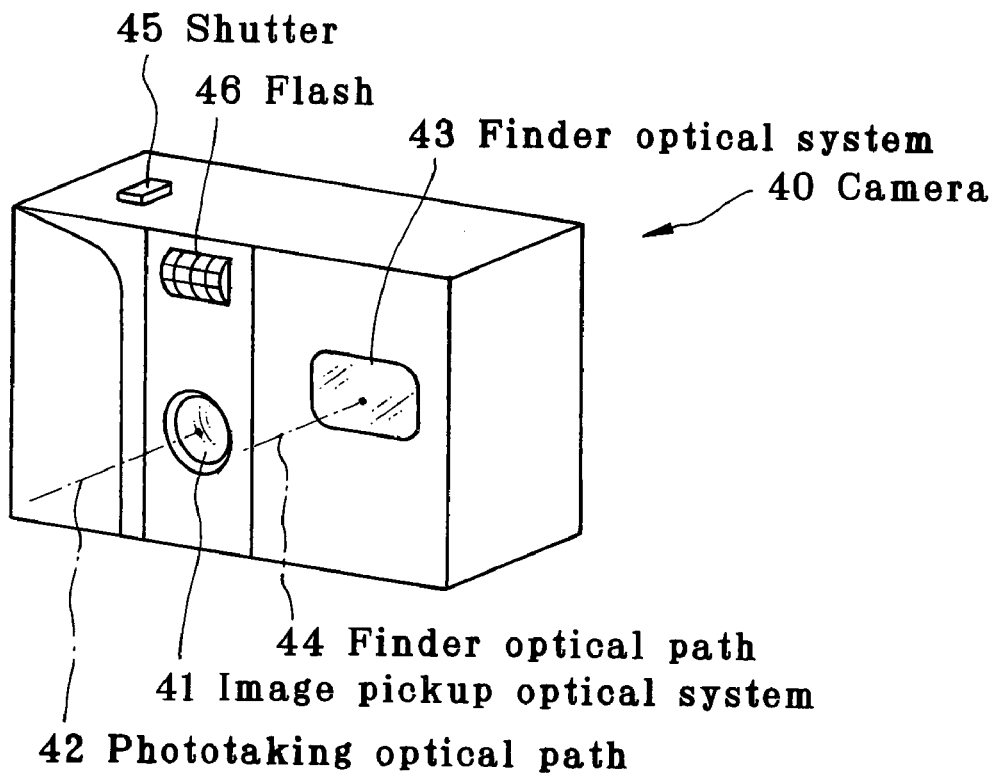
Figure 18:
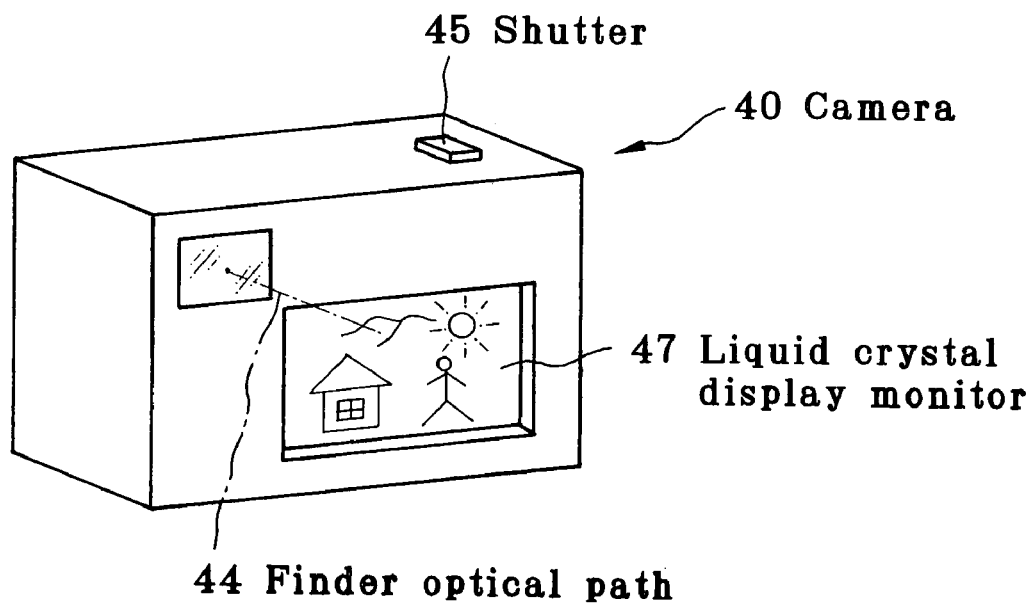
FIG. 18 is a rear perspective view of the digital camera of FIG. 17.
Figure 19:
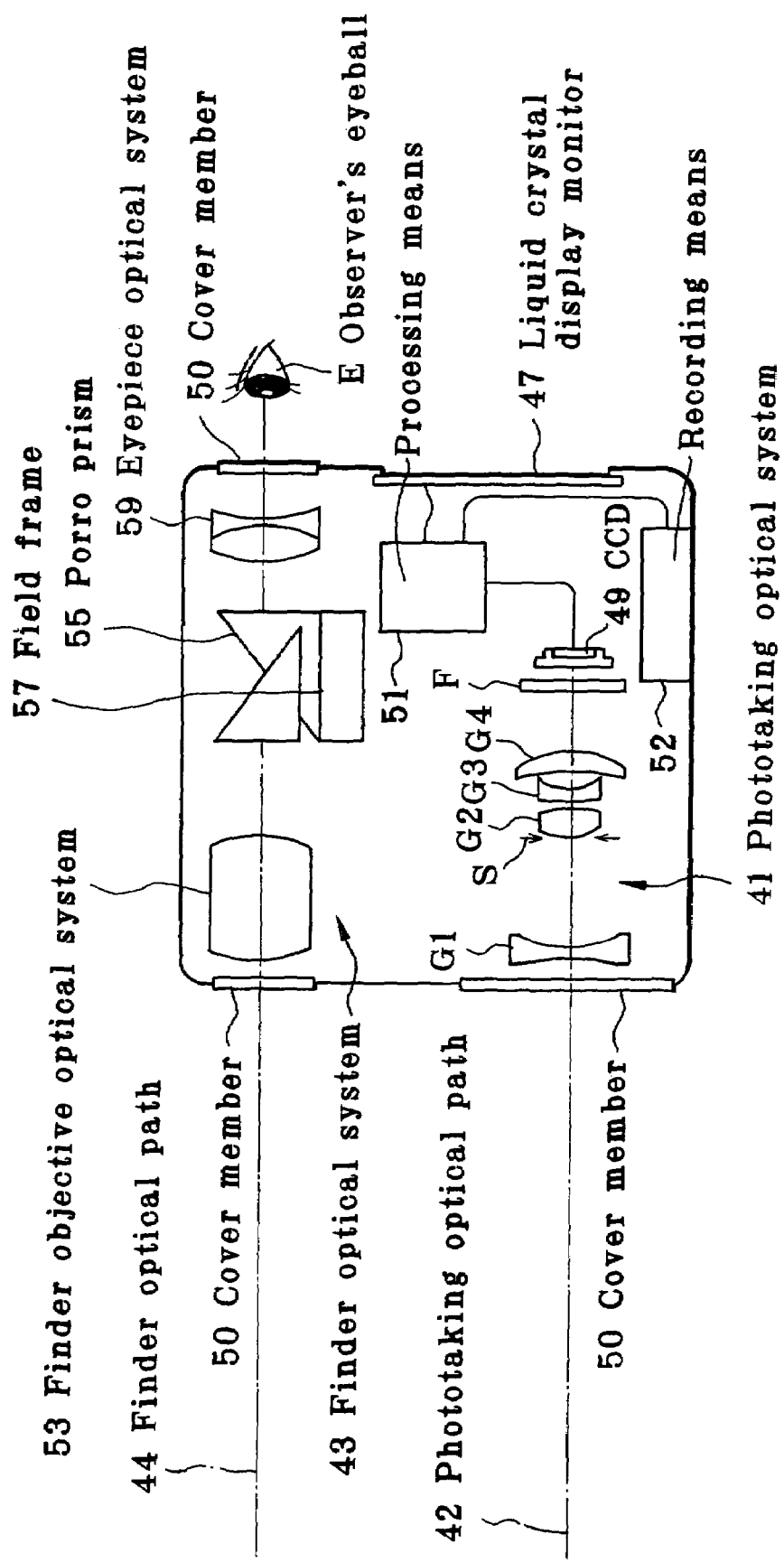
FIG. 19 is a sectional view of the digital camera of FIG. 17.

FIGS. 17, 18 and 19 are conceptual illustrations of a digital camera, in which the zoom optical system of the invention is incorporated as a phototaking optical system 41. FIG. 17 is a front perspective view of the outward appearance of a digital camera 40, and FIG. 18 is a rear perspective view of the same. FIG. 19 is a sectional view of the construction of the digital camera 40.

In this embodiment, the digital camera 40 comprises a phototaking optical system 41, a finder optical system 43, a shutter 45, a flash 46, a liquid crystal monitor 47 and so on. The phototaking optical system 41 is positioned on a phototaking optical path 44 while the finder optical system 43 is positioned on a finder optical path 44 separate from that phototaking optical path 42, with the shutter 45 mounted on an upper portion of the camera 40. As the shutter 45 is pressed down, phototaking takes place through the phototaking optical system 41, for instance, the zoom optical system according to Example 1. An object image formed by the phototaking optical system 41 is formed on the image pickup plane of a CCD 49 via a plane-parallel plate P1 and a cover glass P2. The plane-parallel plate P1 is provided with a near infrared cut coating. The plane-parallel plate P1 may have a low-pass filter action. An object image received at CCD 49 is shown as an electronic image on the liquid crystal monitor 47 via processing means 51, which monitor is mounted on the back of the camera. This processing means 51 could be connected with recording means 52 in which the phototaken electronic image is recordable. It is here noted that the recording means 52 could be provided separately from the processing means 51 or, alternatively, it could be constructed in such a way that images are electronically recorded and written thereon by means of floppy discs, memory cards, MOs or the like. This camera could also be constructed in the form of a silver-halide camera using a silver-halide film in place of CCD 49.

Moreover, a finder objective optical system 53 is located on the finder optical path 44. An object image formed by that finder objective optical system 53 is in turn formed on a field frame 57, which is attached to a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59. In the embodiment of FIG. 19, plane-parallel plates are used as the cover members 50; however, it is acceptable to use powered lenses.

Figure 20:
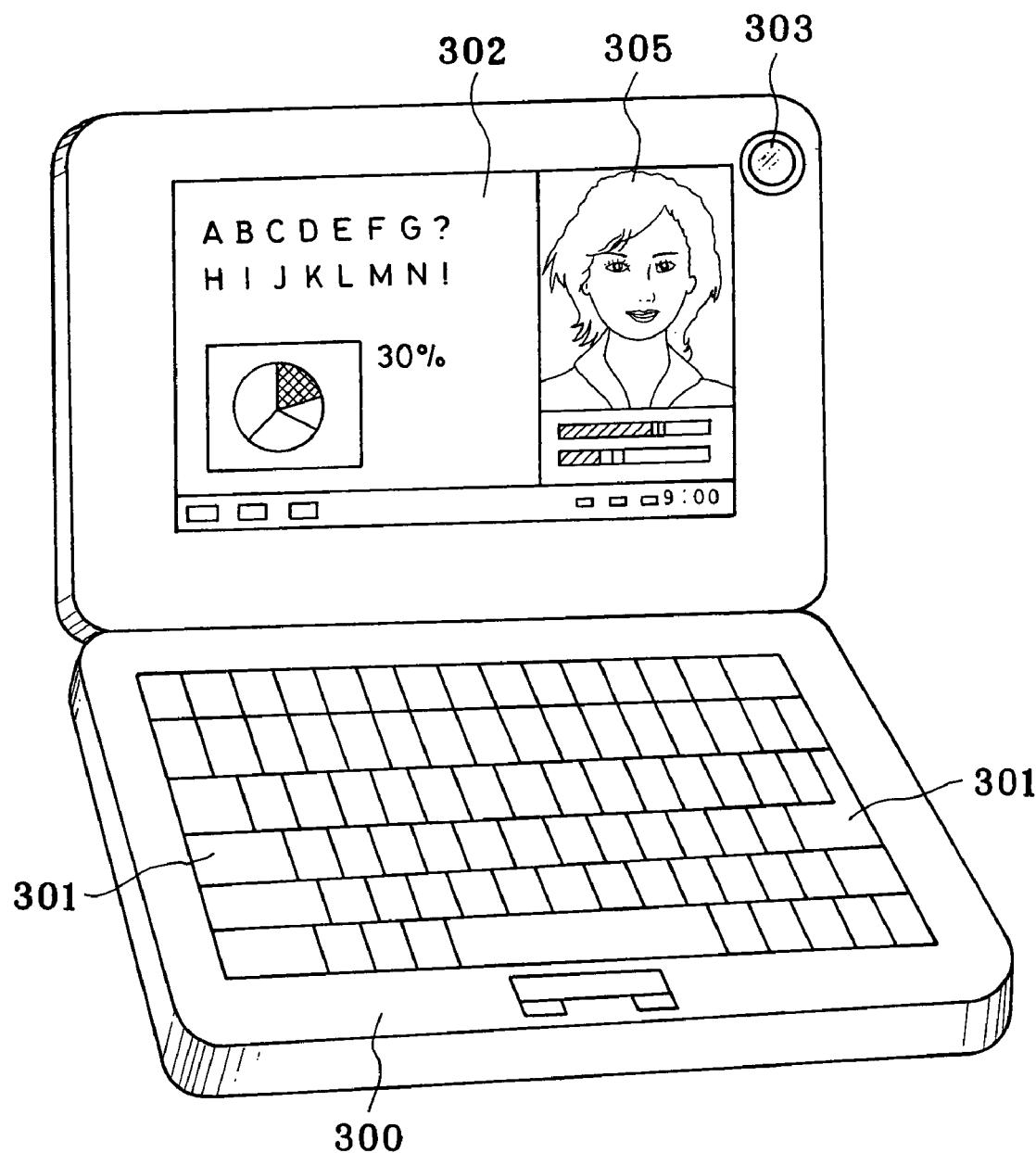
FIG. 20 is a front perspective view of a personal computer with its cover put up, in which the inventive zoom optical system is built as an objective optical system.
Figure 21:
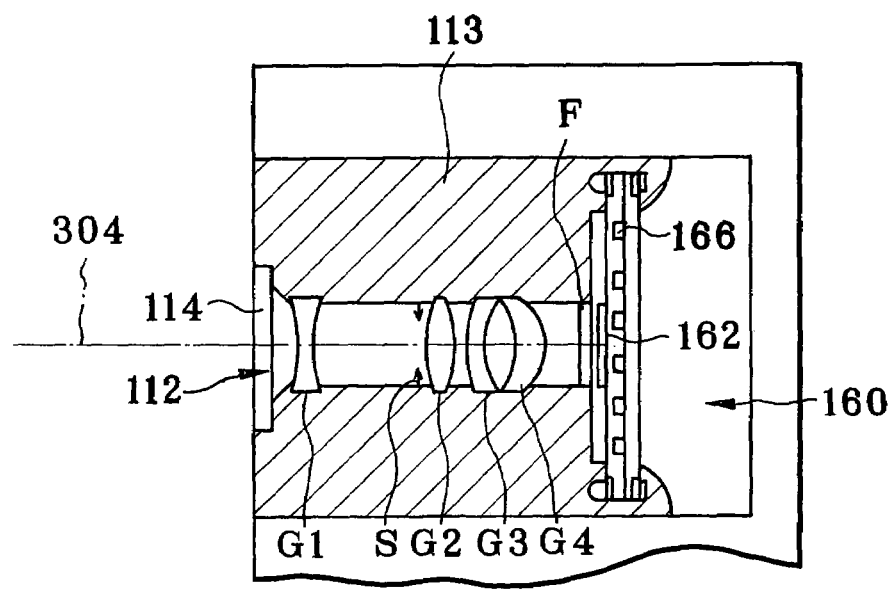
FIG. 21 is a sectional view of a phototaking optical system in the personal computer.
Figure 22:
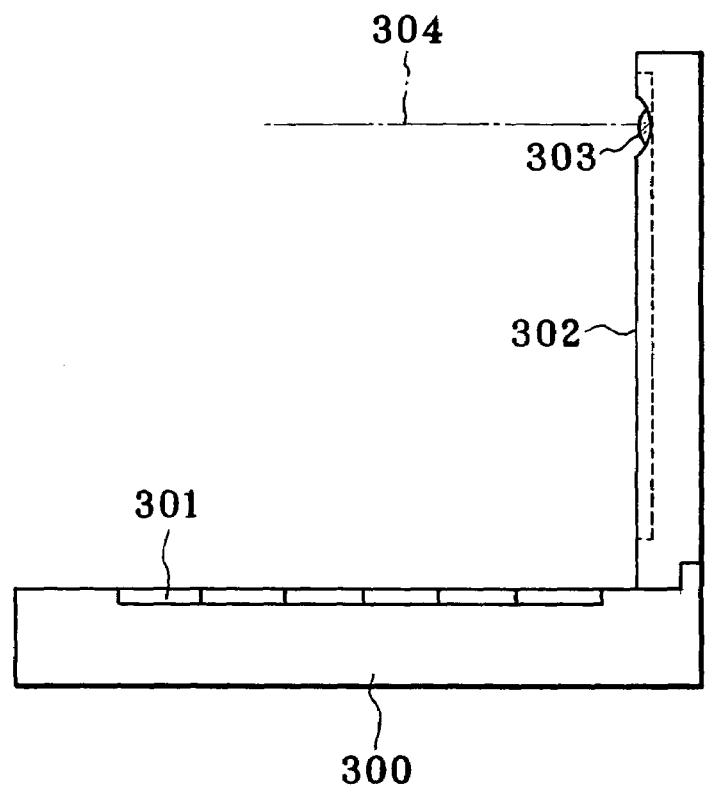
FIG. 22 is a side view of a state of FIG. 20.

With the thus constructed digital camera 40, it is possible to achieve high performance and compactness, because the phototaking optical system 41 is of high FIGS. 20, 21 and 22 are illustrative of a personal computer that is one example of the information processor in which the zoom optical system of the invention is built as an objective optical system. FIG. 20 is a front perspective view of a personal computer 300 in use with a cover put up, FIG. 21 is a sectional view of a phototaking optical system 303 in the personal computer 300, and FIG. 22 is a side view of the state of FIG. 20.

As shown in FIGS. 30, 31 and 32, the personal computer 300 comprises a keyboard 301 via which an operator enters information therein from outside, a monitor 302 on which the information is shown for the operator, a phototaking optical system 303 for taking an image of the operator and surrounding images, and information processing or recording means (not shown). For the monitor 302, for instance, use could be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper-right portion of the monitor 302, it could be located somewhere around the monitor 302 or keyboard 301.

This phototaking optical system 303 comprises, on a phototaking optical path 304, an objective lens 112 comprising the zoom optical system of the invention (roughly shown) and an image pickup device chip 162 for receiving an image. These are built in the personal computer 300.

Here a group F of plane-parallel plates such as a low-pass filter is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is here noted that a driving mechanism for the zoom optical system in the lens barrel 113 is not shown.

An object image received at the image pickup device chip 162 is entered via a terminal 166 in the processing means of the personal computer 300, and shown as an electronic image on the monitor 302. As an example, an image 305 taken of the operator is shown in FIG. 20. This image 305 could be shown on a personal computer on the other end via suitable processing means and the Internet or telephone line.

Figure 23A:
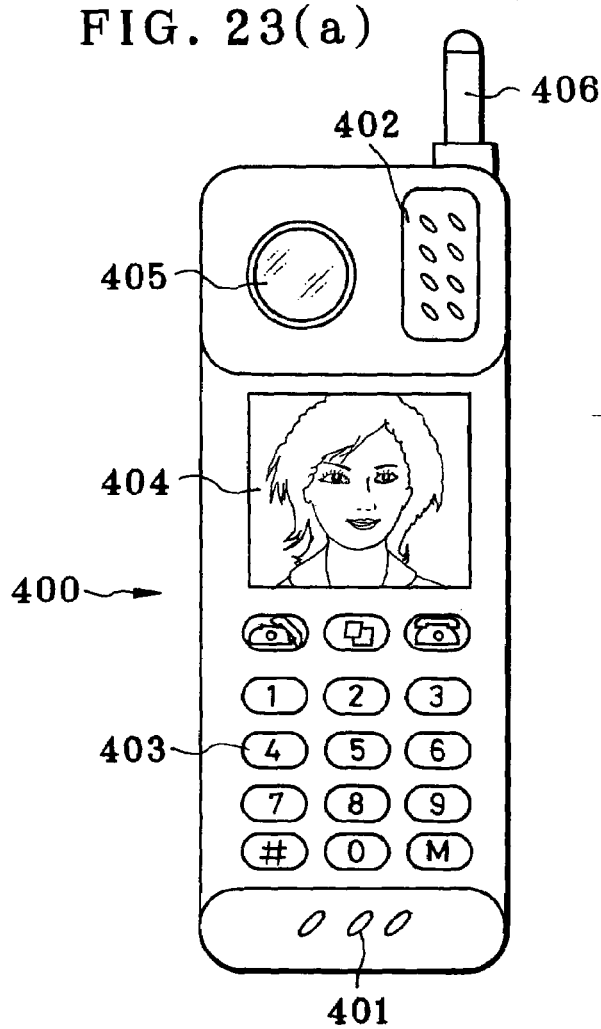
FIGS. 23(a) and 23(b) are a front view and a side view of a cellular phone with the inventive zoom optical system built as an objective optical system.
Figure 23B:
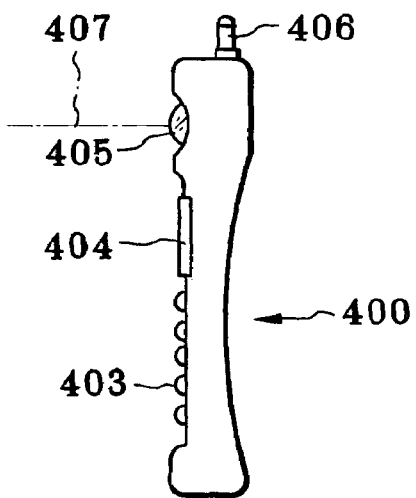
Figure 23C:
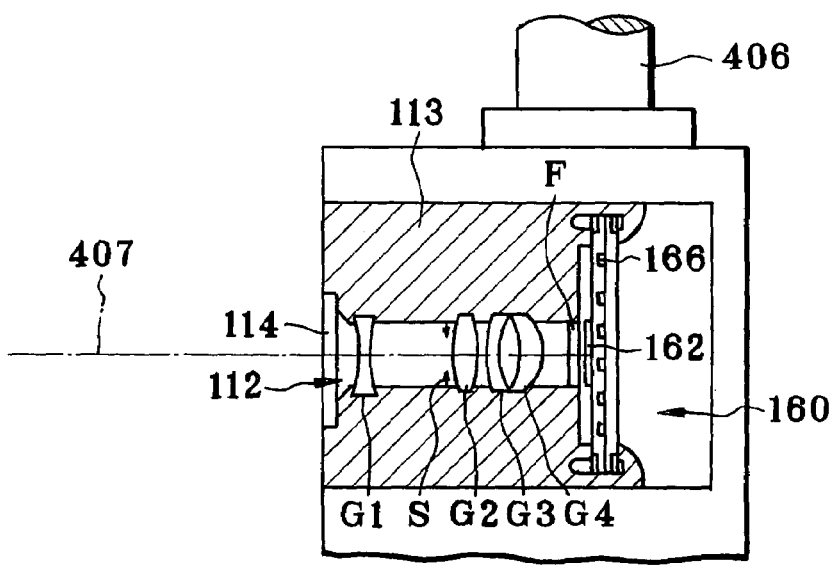
FIG. 23(c) is a sectional view of a phototaking optical system therein.

FIGS. 23($a$), 23($b$) and 23($c$) are illustrative of a telephone set that is one example of the information processor in which the zoom optical system of the invention is built in the form of a phototaking optical system, especially a convenient-to-carry cellular phone. FIG. 23($a$) and FIG. 23($b$) are a front view and a side view of a cellular phone 400, respectively, and FIG. 23($c$) is a sectional view of a phototaking optical system 405.

As shown in FIGS. 23($a$), 23($b$) and 23($c$), the cellular phone 400 comprises a microphone 401, a speaker 402, an input dial 403, a monitor 404, a phototaking optical system 405, an antenna 406, and processing means (not shown). The voice of an operator is entered as information in the microphone 401, and the speaker 402 is to produce the voice of the person on the other end. The input dial 403 includes a button via which the operator enters information therein. The monitor 404 is to show the images taken of the operator per se or the person on the other end and indicate information such as a telephone number. The antenna 406 is to transmit and receive communications waves. Here the monitor 404 is a liquid crystal display device. It is noted that the components are not necessarily arranged as shown. The phototaking optical system 405 is positioned on a phototaking optical path 407, and includes an objective lens 112 comprising the zoom optical system of the invention (roughly shown) and an image pickup device chip 162 for receiving an object image. These are built in the cellular phone 400.

Here a group F of plane-parallel plates such as a low-pass filter is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112. It is noted that a driving mechanism for the zoom optical system in the lens barrel 113 is not shown.

An object image received at the image pickup device chip 162 is entered via a terminal 166 in processing means (not shown), so that the object image can be displayed as an electronic image on the monitor 404. The processing means also include a signal processing function for converting information about the object image received at the image pickup device chip 162 into transmittable signals, thereby sending the image to the person on the other end for displaying on a monitor on the other end.

The zoom optical system of the invention and electronic equipment incorporating the same, for instance, could be embodied as follows.

(1) A zoom optical system comprising, in order from an object side thereof, a first lens group having negative refracting power, a second lens group having positive refracting power, a third lens group having negative refracting power and a fourth lens group that has positive refracting power and remains fixed during zooming, characterized in that said zoom optical system satisfies condition (1):

$$2<|d_{w12}-d_{t12}|/|d_{w23}-d_{t23}|<200 \tag{1}$$

where $d_{w12}$ is a spacing between the first lens group and the second lens group at a wide-angle end, $d_{t12}$ is a spacing between the first lens group and the second lens group at a telephoto end, $d_{w23}$ is a spacing between the second lens group and the third lens group at the wide-angle end, and $d_{t23}$ is a spacing between the second lens group and the third lens group at the telephoto end.

(2) The zoom optical system according to (1) above, characterized in that said first lens group comprises one negative lens.

(3) The zoom optical system according to (1) or (2) above, characterized in that at least one negative lens included in said first lens group has an aspheric surface on its object side.

(4) The zoom optical system according to any one of (1) to (3) above, characterized in that at least one negative lens included in said first lens group has an aspheric surface on its image side.

(5) The zoom optical system according to any one of (1) to (4) above, characterized in that at least one negative lens included in said first lens group is a lens that is fabricated of a resinous material.

(6) The zoom optical system according to any one of (1) to (5) above, characterized in that at least one negative lens included in said first lens group is fabricated of a material that satisfies condition (2):

$$40 < \nu_{d1} < 100 \qquad (2)$$

where $\nu_{d1}$ is an Abbe number of the negative lens in said first lens group.

(7) The zoom optical system according to any one of (1) to (6) above, characterized in that at least one negative lens included in said first lens group satisfies condition (3):

$$0.5 < |f_1|/f_w < 5 \qquad (3)$$

where $f_1$ is a focal length of the negative lens in said first lens group, and $f_w$ is a focal length of the zoom optical system at a wide-angle end thereof.

(8) The zoom optical system according to any one of (1) and (3)–(7) above, characterized in that said first lens group comprises at least one cemented lens.

(9) The zoom optical system according to any one of (1) and (3)–(8) above, characterized in that said first lens group comprises at least one positive lens.

(10) The zoom optical system according to (9) above, characterized in that said positive lens is located nearest to an image side of said first lens group.

(11) The zoom optical system according to any one of (1) to (10) above, characterized in that said first lens group satisfies condition (4):

$$-10 < SF_{G1} < 1 \qquad (4)$$

where $SF_{G1} = (r_{G11} + r_{G12})/(r_{G11} - r_{G12})$, provided that:

$SF_{G1}$ is a shaping factor of said first lens group, $r_{G11}$ is a radius of curvature of a surface nearest to an object side of said first lens group, and $r_{G12}$ is a radius of curvature of a surface nearest to an image side of said first lens group.

(12) The zoom optical system according to any one of (1)–(11) above, characterized in that said second lens group consists of one positive lens.

(13) The zoom optical system according to any one of (1)–(12) above, characterized in that at least one positive lens included in said second lens group has an aspheric surface on its object side.

(14) The zoom optical system according to any one of (1)–(13) above, characterized in that at least one positive lens included in said second lens group has an aspheric surface on its image side.

(15) The zoom optical system according to any one of (1)–(14) above, characterized in that at least one positive lens included in said second lens group is a lens that is fabricated of a resinous material.

(16) The zoom optical system according to any one of (1)–(15) above, characterized in that at least one positive lens included in said second lens group is fabricated of a material that satisfies condition (5):

$$40 < \nu_{d2} < 100 \qquad (5)$$

where $\nu_{d2}$ is an Abbe number of the positive lens in said second lens group.

(17) The zoom optical system according to any one of (1)–(16) above, characterized in that at least one positive lens included in said second lens group satisfies condition (6):

$$0.3 < |f_2|/f_w < 1.3 \qquad (6)$$

where $f_2$ is a focal length of the positive lens in said second lens group, and $f_w$ is a focal length of the zoom optical system at a wide-angle end thereof.

(18) The zoom optical system according to any one of (11) and (13)–(17), characterized in that said second lens group comprises at least one cemented lens.

(19) The zoom optical system according to any one of (1) and (13)–(18) above, characterized in that said second lens group comprises at least one negative lens.

(20) The zoom optical system according to (14) above, characterized in that said negative lens is located nearest to an image side of said second lens group.

(21) The zoom optical system according to any one of (1) to (20) above, characterized in that said second lens group satisfies condition (7):

$$-5 < SF_{G2} < 1 \qquad (7)$$

where $SF_{G2} = (r_{G21} + r_{G22})/(r_{G21} - r_{G22})$, provided that:

$SF_{G2}$ is a shaping factor of said second lens group, $r_{G21}$ is a radius of curvature of a surface nearest to an object side of said second lens group, and $r_{G22}$ is a radius of curvature of a surface nearest to an image side of said second lens group.

(22) The zoom optical system according to any one of (1)–(21) above, characterized in that at least one negative lens in said third lens group is fabricated of a resinous material.

(23) The zoom optical system according to any one of (1) to (22) above, characterized in that at least one negative lens in said third lens group satisfies condition (8):

$$-1 < SF_{G3} < 10 \qquad (8)$$

where $SF_{G3} = (r_{G31} + r_{G32})/(r_{G31} - r_{G32})$, provided that:

$SF_{G3}$ is a shaping factor of the negative lens in said third lens group, $r_{G31}$ is a radius of curvature of an object-side surface of the negative lens in said third lens group, and $r_{G32}$ is a radius of curvature of an image-side surface of the negative lens in said third lens group.

(24) The zoom optical system according to any one of (1)–(23) above, characterized in that at least one negative lens in said third lens group is fabricated of a material that satisfies condition (9):

$$0 < \nu_{d3} < 40 \tag{9}$$

where $\nu_{d3}$ is an Abbe number of the negative lens in said third lens group.

(25) The zoom optical system according to any one of (1)–(24) above, characterized in that at least one positive lens in said fourth lens group is fabricated of a resinous material.

(26) The zoom optical system according to any one of (1) to (25) above, characterized in that at least one positive lens in said fourth lens group satisfies condition (10):

$$-1 < SF_{G4} < 10 \tag{10}$$

where $SF_{G4} = (r_{G41} + r_{G42})/(r_{G41} - r_{G42})$, provided that:

$SF_{G4}$ is a shaping factor of the positive lens in said fourth lens group, $r_{G41}$ is a radius of curvature of an object-side surface of the positive lens in said fourth lens group, and $r_{G42}$ is a radius of curvature of an image-side surface of the positive lens in said fourth lens group.

(27) The zoom optical system according to any one of (1)–(26) above, characterized in that at least one positive lens in said fourth lens group satisfies condition (11):

$$40 < \nu_{d4} < 100 \tag{11}$$

where $\nu_{d4}$ is an Abbe number of the positive lens in said fourth lens group.

(28) The zoom optical system according to any one of (1)–(27) above, characterized by satisfying condition (12):

$$20 < |\nu_{d2} - \nu_{d3}| < 100 \tag{12}$$

where $\nu_{d2}$ is an Abbe number of the positive lens in said second lens group, and $\nu_{d3}$ is an Abbe number of the negative lens in said third lens group.

(29) The zoom optical system according to any one of (1)–(28) above, characterized by satisfying condition (13):

$$-30 < DT_{min} < 20 \tag{13}$$

where $DT_{min}$ is a minimum amount of distortion in %.

(30) The zoom optical system according to any one of (1)–(29) above, characterized in that distortion produced throughout said optical system is electrically corrected.

(31) The zoom optical system according to any one of (1)–(30) above, characterized in that chromatic aberration of magnification produced throughout said optical system is electrically corrected.

(32) The zoom optical system according to any one of (1)–(31) above, characterized in that an organic-inorganic composite material is used as an optical material for at least one optical element that forms a part of said optical system.

(33) The zoom optical system according to (32) above, characterized in that said organic-inorganic composite material contains a nano-particle form of zirconia.

(34) The zoom optical system according to (32) above, characterized in that said organic-inorganic composite material contains a nano-particle form of zirconia and alumina.

(35) The zoom optical system according to (32) above, characterized in that said organic-inorganic composite material contains a nano-particle form of niobium oxide.

(36) The zoom optical system according to (32) above, characterized in that said organic-inorganic composite material contains a nano-particle form of zirconium alkoxide hydrolysate and alumina.

(37) A zoom optical system comprising, in order from an object side thereof, a first lens group having negative refracting power, a second lens group having positive refracting power, a third lens group having negative refracting power and a fourth lens group having positive refracting power, characterized in that:

said second lens group comprises one homogeneous positive lens.

(38) The zoom optical system according to (37) above, characterized in that at least one negative lens included in said firth lens group has an aspheric surface on its object side.

(39) The zoom optical system according to (37) or (38) above, characterized in that at least one negative lens included in said first lens group has an aspheric surface on its image side.

(40) The zoom optical system according to any one of (37)–(39) above, characterized in that at least one negative lens included in said first lens group is a lens that is fabricated of a resinous material.

(41) The zoom optical system according to any one of (37)–(40) above, characterized in that at least one negative lens included in said first lens group is fabricated of a material that satisfies condition (14):

$$40 < \nu_{d1} < 100 \tag{14}$$

where $\nu_{d1}$ is an Abbe number of the negative lens in said first lens group.

(42) The zoom optical system according to any one of (37)–(41) above, characterized in that at least one negative lens included in said first lens group satisfies condition (15):

$$0.5 < |f_1|/f_w < 5 \tag{15}$$

where $f_1$ is a focal length of the negative lens in said first lens group, and $f_w$ is a focal length of the zoom optical system at a wide-angle end thereof.

(43) The zoom optical system according to any one of (37)–(42) above, characterized in that said first lens group comprises at least one cemented lens.

(44) The zoom optical system according to any one of (37)–(43) above, characterized in that said first lens group comprises at least one positive lens.

(45) The zoom optical system according to (44) above, characterized in that said positive lens is located nearest to an image side of said first lens group.

(46) The zoom optical system according to any one of (37) to (40) above, characterized in that said first lens group satisfies condition (16):

$$-10 < SF_{G1} < 1 \tag{16}$$

where $SF_{G1} = (r_{G11} + r_{G12})/(r_{G11} - r_{G12})$, provided that:

$SF_{G1}$ is a shaping factor of said first lens group, $r_{G11}$ is a radius of curvature of a surface nearest to an object side of said first lens group, and $r_{G12}$ is a radius of curvature of a surface nearest to an image side of said first lens group.

(47) The zoom optical system according to any one of (37)–(46) above, characterized in that a positive lens in said second lens group has aspheric surfaces nearest to an object side and an image side of said second lens group.

(48) The zoom optical system according to any one of (37)–(47) above, characterized in that a positive lens in said second lens group has an aspheric surface on its image side.

(49) The zoom optical system according to any one of (37) to (48) above, characterized in that a positive lens in said second lens group is a lens that is fabricated of a resinous material.

(50) The zoom optical system according to any one of (37)–(49) above, characterized in that said second lens group satisfies condition (17):

$$-5 < SF_{G2} < 1 \qquad (17)$$

where $SF_{G2}=(r_{G21}+r_{G22})/(r_{G21}-r_{G22})$, provided that:

$SF_{G2}$ is a shaping factor of a negative lens in said second lens group, $r_{G21}$ is a radius of curvature of an object-side surface of the negative lens in said second lens group, and $r_{G22}$ is a radius of curvature of an image-side surface of the negative lens in said second lens group.

(51) The zoom optical system according to any one of (37)–(50) above, characterized in that a positive lens in said second lens group is fabricated of a material that satisfies condition (18):

$$40 < v_{d2} < 100 \qquad (18)$$

where $v_{d2}$ is an Abbe number of the positive lens in said second lens group.

(52) The zoom optical system according to any one of (37)–(51) above, characterized in that a positive lens in said second lens group satisfies condition (19):

$$0.3 < |f_2|/f_w < 1.3 \qquad (19)$$

where $f_2$ is a focal length of the positive lens in said second lens group, and $f_w$ is a focal length of the zoom optical system at a wide-angle end thereof.

(53) The zoom optical system according to any one of (37)–(52) above, characterized in that at least one negative lens in said third lens group is fabricated of a resinous material.

(54) The zoom optical system according to any one of (37)–(53) above, characterized in that at least one negative lens in said third lens group satisfies condition (20):

$$-1 < SF_{G3} < 10 \qquad (20)$$

where $SF_{G3}=(r_{G31}+r_{G32})/(r_{G31}-r_{G32})$, provided that:

$SF_{G3}$ is a shaping factor of the negative lens in said third lens group, $r_{G31}$ is a radius of curvature of an object-side surface of the negative lens in said third lens group, and $r_{G32}$ is a radius of curvature of an image-side surface of the negative lens in said third lens group.

(55) The zoom optical system according to any one of (37)–(54) above, characterized in that at least one negative lens in said third lens group is fabricated of a material that satisfies condition (21):

$$0 < v_{d3} < 40 \qquad (21)$$

where $v_{d3}$ is an Abbe number of the negative lens in said third lens group.

(56) The zoom optical system according to any one of (37)–(55) above, characterized in that at least one positive lens in said fourth lens group is fabricated of a resinous material.

(57) The zoom optical system according to any one of (37)–(56) above, characterized in that at least one positive lens in said fourth lens group satisfies condition (22):

$$-1 < SF_{G4} < 10 \qquad (22)$$

where $SF_{G4}=(r_{G41}+r_{G42})/(r_{G41}-r_{G42})$, provided that:

$SF_{G4}$ is a shaping factor of the positive lens in said fourth lens group, $r_{G41}$ is a radius of curvature of an object-side surface of the positive lens in said fourth lens group, and $r_{G42}$ is a radius of curvature of an image-side surface of the positive lens in said fourth lens group.

(58) The zoom optical system according to any one of (37)–(57) above, characterized in that at least one positive lens in said fourth lens group is fabricated of a material that satisfies condition (23):

$$40 < v_{d4} < 100 \qquad (23)$$

where $v_{d4}$ is an Abbe number of the positive lens in said fourth lens group.

(59) The zoom optical system according to any one of (37)–(58) above, characterized by satisfying condition (24):

$$-30 < DT_{min} < 20 \qquad (24)$$

where $DT_{min}$ is a minimum amount of distortion in %.

(60) The zoom optical system according to any one of (37)–(59) above, characterized in that distortion produced throughout said optical system is electrically corrected.

(61) The zoom optical system according to any one of (37)–(60) above, characterized in that chromatic aberration of magnification produced throughout said optical system is electrically corrected.

(62) The zoom optical system according to any one of (37)–(61) above, characterized in that an organic-inorganic composite material is used as an optical material for at least one optical element that forms a part of said optical system.

(63) The zoom optical system according to (62) above, characterized in that said organic-inorganic composite material contains a nano-particle form of zirconia.

(64) The zoom optical system according to (62) above, characterized in that said organic-inorganic composite material contains a nano-particle form of zirconia and alumina.

(65) The zoom optical system according to (62) above, characterized in that said organic-inorganic composite material contains a nano-particle form of niobium oxide.

(66) The zoom optical system according to (62) above, characterized in that said organic-inorganic composite material contains a nano-particle form of zirconium alkoxide hydrolysate and alumina.

(67) A zoom optical system comprising, in order from an object side thereof, a first lens group having negative refracting power, a second lens group having positive refracting power, a third lens group having negative refracting power and a fourth lens group having positive refracting power, characterized in that:

said first lens group and said third lens group each comprise one negative lens.

(68) The zoom optical system according to (67) above, characterized in that the negative lens in said first lens group has an aspheric surface on its object side.

(69) The zoom optical system according to (67) or (68) above, characterized in that the negative lens in said first lens group has an aspheric surface on its image side.

(70) The zoom optical system according to any one of (67)–(69) above, characterized in that the negative lens in said first lens group is a lens that is fabricated of a resinous material.

(71) The zoom optical system according to any one of (67) to (70), characterized in that the negative lens in said first lens group satisfies condition (25):

$$-5 < SF_{G1} < 5 \quad (25)$$

where $SF_{G1} = (r_{G11} + r_{G12})/(r_{G11} - r_{G12})$, provided that:

$SF_{G1}$ is a shaping factor of the negative lens in said first lens group, $r_{G11}$ is a radius of curvature of an object-side surface of the negative lens in said first lens group, and $r_{G12}$ is a radius of curvature of an image-side surface of the negative lens in said first lens group.

(72) The zoom optical system according to any one of (67)–(71) above, characterized in that the negative lens in said first lens group is fabricated of a material that satisfies condition (26):

$$40 < \nu_{d1} < 100 \quad (26)$$

where $\nu_{d1}$ is an Abbe number of the negative lens in said first lens group.

(73) The zoom optical system according to any one of (67)–(72) above, characterized in that the negative lens in said first lens group satisfies condition (27):

$$0.5 < |f_1|/f_w < 5 \quad (27)$$

where $f_1$ is a focal length of the negative lens in said first lens group, and $f_w$ is a focal length of the zoom optical system at a wide-angle end thereof.

(74) The zoom optical system according to any one of (67)–(73) above, characterized in that at least one positive lens included in said second lens group has an aspheric surface on its object side.

(75) The zoom optical system according to any one of (67)–(74) above, characterized in that at least one positive lens included in said second lens group has an aspheric surface on its image side.

(76) The zoom optical system according to any one of (67)–(75) above, characterized in that at least one positive lens included in said second lens group is fabricated of a material that satisfies condition (28):

$$40 < \nu_{d2} < 100 \quad (28)$$

where $\nu_{d2}$ is an Abbe number of the positive lens in said second lens group.

(78) The zoom optical system according to any one of (67)–(77) above, characterized in that at least one positive lens included in said second lens group satisfies condition (29):

$$0.3 < |f_2|/f_w < 1.3 \quad (29)$$

where $f_2$ is a focal length of the positive lens in said second lens group, and $f_w$ is a focal length of the zoom optical system at a wide-angle end thereof.

(79) The zoom optical system according to any one of (67)–(78) above, characterized in that said second lens group comprises at least one cemented lens.

(80) The zoom optical system according to any one of (67)–(79) above, characterized in that said second lens group comprises at least one negative lens.

(81) The zoom optical system according to (80) above, characterized in that said negative lens is located nearest to an image side of said second lens group.

(82) The zoom optical system according to any one of (67)–(81) above, characterized in that said second lens group satisfies condition (30):

$$-5 < SF_{G2} < 1 \quad (30)$$

where $SF_{G2} = (r_{G21} + r_{G22})/(r_{G21} - r_{G22})$, provided that:

$SF_{G2}$ is a shaping factor of said second lens group, $r_{G21}$ is a radius of curvature of a surface nearest to an object side of said second lens group, and $r_{G22}$ is a radius of curvature of a surface nearest to an image side of said second lens group.

(83) The zoom optical system according to any one of (67)–(82) above, characterized in that at least one negative lens in said third lens group is fabricated of a resinous material.

(84) The zoom optical system according to any one of (67)–(83) above, characterized in that at least one negative lens in said third lens group satisfies condition (31):

$$-1 < SF_3 < 10 \quad (31)$$

where $SF_3 = (r_{31} + r_{32})/(r_{31} - r_{32})$, provided that:

$SF_3$ is a shaping factor of the negative lens in said third lens group, $r_{31}$ is a radius of curvature of an object-side surface of the negative lens in said third lens group, and $r_{32}$ is a radius of curvature of an image-side surface of the negative lens in said third lens group.

(85) The zoom optical system according to any one of (67)–(84) above, characterized in that at least one negative lens in said third lens group is fabricated of a material that satisfies condition (32):

$$0 < \nu_{d3} < 40 \quad (32)$$

where $\nu_{d3}$ is an Abbe number of the negative lens in said third lens group.

(86) The zoom optical system according to any one of (67)–(85) above, characterized in that at least one positive lens in said fourth lens group is fabricated of a resinous material.

(87) The zoom optical system according to any one of (67)–(56) above, characterized in that at least one positive lens in said fourth lens group satisfies condition (33):

$$-1 < SF_{G4} < 10 \quad (33)$$

where $SF_{G4} = (r_{G41} + r_{G42})/(r_{G41} - r_{G42})$, provided that:

$SF_{G4}$ is a shaping factor of the positive lens in said fourth lens group, $r_{G41}$ is a radius of curvature of an object-side surface of the positive lens in said fourth lens group, and $r_{G42}$ is a radius of curvature of an image-side surface of the positive lens in said fourth lens group.

(88) The zoom optical system according to any one of (67)–(87) above, characterized in that at least one positive lens in said fourth lens group is fabricated of a material that satisfies condition (34):

$$40 < \nu_{d4} < 100 \quad (34)$$

where $\nu_{d4}$ is an Abbe number of the positive lens in said fourth lens group.

(89) The zoom optical system according to any one of (67)–(88) above, characterized by satisfying condition (35):

$$-30 < DT_{min} < 20 \tag{35}$$

where $DT_{min}$ is a minimum amount of distortion in %.

(90) The zoom optical system according to any one of (67)–(89) above, characterized in that distortion produced throughout said optical system is electrically corrected.

(91) The zoom optical system according to any one of (67)–(90) above, characterized in that chromatic aberration of magnification produced throughout said optical system is electrically corrected.

(92) The zoom optical system according to any one of (67)–(91) above, characterized in that an organic-inorganic composite material is used as an optical material for at least one optical element that forms a part of said optical system.

(93) The zoom optical system according to (92) above, characterized in that said organic-inorganic composite material contains a nano-particle form of zirconia.

(94) The zoom optical system according to (92) above, characterized in that said organic-inorganic composite material contains a nano-particle form of zirconia and alumina.

(95) The zoom optical system according to (92) above, characterized in that said organic-inorganic composite material contains a nano-particle form of niobium oxide.

(96) The zoom optical system according to (92) above, characterized in that said organic-inorganic composite material contains a nano-particle form of zirconium alkoxide hydrolysate and alumina.

(97) An electronic equipment, characterized by comprising a zoom optical system as recited in any one of (1) to (96) above, and an electronic image pickup device located on an image side thereof.

I claim:

1. A zoom optical system comprising, in order from an object side thereof, a first lens group having negative refracting power, a second lens group having positive refracting power, a third lens group having negative refracting power and a fourth lens group having positive refracting power, wherein:
    said first lens group and said third lens group each consist of one negative lens, wherein said one negative lens in said first lens group is one of a single lens and a cemented lens, and wherein said one negative lens in said third lens group is a single lens, and wherein said one negative lens in said first lens group has aspheric surfaces on an object side and on an image side of said one negative lens.

2. The zoom optical system according to claim 1, wherein the negative lens in said first lens group satisfies condition (25):

$$-5 < SF_{G1} < 5 \tag{25}$$

where $SF_{G1} = (r_{G11} + r_{G12})/(r_{G11} - r_{G12})$, provided that:
    $SF_{G1}$ is a shaping factor of the negative lens in said first lens group,
    $r_{G11}$ is a radius of curvature of an object-side surface of the negative lens in said first lens group, and
    $r_{G12}$ is a radius of curvature of an image-side surface of the negative lens in said first lens group.

3. The zoom optical system according to claim 1, wherein said second lens group consists of one positive lens.

4. The zoom optical system according to claim 1, wherein said second lens group has aspheric surfaces nearest to an object side and an image side thereof.

5. The zoom optical system according to claim 1, wherein said second lens group comprises at least one cemented lens.

6. The zoom optical system according to claim 1, wherein said second lens group comprises one negative lens.

7. The zoom optical system according to claim 1, wherein the negative lens in said third lens group satisfies condition (31):

$$-1 < SF_3 < 10 \tag{31}$$

where $SF_3 = (r_{31} + r_{32})/(r_{31} - r_{32})$, provided that:
    $SF_3$ is a shaping factor of the negative lens in said third lens group,
    $r_{31}$ is a radius of curvature of an object-side surface of the negative lens in said third lens group, and
    $r_{32}$ is a radius of curvature of an image-side surface of the negative lens in said third lens group.

8. The zoom optical system according to claim 1, wherein at least one positive lens in said fourth lens group satisfies condition (33)

$$-1 < SF_{G4} < 10 \tag{33}$$

where $SF_{G4} = (r_{G41} + r_{G42})/(r_{G41} - r_{G42})$, provided that:
    $SF_{G4}$ is a shaping factor of the positive lens in said fourth lens group,
    $r_{G41}$ is a radius of curvature of an object-side surface of the positive lens in said fourth lens group, and
    $r_{G42}$ is a radius of curvature of an image-side surface of the positive lens in said fourth lens group.

9. The zoom optical system according to claim 1, wherein distortion produced throughout said zoom optical system is electrically corrected.

10. The zoom optical system according to claim 1, wherein chromatic aberration of magnification produced throughout said zoom optical system is electrically corrected.

11. The zoom optical system according to claim 1, wherein at least two lenses for forming a part of said zoom optical system are fabricated of a resinous material.

12. The zoom optical system according to claim 1, wherein an organic-inorganic composite material is used as an optical material for at least one optical element that forms a part of said zoom optical system.

13. An electronic equipment, which comprises a zoom optical system as recited claim 1, and an electronic image pickup device located on an image side thereof.

* * * * *